(12) United States Patent
Ebergen et al.

(10) Patent No.: US 9,298,421 B2
(45) Date of Patent: Mar. 29, 2016

(54) PERFORMING QUOTIENT SELECTION FOR A CARRY-SAVE DIVISION OPERATION

(71) Applicant: Oracle International Corporation, Redwood City, CA (US)

(72) Inventors: Josephus C. Ebergen, San Francisco, CA (US); Navaneeth P. Jamadagni, Portland, OR (US); Ivan E. Sutherland, Portland, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 193 days.

(21) Appl. No.: 14/028,943

(22) Filed: Sep. 17, 2013

(65) Prior Publication Data

US 2014/0082037 A1     Mar. 20, 2014

Related U.S. Application Data

(60) Provisional application No. 61/703,715, filed on Sep. 20, 2012.

(51) Int. Cl.
*G06F 7/48* (2006.01)
*G06F 7/64* (2006.01)
*G06F 7/537* (2006.01)

(52) U.S. Cl.
CPC ............... *G06F 7/48* (2013.01); *G06F 7/5375* (2013.01); *G06F 7/64* (2013.01)

(58) Field of Classification Search
None
See application file for complete search history.

(56) References Cited

U.S. PATENT DOCUMENTS

| 5,408,426 | A * | 4/1995 | Takewa et al. ............... 708/497 |
| 5,416,733 | A * | 5/1995 | Chen et al. .................. 708/493 |
| 6,779,012 | B2 * | 8/2004 | Matson et al. ............... 708/500 |
| 7,660,842 | B2 | 2/2010 | Ebergen et al. |
| 8,476,749 | B2 | 7/2013 | Drost et al. |
| 2008/0069337 | A1 * | 3/2008 | Gopal et al. .................... 380/28 |

OTHER PUBLICATIONS

Ebergen, Jo et al., "New Division Algorithms by Digit Recurrence", Thirty-Eight Asilomar Conference on Signals, Systems and Computers Asilomar, pp. 1849-1855, vol. 2, 2004.
Ercegovac, Milos D. et al., "Digital Arithmetic", Morgan Kaufman Publishing Inc., 2003.
Harris, David L. et al., "SRT Division Architectures and Implementations", Proceedings of the 13th Symposium on Computer Arithmetic, (ARITH '97), 1997.

(Continued)

*Primary Examiner* — Michael D Yaary
(74) *Attorney, Agent, or Firm* — Park, Vaughan, Fleming & Dowler LLP; Mark Spiller

(57) ABSTRACT

The disclosed embodiments disclose techniques for performing quotient selection in an iterative carry-save division operation that divides a dividend, R, by a divisor, D, to produce an approximation of a quotient, Q=R/D. During a divide operation, a divider approximates Q by iteratively selecting an operation to perform for each iteration of the carry-save division operation and then performing the selected operation. The operation for each iteration is selected based on the current partial sum bits of a partial remainder in carry-save form (rs) and the current partial carry bits of a partial remainder in carry-save form (rc). More specifically, the operation is selected from a set of operations that includes: (1) a 2X* operation; (2) an S1 & 2X* operation; (3) an S2 & 2X* operation; (4) an A1 & 2X* operation; and (5) an A2 & 2X* operation.

20 Claims, 64 Drawing Sheets

(56) References Cited

OTHER PUBLICATIONS

Jamadagni, Navaneeth, et al. "An Asynchronous Divider Implementation", IEEE 18th International Symposium on Asynchronous Circuits and Systems, 2012.

Liu, Wei et al., "Power Dissipation in Division," 2008 42nd Asilomar Conference on Signals, Systems and Computers, Oct. 2008, IEEE.

Montuschi, Paolo et al., "Over-Redundant Digit Sets and the Design of Digit-by-Digit Division Units" IEEE Transactions on Computers, vol. 43, No. 3, Mar. 1994. IEEE.

Oberman, Stuart et al., "Division Algorithms and Implementations", IEEE Trans. Comput., August.

Oberman, Stuart et al., "Design Issues in Division and Other Floating-Point Operations" IEEE Transactions on Computers, vol. 46, No. 2. Feb. 1997.

Robertson, James E., "A New Class of Digital Division Methods", IRE Transactions on Electronic Computers, 1958, IEEE.

Rust, Ingo et al., "A Radix-4 Single Precision Floating Point Divider Based on Digit Set Interleaving", Proceedings of 2010 IEEE International Symposium on Circuits and Systems (ISCAS) Jun. 2010, IEEE.

Srinivas, Hosahalli R. et al., "Radix 2 Division with Over-Redundant Quotient Selection" IEEE Transactions on Computers, vol. 46, No. 1, Jan. 1997.

Srivastava, Rust et al. "A Radix-4 SRT Division with Quotient Prediction and Operand Scaling", Design, Automation Test in Europe Conference Exhibition. Apr. 2007.

\* cited by examiner

PERFORMING QUOTIENT SELECTION FOR A CARRY-SAVE DIVISION OPERATION

RELATED APPLICATIONS

This application claims priority under 35 U.S.C. §119(e) to U.S. Provisional Application No. 61/703,715, entitled "Methods and Apparatuses for Improved Hardware Division," by Jo Ebergen and Navaneeth Jamadagni, filed on 20 Sep. 2012, the contents of which are herein incorporated by reference.

BACKGROUND

1. Field of the Invention

This disclosure generally relates to techniques for performing mathematical operations within computer systems. More specifically, this disclosure relates to techniques for efficiently performing hardware division in a computer system.

2. Related Art

In order to keep pace with continually increasing microprocessor clock speeds, computational circuitry within the microprocessor core must perform computational operations at increasingly faster rates. One of the most time-consuming computational operations that can be performed within a computer system is a division operation. A division operation involves dividing a dividend, R, by a divisor, D, to produce a resulting approximation of quotient, Q, wherein Q=R/D.

Computer systems often perform division operations using a variant of the SRT technique, which iteratively performs subtraction operations on a remainder to retire a fixed number of quotient bits in each iteration. (The SRT technique is named for Sweeny, Robertson and Tocher, who each independently developed the technique at about the same time.)

Unfortunately, each iteration of the SRT division technique involves performing addition and/or subtraction operations that require time-consuming carry-propagate additions and selection logic to decide which operations to perform. Hence, hardware implementations of the SRT division technique tend to be relatively slow.

Hence, what is needed is a method and an apparatus for performing a division operation that takes less time than the SRT technique.

SUMMARY

The disclosed embodiments disclose techniques for performing quotient selection in an iterative carry-save division operation that divides a dividend, R, by a divisor, D, to produce an approximation of a quotient, Q=R/D. During a divide operation, a divider approximates Q by iteratively selecting an operation to perform for each iteration of the carry-save division operation and then performing the selected operation. The operation for each iteration is selected based on the current partial sum bits of a partial remainder in carry-save form (rs) and the current partial carry bits of a partial remainder in carry-save form (rc). More specifically, the operation is selected from a set of operations that includes: (1) a "2X* operation;" (2) an "S1 & 2X* operation;" (3) an "S2 & 2X* operation;" (4) an "A1 & 2X* operation;" and (5) an "A2 & 2X* operation." These operations involve:

2X*—performing a left shift of rs and rc, inverting the most-significant bit of rs and rc, and then retiring a quotient digit 0;

S1 & 2X*—subtracting the divisor from rs and rc, performing a left shift of rs and rc, inverting the most-significant bit of rs and rc, and then retiring a quotient digit 1;

S2 & 2X*—subtracting twice the divisor from rs and rc, performing a left shift of rs and rc, inverting the most-significant bit of rs and rc, and then retiring a quotient digit 2;

A1 & 2X*—adding the divisor to rs and rc, performing a left shift of rs and rc, inverting the most-significant bit of rs and rc, and then retiring a quotient digit −1; and A2 & 2X*—adding twice the divisor to rs and rc, performing a left shift of rs and rc, inverting the most-significant bit of rs and rc, and then retiring a quotient digit −2.

Note that the actual sequence of operations performed in a given carry-save division operation depends on the values of the dividend and the divisor.

In some embodiments, the division operation includes an invariant $q*D+2^{-k}*r=R$, where q is the quotient computed after iteration k and the variable r is the partial remainder computed after iteration k. The partial remainder r is in redundant carry-save form such that r=rs+rc. Furthermore, the ranges for R and D are defined such that R lies in $[2^K, 2^{K+1})$ and D lies in $[2^K, 2^{K+1})$, where K for IEEE single and double precision floating point numbers may be equal to 0. In such embodiments, performing the division operation comprises selecting from the set of operations during each iteration of the carry-save division operation based on the values of rs and rc for the given iteration.

In some embodiments, the above-described set of five operations that are available for each iteration completely cover the possible combinations of rs and rc and facilitate substantially reducing the complexity of the quotient selection logic circuitry for the carry-save division operation.

In some embodiments, two signals are used to select the operation that will be performed for a given iteration of the carry-save division operation. The first signal is a two-bit signal that selects a multiple of D for a carry-save addition operation, while the second signal is a one bit signal that selects between the result for the carry-save addition operation and the result of a 2X* operation.

In some embodiments, rs[0] is the most significant bit of rs, rs[1] is the second-most significant bit of rs, rc[0] is the most significant bit of rc, and rc[1] is the second-most significant bit of rc. In this context, calculating the first signal involves calculating $(rs[0] \cdot \overline{rs[1]} \cdot \overline{rc[1]}) | (\overline{rs[0]} \cdot rs[1] \cdot rc[1])$ and $\overline{rs[0]}$, and calculating the second signal involves calculating a value for $rs[0] \oplus rc[0]$ (i.e., an exclusive-or of rs[0] and rc[0]).

In some embodiments, the latency for each iteration of the carry-save division operation is the sum of: (1) the delay associated with a four-input multiplexer that multiplexes the values −2D, 2D, −D, and D; (2) the delay associated with a carry-save adder that operates upon the output of the four-input multiplexer; (3) the delay associated with a two-input multiplexer that multiplexes the output of the carry-save adder and the result of the 2X* operation; (4) the delay associated with the quotient selection logic that calculates the first signal and the second signal; and (5) the delay associated with a set of flip-flops that store the intermediate results for the given iteration.

In some embodiments, the divisor is scaled to match the range of the divider that is performing the carry-save division operation.

In some embodiments, the divider performing the carry-save division operation is a variable-iteration divider, and the set of operations is expanded to include one or more of:

a "4X* operation," which performs a left shift of rs and rc, performs a second left shift of rs and rc, inverts the most-significant bit of rs and rc, and then retires two quotient digits 00 a "4X operation," which performs a left shift of rs and rc, performs a second left shift of rs and rc, and then retires two quotient digits 00;

an "8X* operation," which repeats the operation 2X* three times, thereby retiring three quotient digits 000;

an "A1 & 4X* operation," which performs an A1 & 2X* operation followed by a 2X* operation, thereby first retiring a quotient digit −1 and then retiring a quotient digit 0;

an "A2 & 4X* operation," which performs an A2 & 2X* operation followed by a 2X* operation, thereby first retiring a quotient digit −2 and then retiring a quotient digit 0;

an "S1 & 4X* operation," which performs an S1 & 2X* operation followed by a 2X* operation, thereby first retiring a quotient digit 1 and then retiring a quotient digit 0; and an "S2 & 4X* operation," which performs an S2 & 2X* operation followed by a 2X* operation, thereby first retiring a quotient digit 2 and then retiring a quotient digit 0.

In some embodiments, the set of operations is 2X*, S1 & 2X*, S2 & 2X*, A1 & 2X*, A2 & 2X*, and 4X*.

In some embodiments, the set of operations is 2X*, S1 & 2X*, S2 & 2X*, A1 & 2X*, A2 & 2X*, 4X, and 4X*.

In some embodiments, the set of operations is 2X*, S1 & 2X*, S2 & 2X*, A1 & 2X*, A2 & 2X*, 4X*, and 8X*.

In some embodiments, the set of operations is 2X*, S1 & 2X*, S2 & 2X*, A1 & 2X*, A2 & 2X*, 4X, 4X*, and 8X*.

In some embodiments, the set of operations is 2X*, S1 & 2X*, S2 & 2X*, A1 & 2X*, A2 & 2X*, 4X*, A1 & 4X*; A2 & 4X*; S1 & 4X*; and S2 & 4X*.

In some embodiments, the set of operations is 2X*, S1 & 2X*, S2 & 2X*, A1 & 2X*, A2 & 2X*, 4X, 4X*, A1 & 4X*; A2 & 4X*; S1 & 4X*; and S2 & 4X*.

In some embodiments, the set of operations is 2X*, S1 & 2X*, S2 & 2X*, A1 & 2X*, A2 & 2X*, 4X, 4X*, 8X*, A1 & 4X*; A2 & 4X*; S1 & 4X*; and S2 & 4X*.

DETAILED DESCRIPTION

Figure 1:
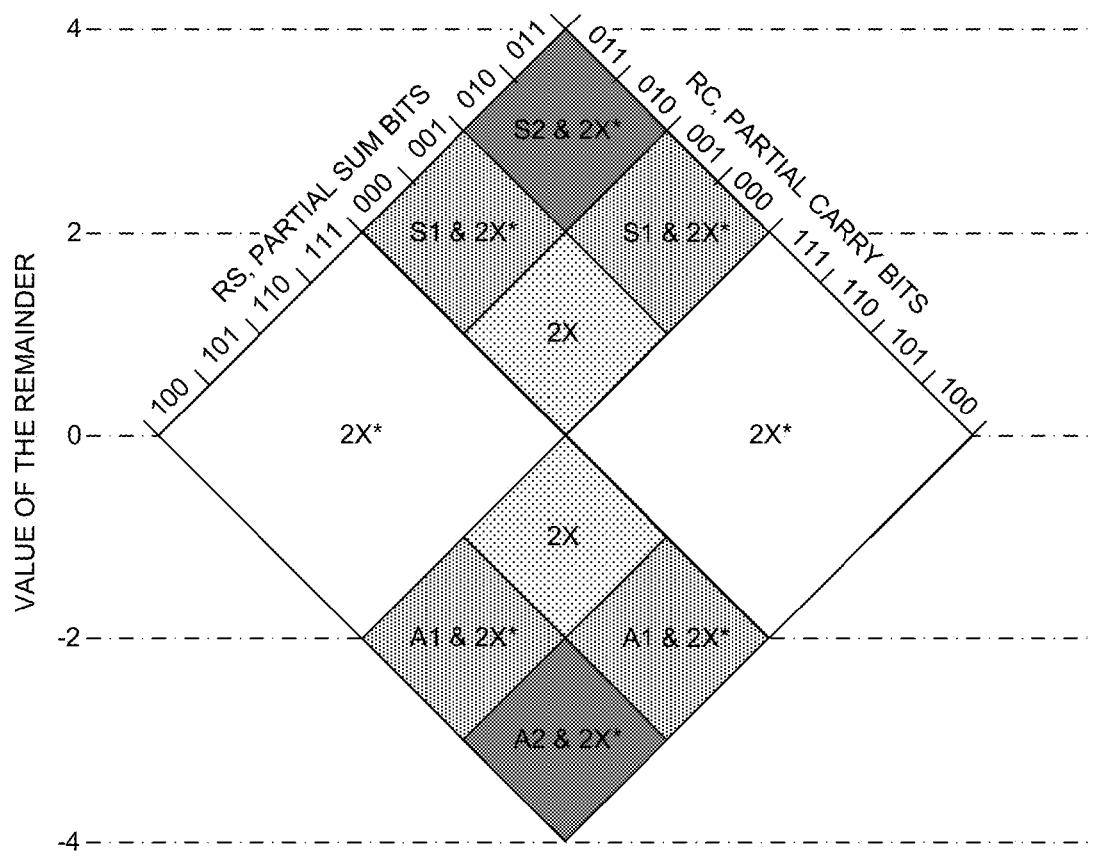
FIG. 1 illustrates the set of alternatives considered by a division technique that retires one quotient digit per iteration in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

1.0 Improving Division Techniques

Division is one of the most complex and the slowest arithmetic operations performed in microprocessors. Although division occurs less frequently than other arithmetic operations, having an efficient divider is necessary for a good system performance—sometimes a number of instructions may be forced to wait on the result of a division operation, which can have a substantial impact on instruction throughput.

There are multiple techniques that are available to implement division in hardware. Such techniques can be broadly classified into subtractive techniques and multiplicative techniques. The digit-recurrence (i.e., subtractive) SRT division technique is the technique that is most frequently implemented in general purpose processors. A standard radix-2 SRT technique with carry-save addition executes one of three alternatives in each iteration. These three alternatives are: (2r+D), (2r+0), and (2r+(−D)), where r is the partial remainder in carry-save form, D is the divisor, and the + operator is a carry-save addition. For each operation, the SRT technique selects a corresponding quotient digit from the digit set $\{-1, 0, 1\}$. Typically, the selection of an alternative and a quotient digit relies on the four most significant bits of the partial remainder in carry-save form. A radix-2 SRT division always retires one quotient digit per iteration.

In some implementations, the latency of an SRT implementation barely fits within one clock cycle, and can become a bottleneck in achieving timing closure for a processor chip. Consequently, obtaining a division implementation with a smaller latency is important.

Some embodiments of the present invention involve speeding up division operations by reducing the latency per iteration and/or by reducing the number of iterations per division. There are several ways to reduce the latency per iteration. For instance, some of the disclosed division techniques reduce the latency per iteration by simplifying the quotient selection logic. Other division techniques use operand scaling and quotient prediction to reduce the latency per iteration. Alternatively, another set of division techniques can speed up division by retiring a variable number of quotient digits per iteration, where the number of digits retired depends on the values of the input operands. Such variable-latency division techniques can reduce the average latency per division by reducing the average number of iterations per division.

1.1 Division Overview

Division techniques compute Q=R/D, where R is the dividend, D is the divisor, and Q is the quotient. The disclosed hardware implementations make several assumptions about the ranges of R and D, which are binary numbers with fractional bits. More specifically, it is assumed that:

$$R \in [2^K, 2^{K+1}) \tag{1}$$

$$D \in [2^K, 2^{K+1}) \tag{2}$$

For IEEE single and double precision floating point numbers, we may choose K=0. The number of fractional or mantissa bits, L, in a floating point number determines the number of iterations per division. For IEEE single precision floating point numbers, L=23, and for IEEE double precision floating point numbers, L=52. To satisfy IEEE 754 standards, division techniques need to compute K+L+4 quotient bits per division. The below-described techniques consider double precision numbers, and hence compute 56 quotient digits. As mentioned above, some division techniques may produce variable numbers of quotient bits per iterations.

Consider an initial division technique (referred to as division technique #1) that always retires one quotient digit per iteration, and therefore takes a fixed number of iterations to complete division; e.g., division technique #1 takes 56 iterations to compute 56 quotient digits. Every iteration, this technique executes one of six alternatives (2X, 2X*, S1 & 2X*, S2 & 2X*, A1 & 2X*, and A2 & 2X*) based on values of rs and rc, where rs and rc are the sum and the carry bits of the partial remainder, r, in carry-save form, respectively. The value of the partial remainder r=rs+rc, and an invariant for the following division techniques is $q*D+2^{-k}*r=R$. FIG. 1 illustrates the six alternatives in the rs and rc plane. Notice that the illustration in FIG. 1 is rotated 45 degrees, so that the horizontal lines show the actual value of the remainder. The actions corresponding to the six alternatives are:

2x: left shift rs and rc by 1. The technique retires quotient digit 0.

2X*: actions of the 2X alternative, followed by the inversion of the most significant bit of rs and rc. The technique retires quotient digit 0.

S1 & 2X*: subtract divisor D from rs and rc, followed by the actions of the 2X* alternative. The technique retires quotient digit 1.

S2 & 2X*: subtract twice the divisor, 2*D, from rs and rc, followed by the actions of the 2X* alternative. The technique retires quotient digit 2.

A1 & 2X*: add divisor D to rs and rc, followed by the actions of the 2X* alternative. The technique retires quotient digit −1.

A2 & 2X*: add twice the divisor, 2*D, to rs and rc, followed by the actions of the 2X* alternative. The technique retires quotient digit −2.

The following sections describe different aspects of improving hardware division in more detail, and build further upon the above-described actions and operations. More specifically, the following sections include:

a description of divisor scaling techniques and a range of embodiments for variable-iteration division techniques that involve scaled divisors and dividends;

a description of the effect of divisor scaling on performance, and comparisons of a range of embodiments of variable-iteration division techniques;

techniques for optimizing the quotient selection logic for a divider;

a range of division techniques that are tailored towards small divisors; and a description of a split division circuit that can split division operands across multiple divider implementations based on the range of the divisor.

Note that the below-described division techniques are also digit recurrence techniques, but differ from SRT division techniques in that they choose each quotient bit from the redundant set $\{-2, -1, 0, 1, 2\}$; each digit of the quotient receives one of these five values, which are then mapped ("normalized") into a final result (e.g., either at the end of the division operation or on-the-fly). Note also that the disclosed techniques compute one extra quotient bit per division. The reason for this extra bit computation is that the error in the computed quotient is at most a factor of two larger than for SRT division.

2.0 Divisor Scaling Techniques

In some embodiments, division techniques can reduce the number of iterations needed to compute the quotient of a division by scaling the divisor or by introducing more alternative actions based on the inspection of three, rather than two, of the most-significant bits of the remainder in carry-save form. Such techniques may compute one to three quotient bits in each iteration step, resulting in division techniques that have a variable latency depending on the actual values of the dividend and divisor. Note that some of these techniques have a smaller average latency when the divisor is from a specific range. To make sure that a divisor is always from a specific range, one can multiply the divisor with a constant so that the resulting divisor is in the specific range. In order to obtain the same quotient, the dividend must be multiplied also with the same constant. Such operations are called "scaling the divisor."

Consider a division operation in which the divisor satisfies $D \in [1, 2)$ and is of the form $D=01.x$ in 2's complement representation, with x representing the fractional bits of the divisor. If one knows the first bit of x, can one improve a division technique? For example, will a given division technique take fewer iterations on average if the first bit of x is 1? Does knowing the first two bits of x allow one to improve a division operation by further reducing the average number of iterations?

In order to answer these questions, one needs to reconsider the transformations that occur when adding or subtracting divisor D. For instance, consider what happens when D is subtracted from a point in region S1 of FIG. 2. The calculation for the three most significant bits of a number is as follows. In order to take into account what happens with leading bits after a left shift, one considers one extra bit position in the non-fractional part. Whereas normally the divisor is represented as $D=01.x$, where x represents the fractional bits of x, for this investigation D is represented as $D=001.x$. Consequently, $-D$ is represented by the bit-wise complement of D plus 1 at the least significant bit position, i.e., $-D=110.y+1$, where y is the bit-wise complement of x. Recall furthermore that in the carry-save representation of the partial remainder, the majority bits, also called the carry bits, have been shifted one position to the left. Because of the left shift by 1, the least significant bit of the majority bits is always 0. By changing this to 1, one can account for the +1 in the 2's complement addition of $-D$.

Assume that the first bit of x is c, $$D=001.c\ldots$$

For region S1, one gets the following calculation when one subtracts D:

| | |
|---|---|
| r0 | 000.a |
| r1 | 001.b |
| -D | 110.d + 1 |
| parity | 111 |
| majority | 00y | where d is the complement of c, i.e., $d=c'$. The value of y satisfies $$y=maj(a,b,d)=maj(a,b,c)$$

Figure 2:
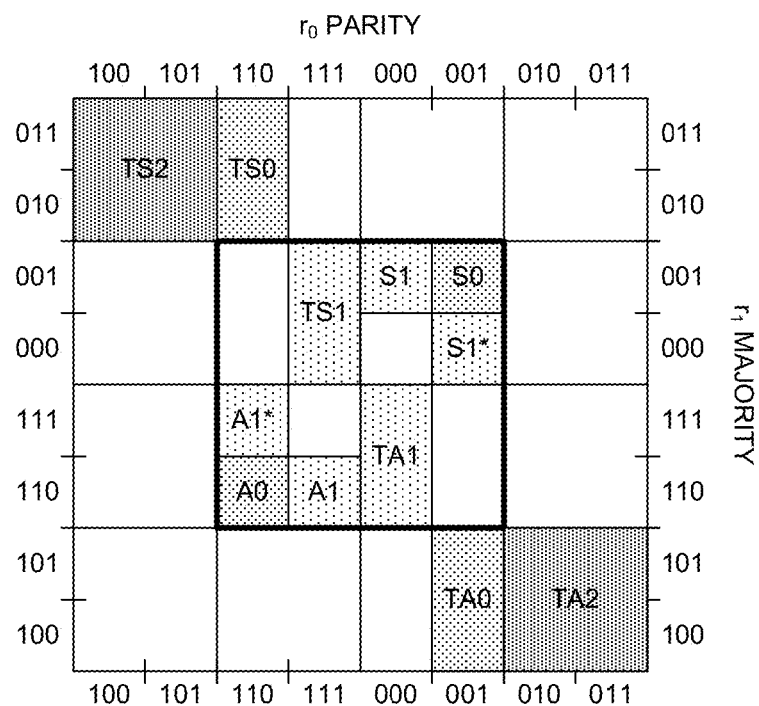
FIG. 2 illustrates the effects of carry-save addition when subtracting a divisor D in accordance with an embodiment.

Consequently, subtracting D from a point in the region S1 yields a point in the region TS1 in FIG. 2. For reasons of symmetry, subtracting D from a point in region S1* also yields a point in region TS1.

Adding D to a point in region A1 or A1* yields a point in region TA1. The calculation for A1 when adding D is:

| | |
|---|---|
| r0 | 111.a |
| r1 | 110.b |
| +D | 00.1.c |
| parity | 000 |
| majority | 11y | where $y=maj(a,b,c)$.

If one knows the value of c in the bit representation of $D=001c\ldots$, what can one conclude for the transformation above? For $c=1$, for areas S1 and S1*, one has:

$$y=maj(a,b,c')=maj(a,b,0)=\text{and}(a,b)$$

If $c=0$, then $$y=maj(a,b,c')=maj(a,b,1)=\text{or}(a,b)$$

Figure 3:
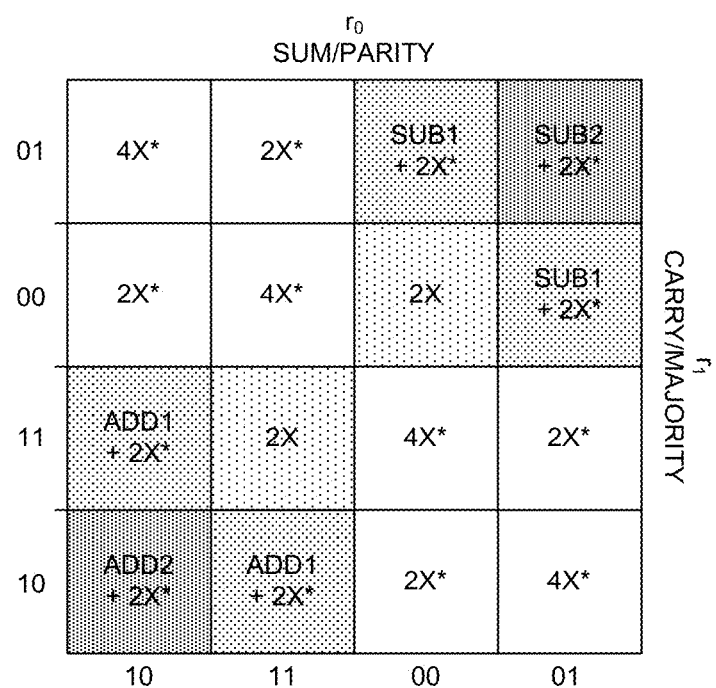
FIG. 3 illustrates the operations to be performed during a division operation when a set of $(r_0, r_1)$ values are in the bold inner square illustrated in FIG. 2 in accordance with an embodiment.

The bold inner square illustrated in FIG. 2 corresponds to the square illustrated in FIG. 3, which illustrates, for each of its smaller squares, the operations that apply when the remainder $(r_0, r_1)$ falls in that particular square. The area TS1 in FIG. 2 covers the squares 2X* and 4X* in FIG. 3. If $y=0$, then the subtraction lands in square 4X*, rather than 2X*, where operation 4X* performs a shift by 2 and an inversion of the most significant bit. If $y=1$, then the subtraction lands in square 2X*, which leads to only one shift. Consequently, $y=0$ is preferred because it leads to more shifts and fewer iterations in the division technique.

For areas A1 and A1*, for $c=1$, $$y=maj(a,b,c)=maj(a,b,1)=\text{or}(a,b)$$

If $c=0$, then $$y=maj(a,b,c)=maj(a,b,0)=\text{and}(a,b)$$

In area TA1, $y=1$ is preferred, because then the 4X* operation can be applied. For $y=0$, the technique can apply the operation 2X*.

Figure 4:
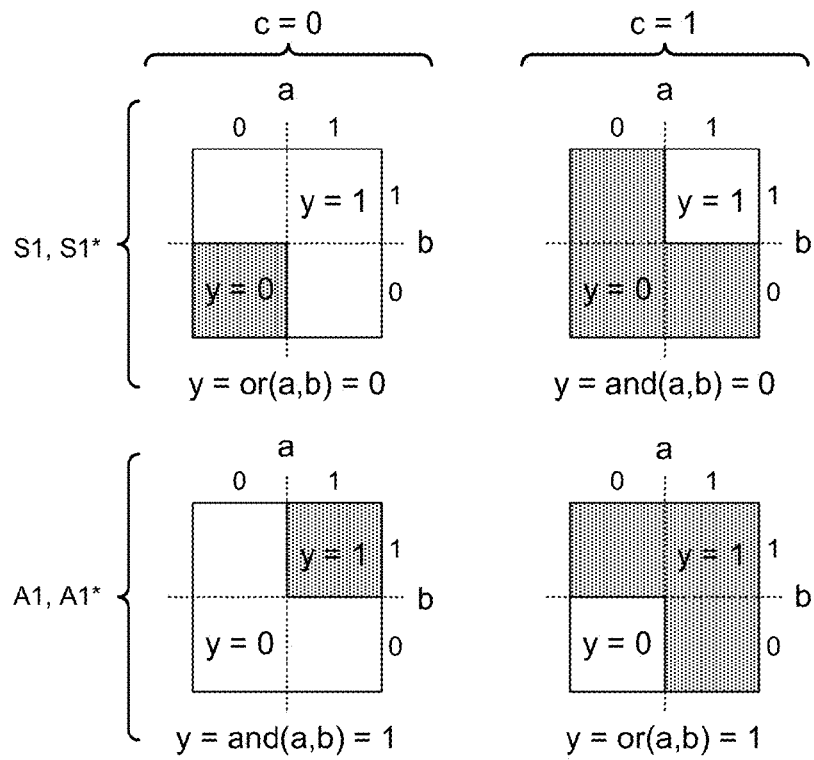
FIG. 4 illustrates the areas in the S1, S1*, A1, and A1* alternatives that have the values for a and b leading to a 4X* and a 2X* operation in accordance with an embodiment.

FIG. 4 illustrates the areas in S1, S1*, A1, and A1* that have the values for a and b leading to a 4X* operation (e.g., the grey areas) and the areas with values for a and b leading to a 2X* operation (e.g., the white areas). The grey areas are larger when $c=1$ than when $c=0$. If a larger area means that there is a larger probability of the remainder landing in this area, then this result means that divisors with $c=1$ will lead to more shifts of type 4X* in the division technique than divisors with $c=0$.

2.1 Subtracting or Adding 2D

Consider S0 and subtraction by 2D. The calculation for the subtraction of 2D from any point in S0 in FIG. 2 is as follows. First, recall that in a two's complement representation, $D=001.cd$, thus $2D=01c.d.0$, and $-2D$ is represented by the bit-wise complement of 2D plus 1 at the least-significant bit position, i.e., $-2D=10e.f\ldots+1$, where $e=c'$ and $f=d'$.

| | |
|---|---|
| r0 | 001.a |
| r1 | 001.b |
| -2D | 10e. f +1 |
| parity | 10y |
| majority | 01z |

As a consequence, subtracting 2D from any point in region S0 is a point in region TS2 of FIG. 2. The division technique translates region TS2 to quadrant 2 of the bold inner square in FIG. 2, which corresponds to the square in FIG. 3. Where the remainder $(r_0, r_1)$ lands in quadrant 2 of FIG. 3 depends on the values of the 2nd and 3rd bit of the parity and majority, $r_0=10y$ and $r_1=01z$. In order to 1 and in a 4X* square, $y \neq z$ is preferred.

Consider what this means for choosing bit d. The previous section showed that the best choice for c is c=1. Consequently, e=c'=0 and y=0. Regarding a best choice for d, for d=1, f=d'=0 and $$z=maj(a,b,f)=maj(a,b,0)=\text{and}(a,b)$$

If d=0, then f=d'=1, and $$z=maj(a,b,f)=maj(a,b,1)=\text{or}(a,b)$$

Figure 5:
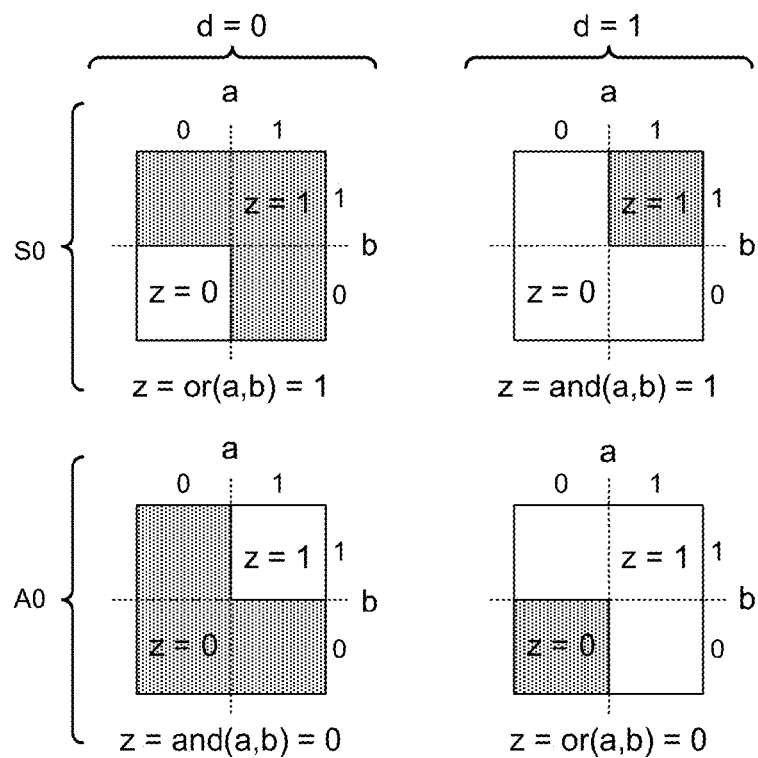
FIG. 5 illustrates the areas in the S0 alternative that have the values for a and b leading to a 4X* operation in accordance with an embodiment.

FIG. 5 illustrates the areas of square S0 where z=1 in cases where d=0 and d=1. It is desirable to have the grey areas (e.g., the areas where $y \neq z$) to be as large as possible in order to increase the probability of performing a 4X* operation. FIG. 5 indicates that d=0 thus is the preferable choice.

Next, consider area A0 and adding 2D:

|          |        |
|----------|--------|
| r0       | 110.a  |
| r1       | 110.b  |
| +2D      | 01c.d  |
| parity   | 01y    |
| majority | 10z    |

As a consequence, subtracting 2D from any point in region A0 is a point in region TA2 of FIG. 2.

As before, one can take c=1, and then c=1=y. Regarding a best choice for d, for d=1, $$z=maj(a,b,d)=maj(a,b,1)=\text{or}(a,b)$$

If d=0, then $$z=maj(a,b,d)=maj(a,b,0)=\text{and}(a,b)$$

The bottom row in FIG. 5 illustrates the areas $y \neq z$; d=0 is again the preferred choice.

Figure 6:
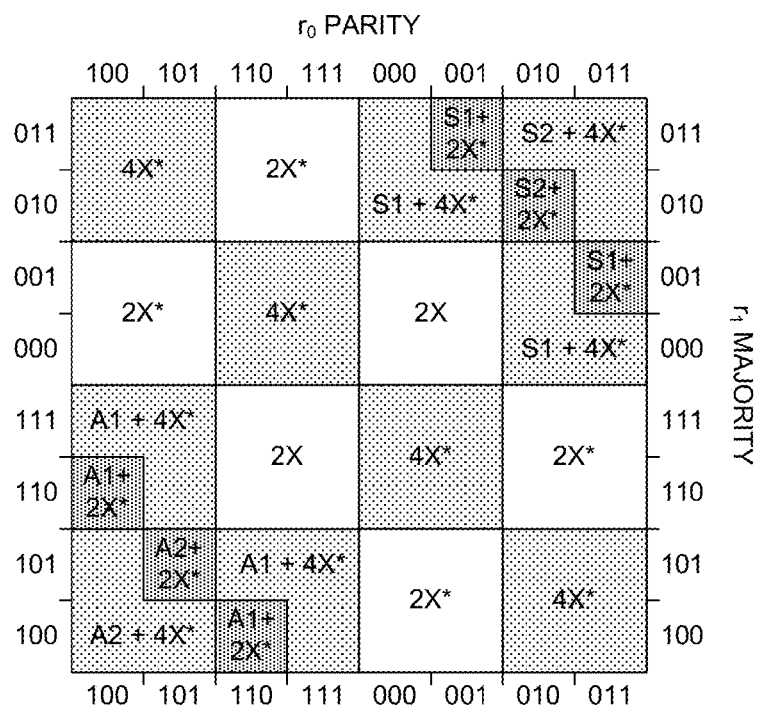
FIG. 6 illustrates the operations to be performed when $(r_0, r_1)$ is in the respective region of the $(r_0, r_1)$ space given that a divisor D satisfies D=01.10 . . . in accordance with an embodiment.

This analysis of the leading bits of D leads to the conclusion that a good choice for D is D=01.10 . . . (which omits an extra leading 0). FIG. 6 illustrates the regions of the square for D=01.10 . . . , and the operations that can be performed in each region.

2.2 Adding 4X and 8X* Alternatives

Figure 7:
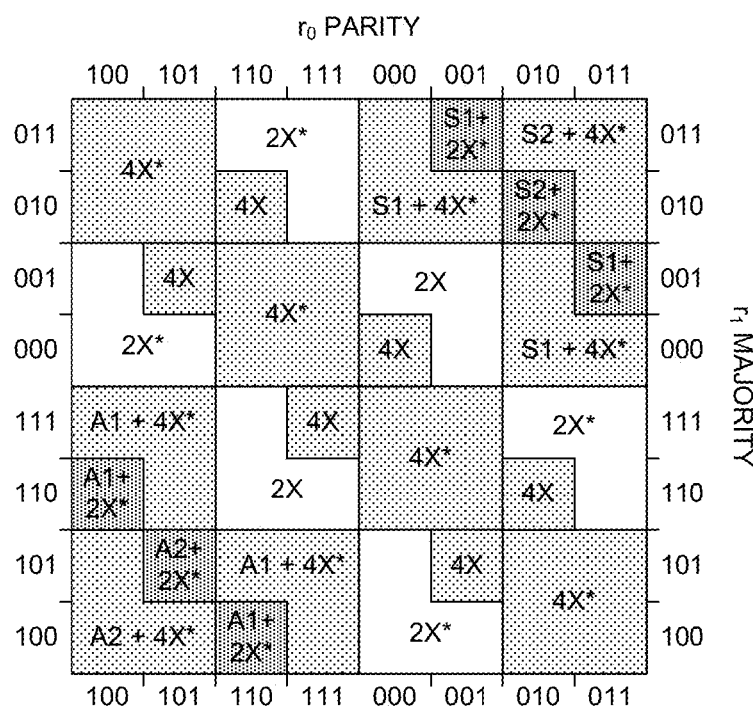
FIG. 7 illustrates the $(r_0, r_1)$ space for a division technique that includes a 4X operation in accordance with an embodiment.
Figure 8:
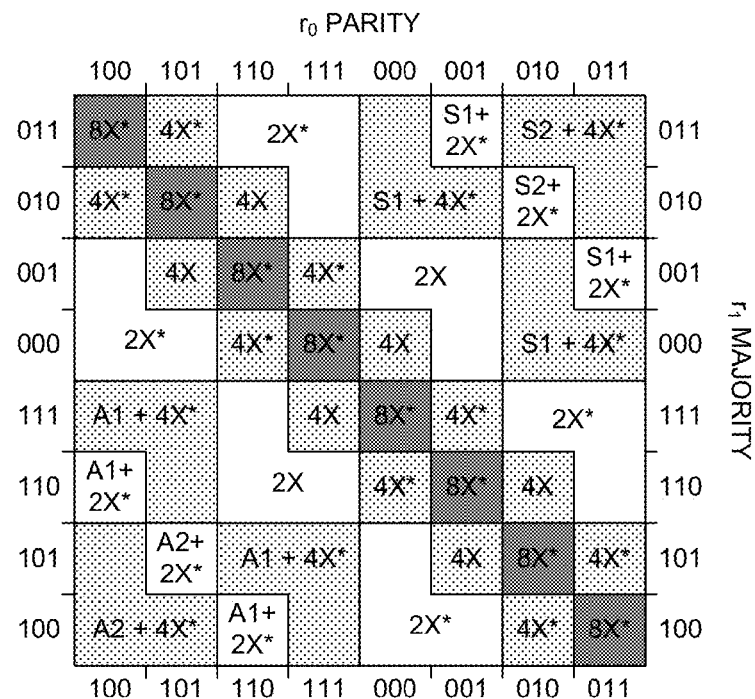
FIG. 8 illustrates the $(r_0, r_1)$ space for a division technique that includes an 8X* operation in accordance with an embodiment.

Selection logic that can inspect three rather than two leading digits of a partial remainder facilitates further optimizations for division techniques. For example, there may be small squares where the division technique can perform a 4x operation and still maintain the same set of desired invariants. FIG. 7 illustrates a number of such regions (that are labeled "4X"). Similarly, such extrapolations also allow the addition of an 8X* alternative (illustrated in FIG. 8) that also maintains the desired invariants. When using 8X* regions, the division circuit uses the three leading bits of the partial sum and partial carry bits to determine the action that will be taken; in general, looking at a larger number of bits facilitates reducing the average number of iterations for a division operation, but also increases the complexity of the quotient selection logic, thereby increasing the latency for each iteration.

Figure 9:
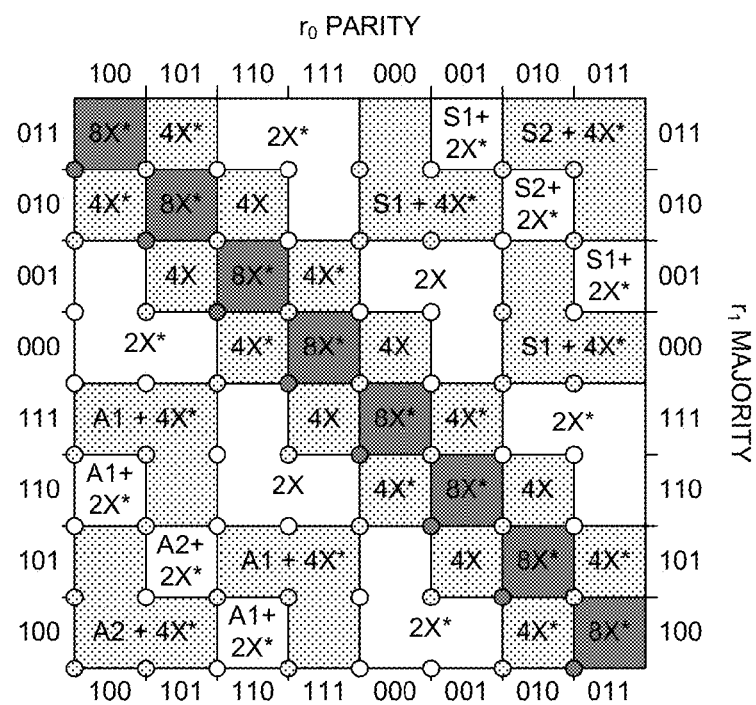
FIG. 9 illustrates the association between regions and grid points for the $(r_0, r_1)$ space illustrated in FIG. 8 in accordance with an embodiment.

Note that for each of the small regions illustrated (e.g., in FIGS. 6-9), the lower bounds are included whereas the upper bounds are excluded. Consequently, if one considers all the grid points in the $(r_0, r_1)$ space, where each truncated value for $r_0$ and $r_j$ consists of three bits, one can determine to which region this point belongs. FIG. 9 illustrates the grid points and the region to which each grid point belongs in the context of FIG. 8 (e.g., grid points belong to the region with the same shading as the grid point). Note that a number of grid points that have the same color form diagonals, but that there are also a number of grid points of the same shade that are not diagonals. In contrast, SRT techniques make a selection for the next quotient digit based on the value of the sum of the most significant four bits of $r_0$ and $r_1$, which means that all grid points that lead to the same selection are always on a diagonal.

2.3 Scaling the Divisor

The previous sections show how a divisor that is of the form D=01.10 . . . may save a number of iterations. In general, divisors are in the range D∈[1, 2), and are not necessarily of the form D=01.10 . . . (which corresponds to values in the range [1.5, 1.75)). Scaling a divisor into the form D=01.10 . . . involves finding a value M so that M*D= 01.10 . . .

Scaling a divisor involves also scaling the remainder in the same way. The quotient is calculated as $$Q=C*R/D=C*(M*R)/(M*D)$$

Finding M and calculating M*D and M*R can be achieved with at most three addition operations. Although M*D is in the range [1.5, 1.75), M*R may be outside the range [−1, 2). In this case, one can divide M*R by 2 (e.g., perform a right shift of M*R, and adjust the exponent of the quotient). A second alternative is to replace C by C*M. This may not be a good alternative for the same reasons (e.g., C*M may be outside of the range [1,2)). Another reason that this may be a non-ideal choice is that that the implementation of the divider may be simpler for C=1.

To determine a value of M such that M*D∈[1.5, 1.75), consider appropriate values for M for a number of ranges for the value D:

If D∈[1, 1.125) then take M=1.5, which results in M*D∈ [1.5, 1.6875);

If D∈[1.125, 1.25) then take M=1.375, which results in M*D∈[1.546, 1.719);

If D∈[1.25, 1.375) then take M=1.25, which results in M*D∈[1.5625, 1.71875);

If D∈[1.375, 1.5) then take M=1.125, which results in M*D∈[1.546875, 1.6875);

If D∈[1.5, 1.75) then take M=1, which results in M*D∈[1.5, 1.75);

If D∈[1.75, 2) then take M=0.875, which results in M*D∈ [1.53125, 1.75).

All of these result ranges are within the range [1.5, 1.75).

The multiplications with M can be implemented by adding certain right shifts of D based on which range D belongs to. The range to which D belongs can be found by inspecting the first few bits of D:

If D=01.000x then $M*D=1*D+2^{-1}*D$;

If D=01.001x then $M*D=1*D+2^{-2}*D+2^{-3}*D$;

If D=01.010x then $M*D=1* D+2^{-2}*D$;

If D=01.011x then $M*D=1*D+2^{-3}*D$;

If D=01.10x then $M*D=1*D$;

If D=01.11x then $M*D=2^{-1}*D+2^{-2}*D+2^{-3}*D$ or $1*D-2^{-3}*D$.

A division implementation can apply substantially similar additions to compute M*R.

Having a divisor in the range [1.5, 1.75) facilitates saving a number of iterations in the division technique. The cost of these savings is the computation of the scaled divisor and dividend; this cost is at most two additions and some shifts for D and R. Of course, performing such scaling is only worthwhile if the extra savings outweigh the cost of scaling the divisor and dividend. Subsequent sections discuss such performance trade-offs in more detail.

3.0 Variable-Latency Division Techniques

The above-described techniques reduce the average number of iterations per division by adding more alternatives per iteration or by scaling the divisor to a known interval before doing the division. Adding more alternatives may increase the complexity of the quotient selection logic that determines the correct alternative to execute in each repetition step. The addition of alternatives and increased complexity in the quotient selection logic increases the latency per iteration, which can have significant impact on the average latency per division. This section explores the latency per iteration for a range of division techniques, as well as the effect of latency per iteration on the average latency of a division operation.

Figure 10:
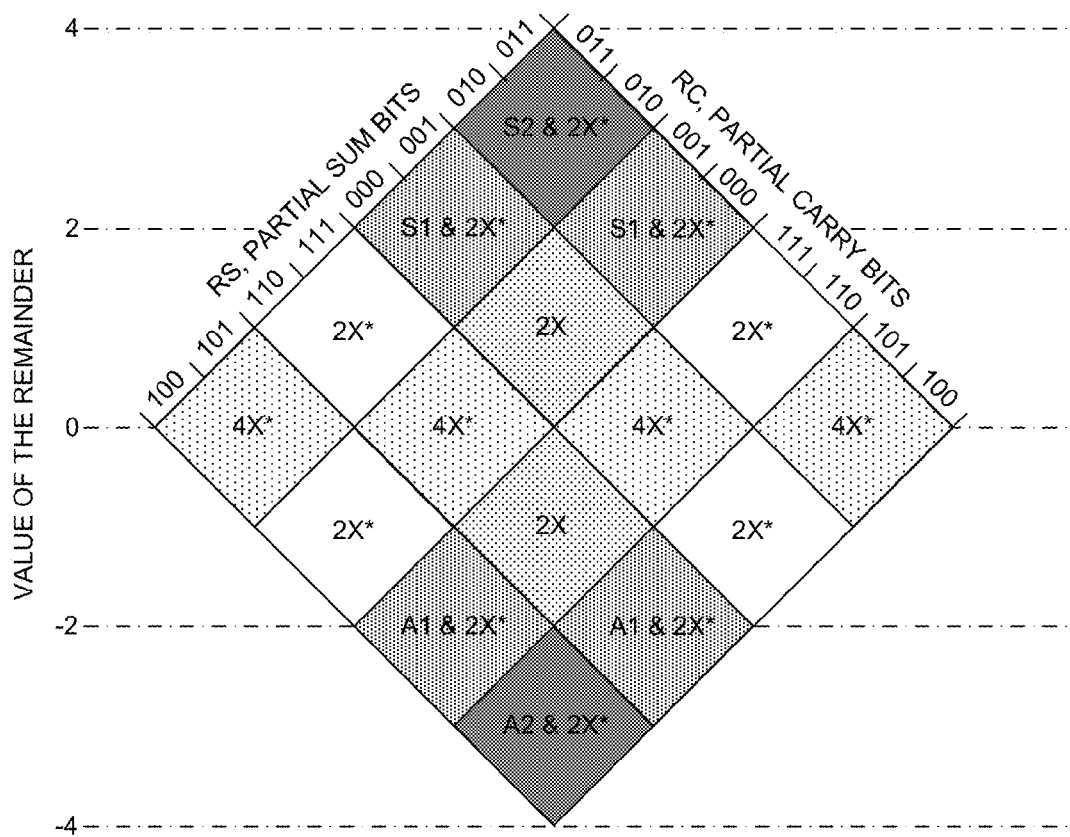
FIG. 10 illustrates the alternatives for division technique #2 in the rs and rc plane in accordance with an embodiment.

The comparisons in this section build upon division technique #1, which was described in section 1.1. A second division technique, division technique #2, adds a 4X* alternative to technique #1, where the 4X* alternative executes the actions of the 2X* alternative twice. Technique #2 executes one of the following seven alternatives in every iteration: 2x, 2X*, 4X*, S1 & 2X*, S2 & 2X*, A1 & 2X*, or A2 & 2X*. FIG. 10 illustrates these alternatives in the rs and rc plane. When technique #2 executes the 4X* alternative, the technique retires two quotient digits, namely "00". Because technique #2 retires one or two quotient digits per iteration, the number of iterations to complete a division varies. Simulations indicate that when the divisor D∈[1.5, 2), the average number of iterations per division reduces to 46.6, whereas when D∈[1, 1.5), the average number of iterations per division increases to 51. On average, technique #2 needs 48.8 iterations to compute 56 quotient digits.

Figure 11:
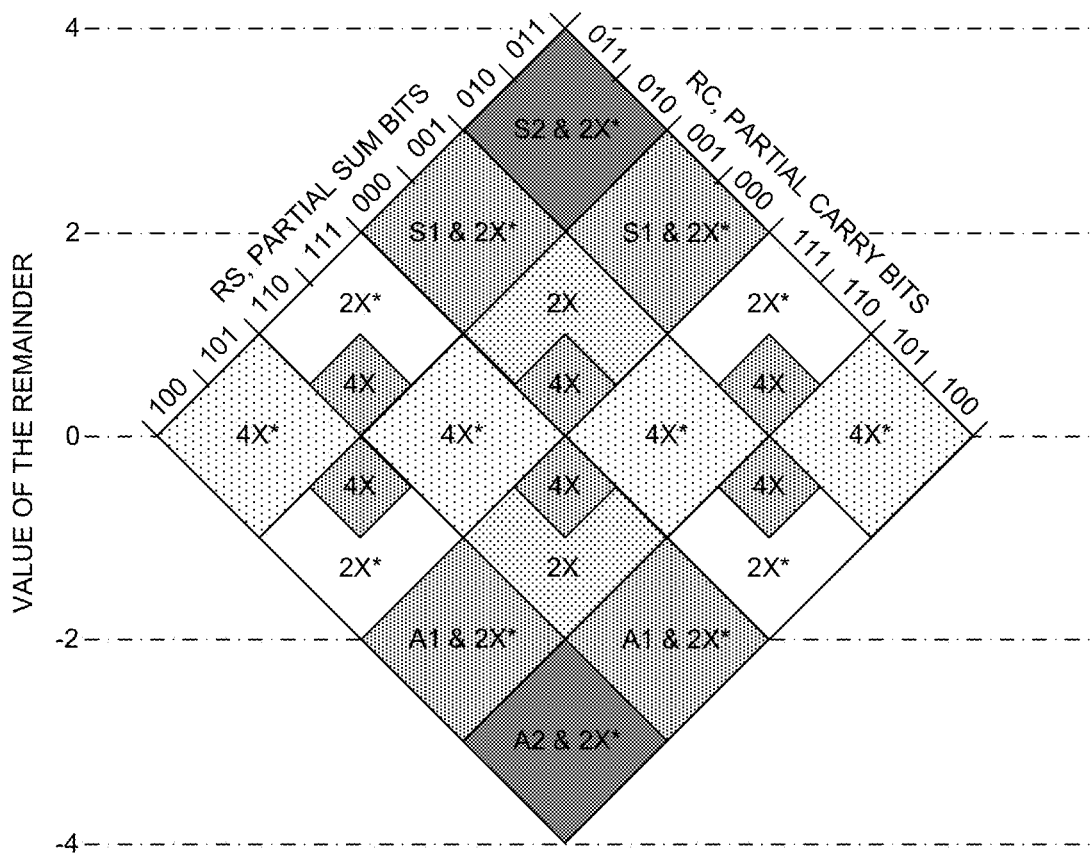
FIG. 11 illustrates the alternatives for division technique #3 in the rs and rc plane in accordance with an embodiment.

Technique #3 adds a 4x alternative to technique #2, where the 4X alternative executes the actions of the 2X alternative twice. Technique #3 executes one of the following eight alternatives in every iteration: 2X, 4X, 2X*, 4X*, S1 & 2X*, S2 & 2X*, A1 & 2X*, and A2 & 2X*; FIG. 11 illustrates these alternatives in the rs and rc plane. In the 4X and 4X* regions, the technique retires two quotient digits, namely "00". Simulations indicate that when the divisor D∈[1, 2), technique #3 takes 45.2 iterations on average to compute 56 quotient digits. When D∈[1.5, 2), technique #3 takes 42.7 iterations on average to compute 56 quotient digits.

Figure 12:
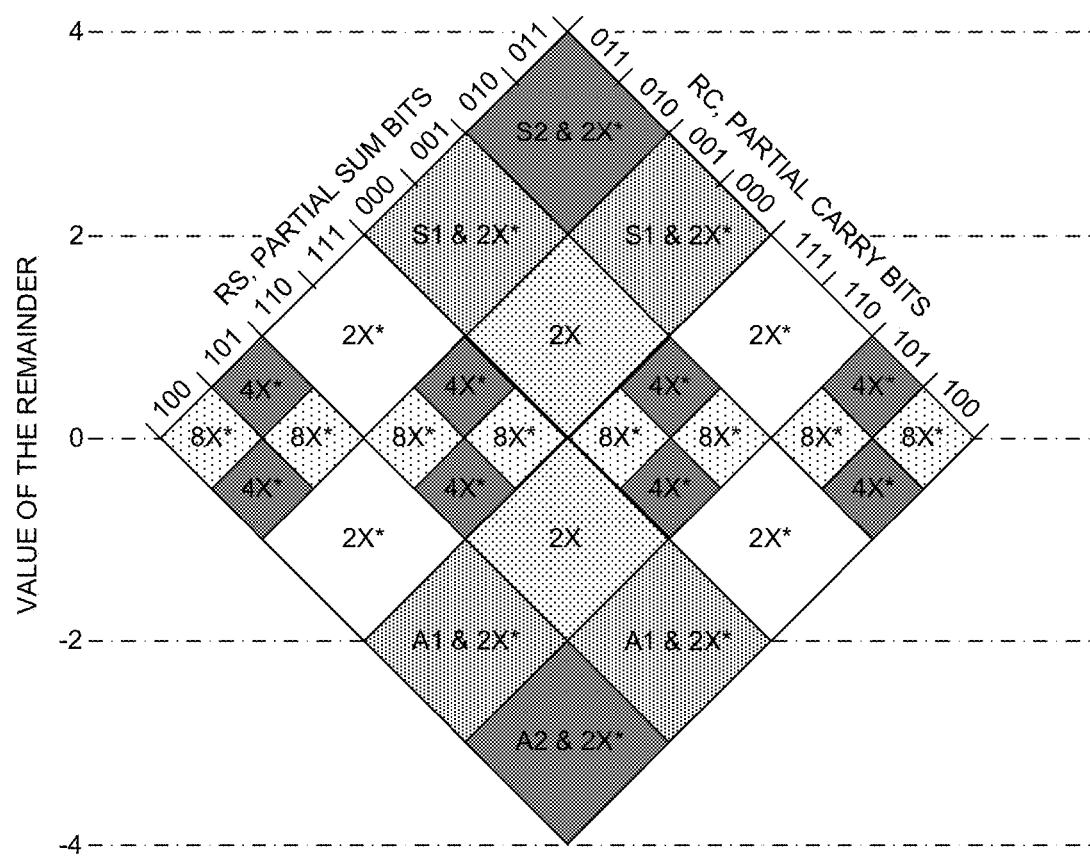
FIG. 12 illustrates the alternatives for division technique #4 in the rs and rc plane in accordance with an embodiment.

Division technique #4 adds an 8X* alternative to technique #2, where the 8X* alternative executes the actions of the 2X* alternative three times. Like technique #3, technique #4 also has eight alternatives: 2x, 2X*, 4X*, 8X*, S1 & 2X*, S2 & 2X*, A1 & 2X*, and A2 & 2X*; FIG. 12 illustrates these alternatives in the rs and rc plane. In 8X* regions, the technique retires three quotient digits, namely "000"; thus, technique #4 can retire one, two, or three quotient digits per iteration. Simulations indicate that when D∈[1, 2), technique #4 takes 46.7 iterations on average to compute 56 quotient digits. When D∈[1.5, 2), technique #4 takes 43.9 iterations on average to compute 56 quotient digits.

Figure 13:
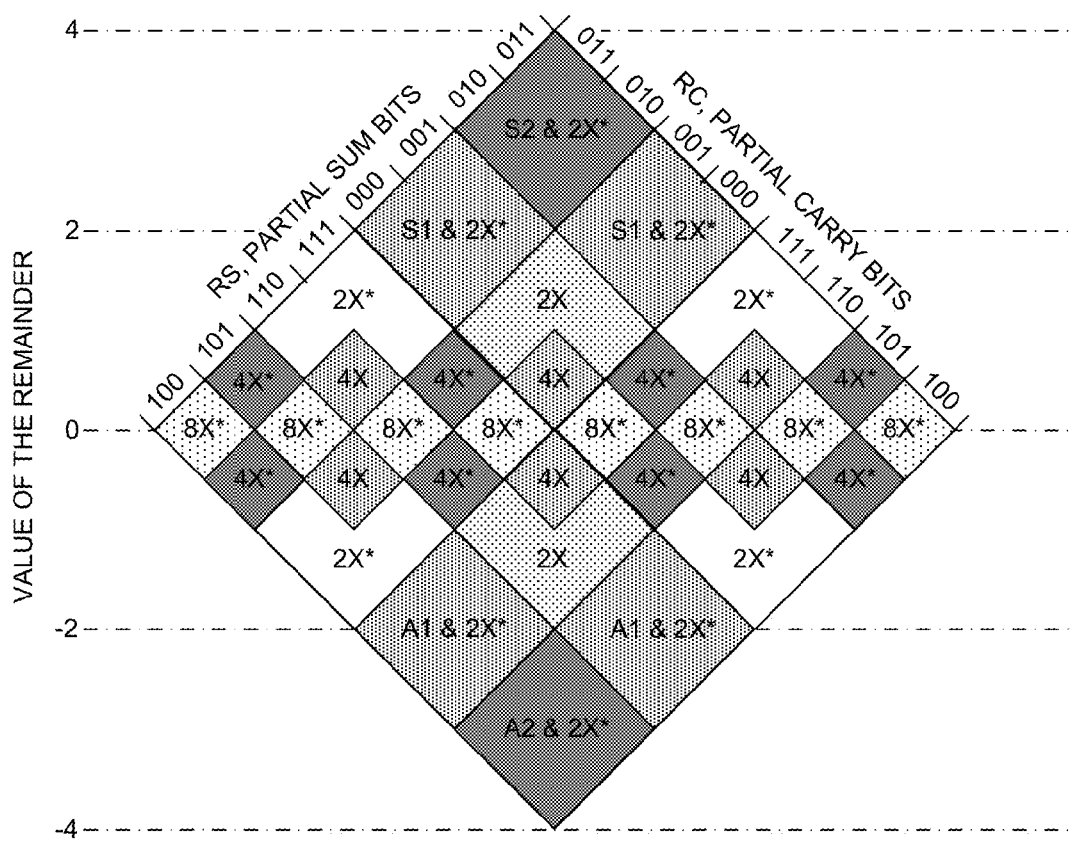
FIG. 13 illustrates the alternatives for division technique #5 in the rs and rc plane in accordance with an embodiment.

Division technique #5 combines techniques #3 and #4; e.g., technique #5 adds both the 4x and the 8X* alternatives to technique #2. FIG. 13 illustrates these alternatives in the rs and rc plane. Simulations indicate that when D∈8 1, 2), technique #5 takes 43.5 iterations on average to compute 56 quotient digits. When D∈[1.5, 2), technique #5 takes 40.5 iterations on average to compute 56 quotient digits.

Figure 14:
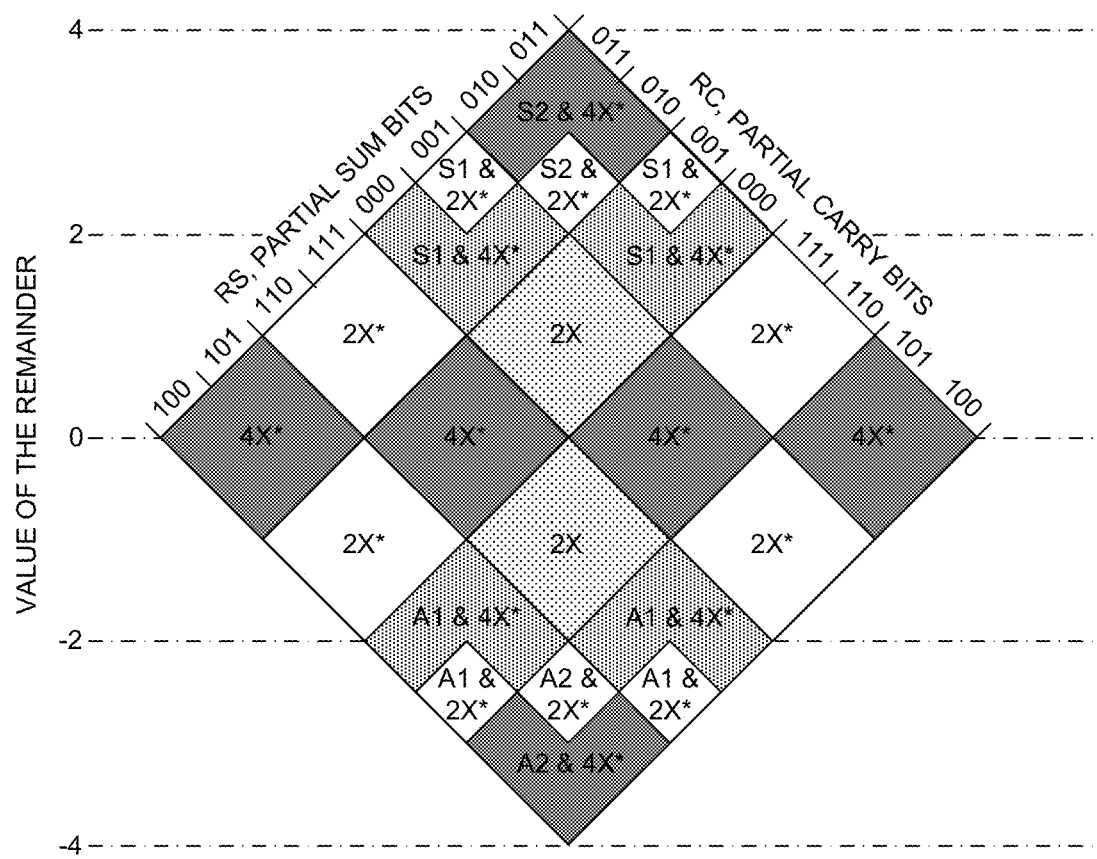
FIG. 14 illustrates the alternatives for division technique #6 in the rs and rc plane in accordance with an embodiment.

As described in the previous section (section 2), when the value of the divisor D∈[1.5, 1.75), one can add A1 & 4X*, 51 & 4X*, A2 & 4X* and S2 & 4X* alternatives to technique #2. These eleven alternatives (illustrated in FIG. 14 in the rs and rc plane) are used by technique #6, which chooses one out of these eleven alternatives to execute in each iteration. Simulations indicate that these alternatives reduce the average number of iterations needed to compute 56 quotient digits to 37.15.

Figure 15:
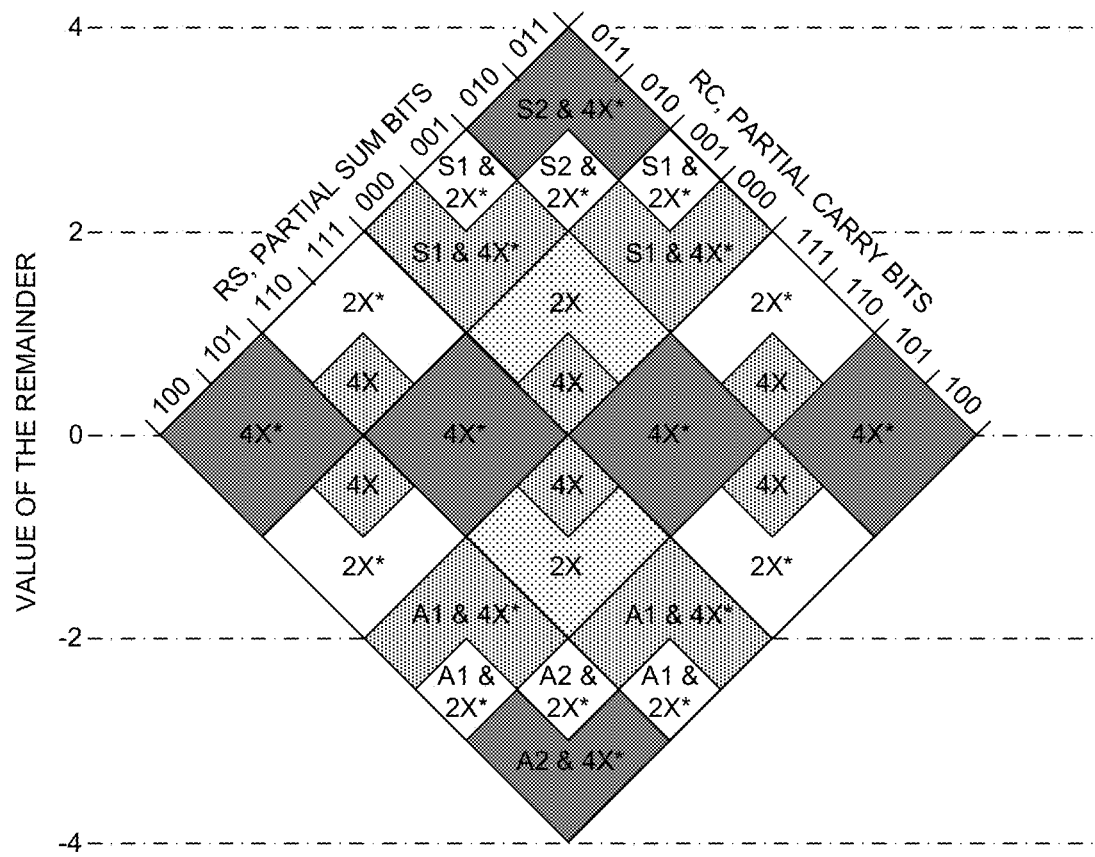
FIG. 15 illustrates the alternatives for division technique #7 in the rs and rc plane in accordance with an embodiment.

Technique #7 adds a 4x alternative to technique #6; the resulting twelve alternatives are illustrated in the rs and rc plane in FIG. 15. Simulations indicate that technique #7 further reduces the average number of iterations needed to compute 56 quotient digits to 34.19. Note that for technique #7, the value of D needs to be in the range [1.5, 1.75).

Figure 16:
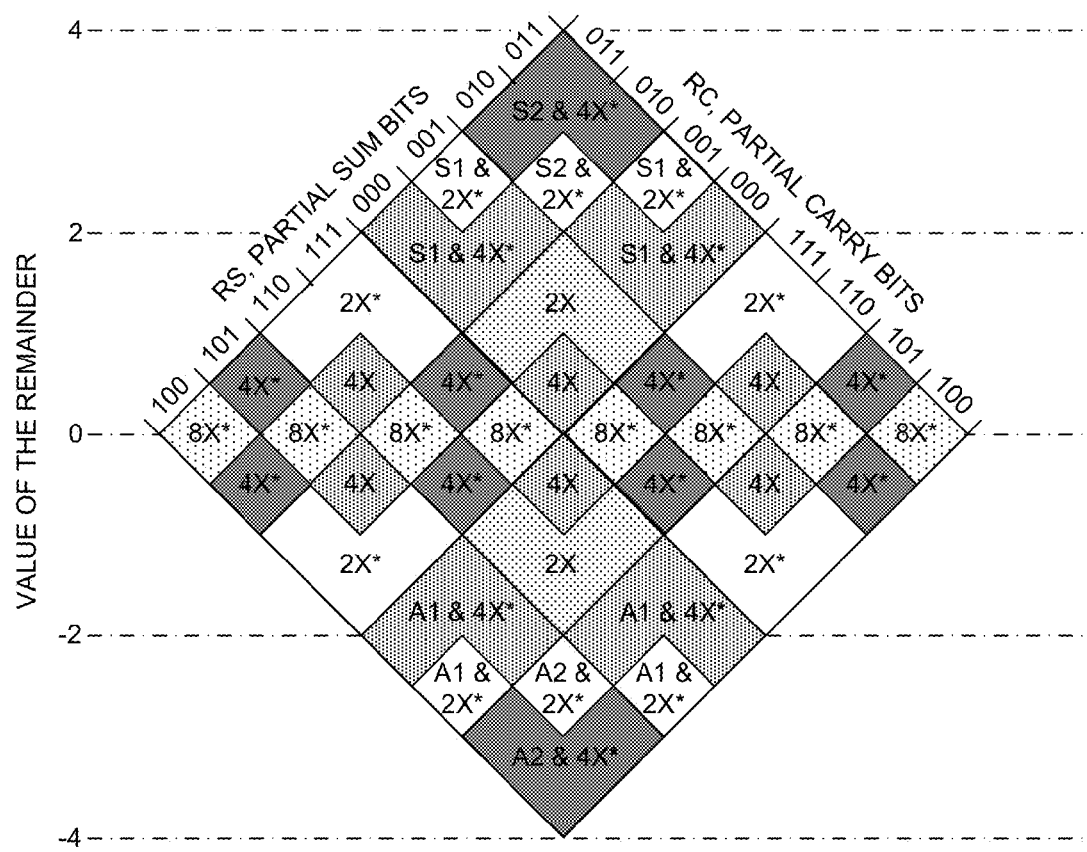
FIG. 16 illustrates the alternatives for division technique #8 in the rs and rc plane in accordance with an embodiment.

Technique #8 adds an 8X* alternative to technique #7; the resulting thirteen alternatives are illustrated in the rs and rc plane in FIG. 16. Note that FIG. 16 illustrates the same rs and rc plane illustrated in FIG. 8, but rotated 45 degrees such that the horizontal lines show the value of the remainder. Simulations indicate that technique #8 takes on average 33.14 iterations to compute 56 quotient digits. Note that this technique also needs the value of D to be in the range [1.5, 1.75).

Note that, in some embodiments, a division technique may consider an even larger number of bits during each iteration of a division operation. For instance, while some of the above-described (and below-described) division techniques determine a quotient based on the two or three most significant bits of rs and rc, additional alternative division techniques may look at an even larger number of alternatives that retire even more bits per iteration (e.g., a 16X* alternative, or other alternatives that consider 4+ bits per iteration). The additional number of alternatives may increase the complexity of the quotient selection logic, but in some scenarios (e.g., in an asynchronous division circuit) this may not be an issue.

Figure 17:
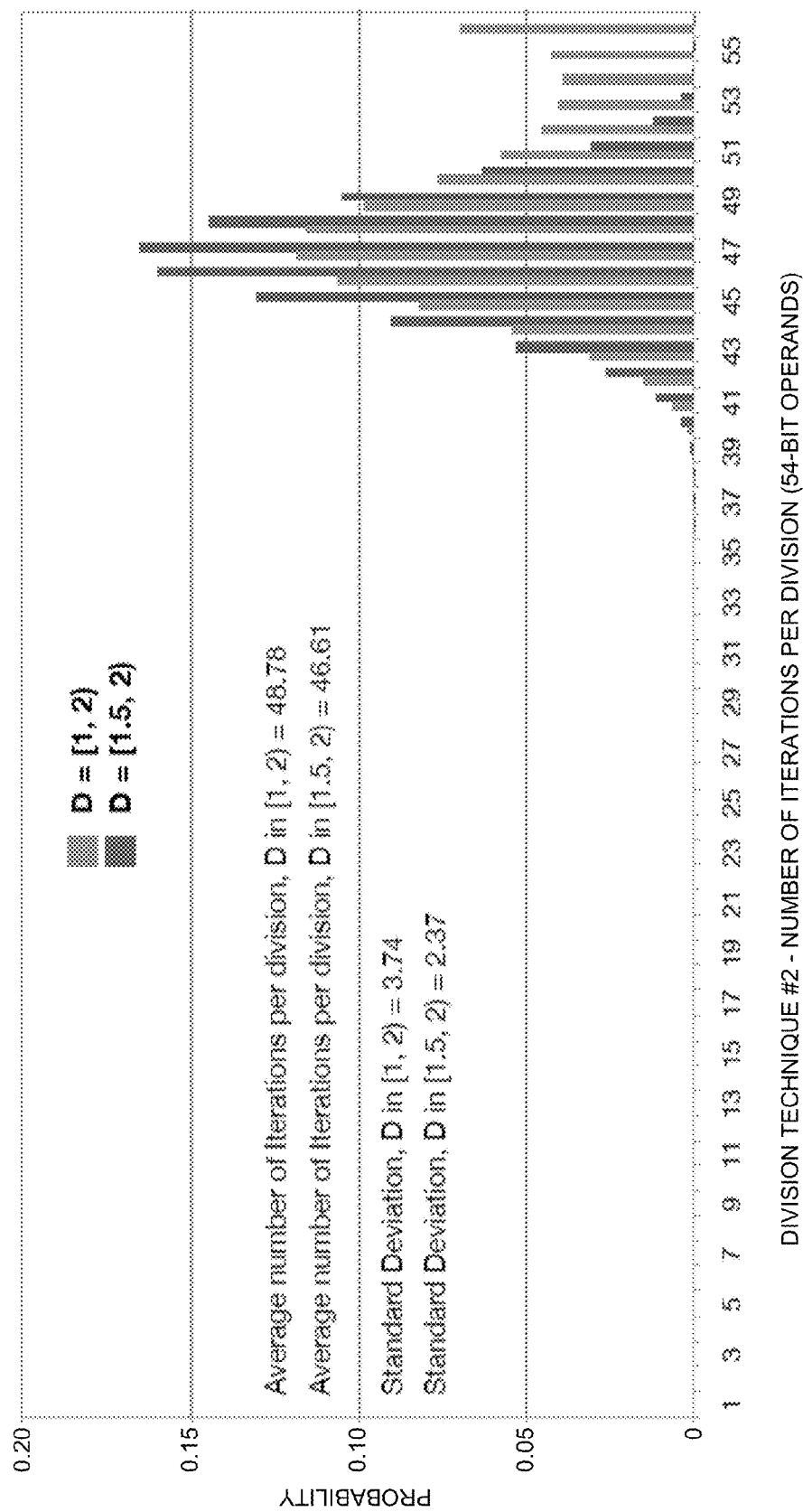
FIG. 17 illustrates a probability distribution of the number of iterations for division technique #2 for a set of randomized division operations in accordance with an embodiment.
Figure 18:
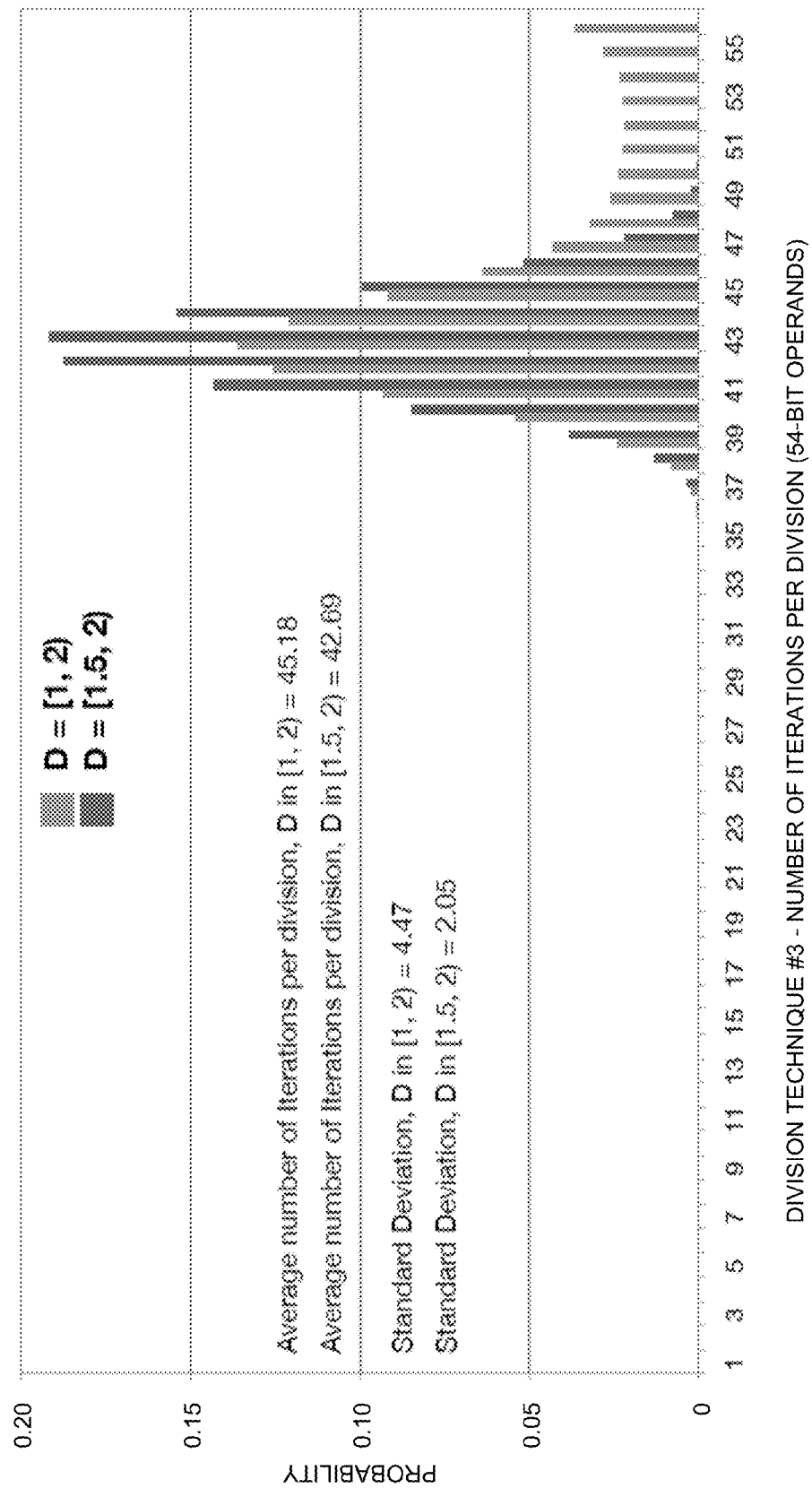
FIG. 18 illustrates a probability distribution of the number of iterations for division technique #3 for a set of randomized division operations in accordance with an embodiment.
Figure 19:
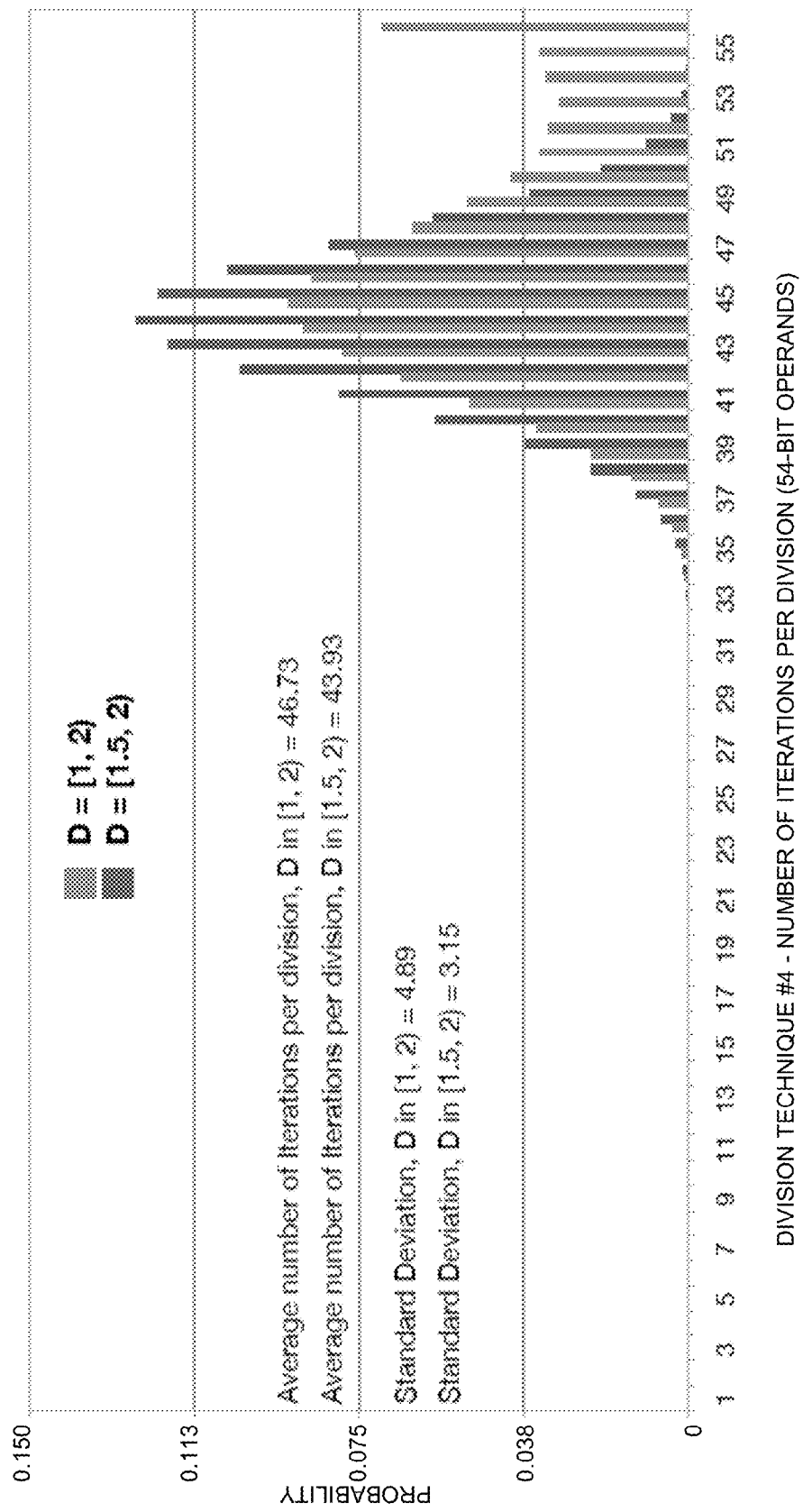
FIG. 19 illustrates a probability distribution of the number of iterations for division technique #4 for a set of randomized division operations in accordance with an embodiment.
Figure 20:
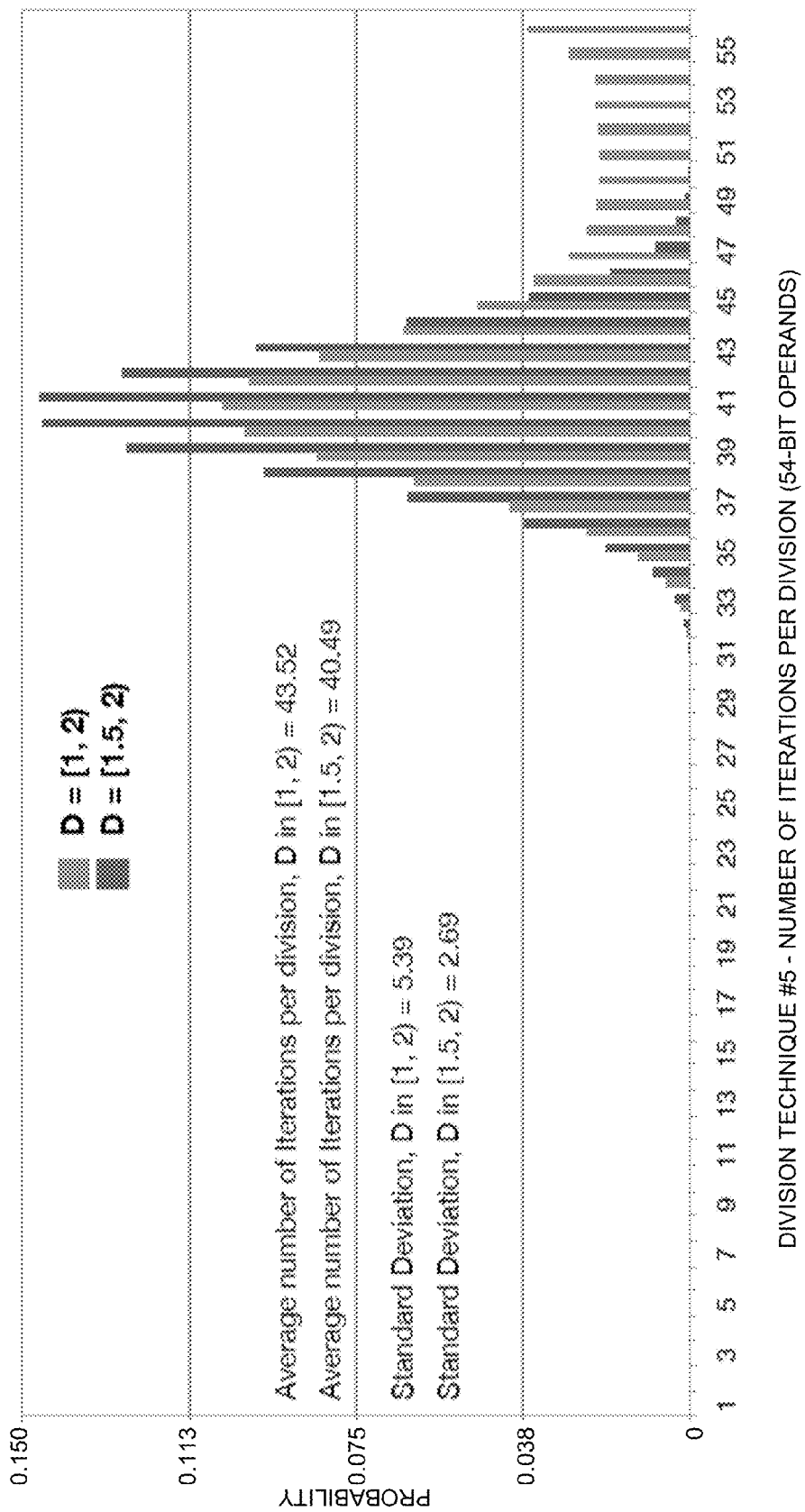
FIG. 20 illustrates a probability distribution of the number of iterations for division technique #5 for a set of randomized division operations in accordance with an embodiment.
Figure 21:
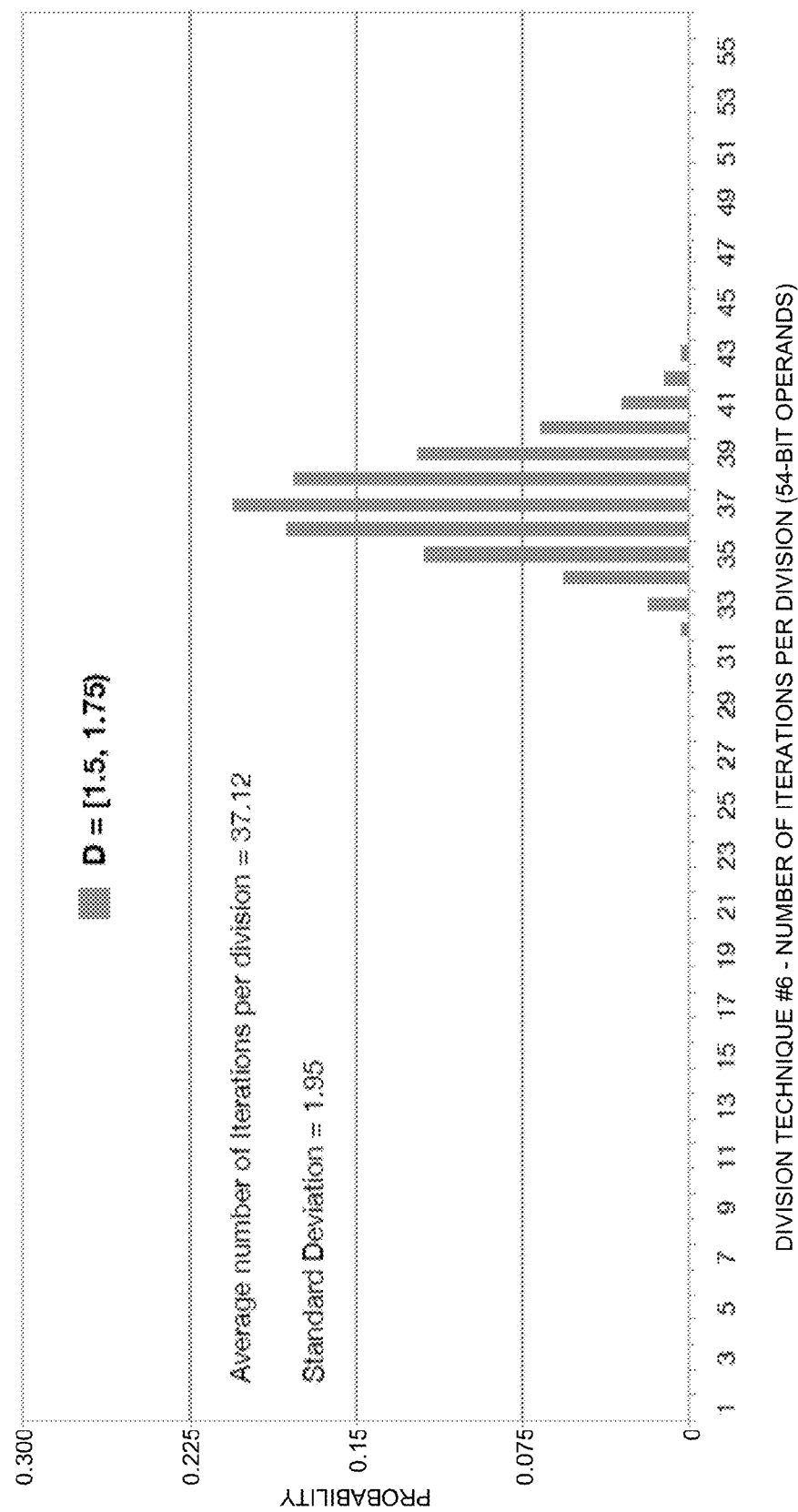
FIG. 21 illustrates a probability distribution of the number of iterations for division technique #6 for a set of randomized division operations in accordance with an embodiment.
Figure 22:
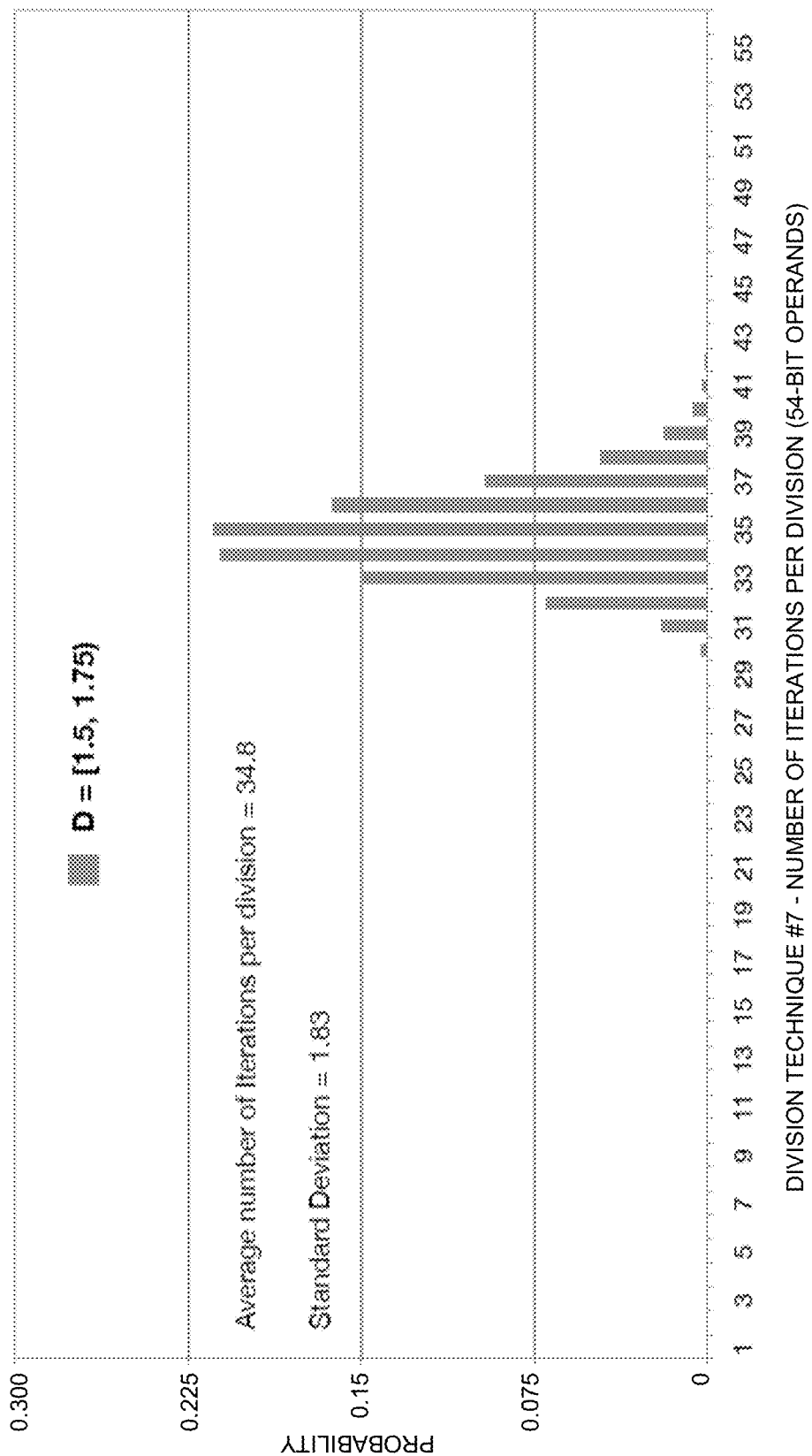
FIG. 22 illustrates a probability distribution of the number of iterations for division technique #7 for a set of randomized division operations in accordance with an embodiment.
Figure 23:
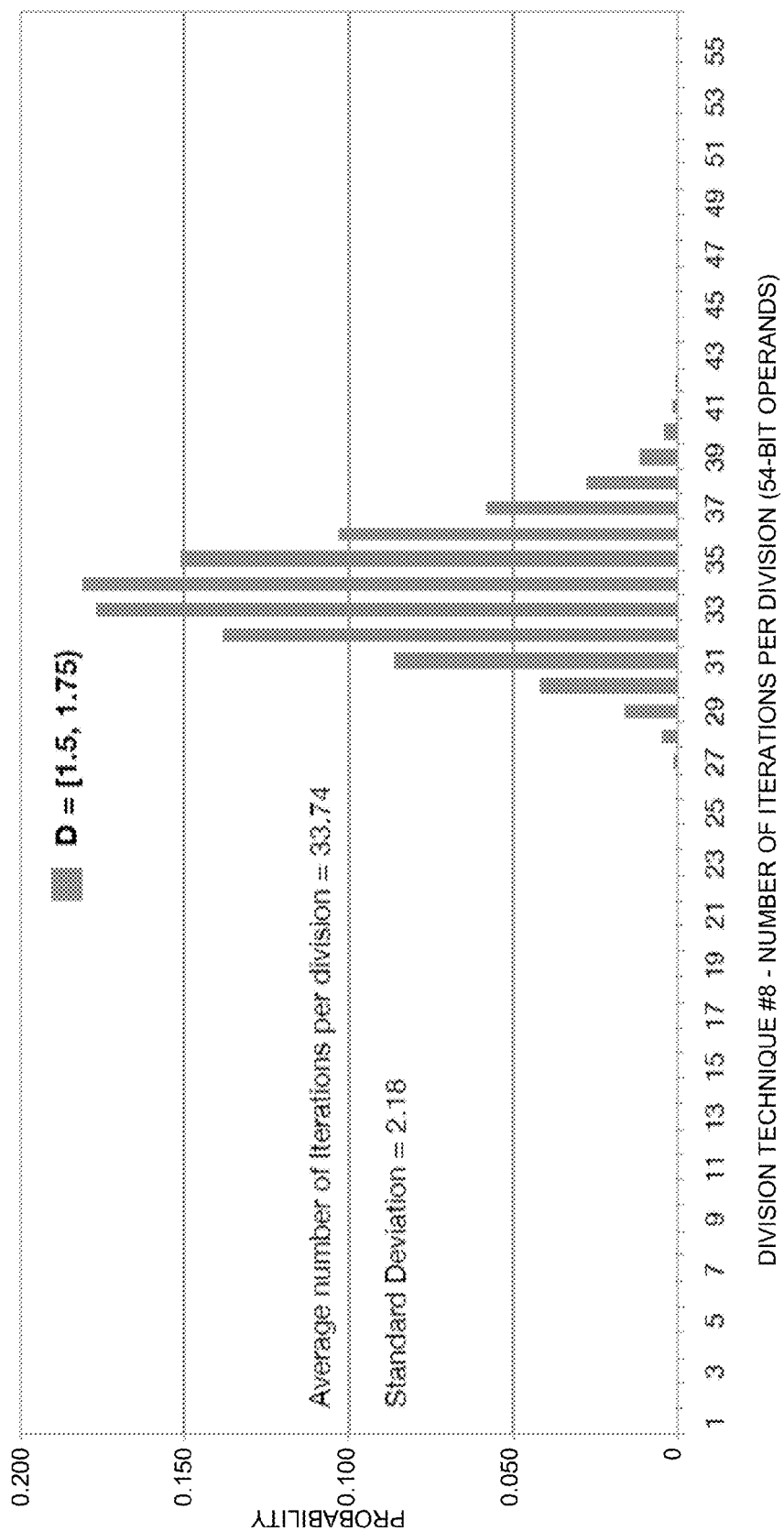
FIG. 23 illustrates a probability distribution of the number of iterations for division technique #8 for a set of randomized division operations in accordance with an embodiment.

Note also that the above iteration estimations for techniques #2-#8 are based on simulations of two million randomized division operations for each of the division techniques; the input operands for the division were random 54-bit divisors and dividends. Probability distributions that illustrate the number of iterations per division for these simulated division operations are illustrated for each technique in FIGS. 17-23; FIG. 17 illustrates the probability distribution for technique #2, FIG. 18 illustrates the probability distribution for technique #3, FIG. 19 illustrates the probability distribution for technique #4, FIG. 20 illustrates the probability distribution for technique #5, FIG. 21 illustrates the probability distribution for technique #6, FIG. 22 illustrates the probability distribution for technique #7, and FIG. 23 illustrates the probability distribution for technique #8. Note that for techniques #2-#5, the probability distribution when D∈[1, 2) (e.g., the distribution of light gray bars in the corresponding figure) has a tail to the right; the probability distribution when D∈[1.5, 2) (e.g., the distribution of dark gray bars) in contrast forms a normal distribution.

An unanswered question is what the maximum number of iterations per division is for techniques #2-#5 when D∈[1.5, 2) and for techniques #6-#8 when D∈[1.5, 1.75). Assuming that the probability distribution is normal, one can use $N_{avg}+5\sigma$, where $N_{avg}$ is the average number of iterations per division and σ is the standard deviation, to find an approximate maximum number of iterations per division. Approximate maximum values for $N_{avg}+5\sigma$ are: 56 maximum iterations for techniques #2 and #3; 53 maximum iterations for technique #4; 54 maximum iterations for technique #5; 47 maximum iterations for technique #6; 44 maximum iterations for technique #7; and 45 maximum iterations for technique #8.

3.1 Implementing Variable-Latency Division Techniques

The previous section described several division techniques that reduce the average number of iterations per division by adding various alternatives per iteration or by restricting the range of the divisor. Adding more alternatives per iteration increases the latency per iteration, which may increase or decrease the average latency per division, $L_{avg\_div}$. This section includes estimates of the average latency per division, $L_{avg\_chv}$ for all the techniques mentioned in the previous section, and compares them with the $L_{avg\_div}$ of the standard radix-2 SRT technique. Calculating the latency per division involves determining the latency per iteration. A block-level schematic of the divider for each technique is used to estimate the latency per iteration, $L_{iter}$.

Figure 24:
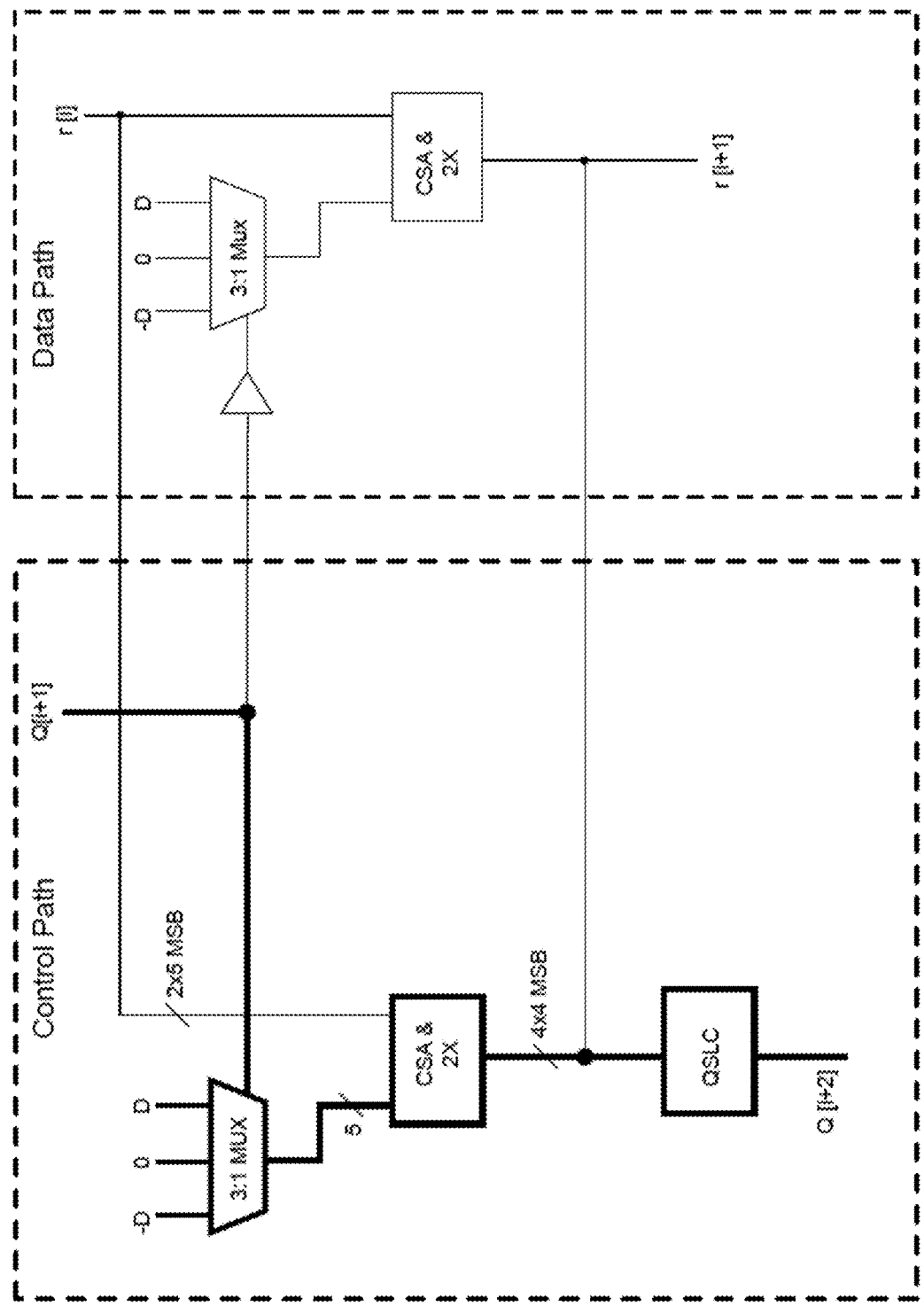
FIG. 24 illustrates an exemplary implementation of a data path and a control path for an SRT division technique in accordance with an embodiment.

A standard radix-2 SRT technique with carry-save addition executes one of following three alternatives in each iteration: addition of the divisor followed by a shift; just a shift; and subtraction of the divisor followed by a shift. For each alternative, the SRT technique selects a corresponding quotient digit from the digit set $\{-1, 0, 1\}$. The selection of an alternative and a quotient digit relies on the four most significant bits of the partial remainder. FIG. 24 illustrates a data path and a control path for a radix-2 SRT technique. In FIG. 24, the critical path is denoted by thick lines. Not shown in FIG. 24 are a set of flip-flops which can be placed at the bottom of the figure or at the top of the figure. These flip-flops are used to store the results at the end (or beginning) of each iteration, and thus delineate the combinatorial blocks in the iteration. Note that a division implementation can either re-execute the same combinational block with each iteration step (e.g., by looping back), or can cascade all of the combinational blocks with flip-flops, thereby creating a pipeline. For a variable latency division technique, it may make more sense to re-execute the same block each time, because it is not known beforehand how many steps the technique will need to execute (e.g., it may depend on the number of quotient bits retired in each iteration, as described in more detail in the following sections).

The critical path delay determines the latency per iteration, $L_{iter}$, in a clocked divider. For the implementation illustrated in FIG. 24, $L_{iter}$ is:

$$L_{iter}=D_{csa}+D_{3:1Mux}+D_{qslc}+D_{ff} \quad (3)$$

where $D_{csa}$ is the delay in the carry-save adder, $D_{3:1Mux}$ is the delay in the 3:1 mux, $D_{qslc}$ is the delay in the quotient selection logic, and $D_{ff}$ is the delay in the flip-flops. The quotient selection logic block in FIG. 24 (labeled "QSLC") generates the select signals to various multiplexers in the control and the data paths.

Figure 25:
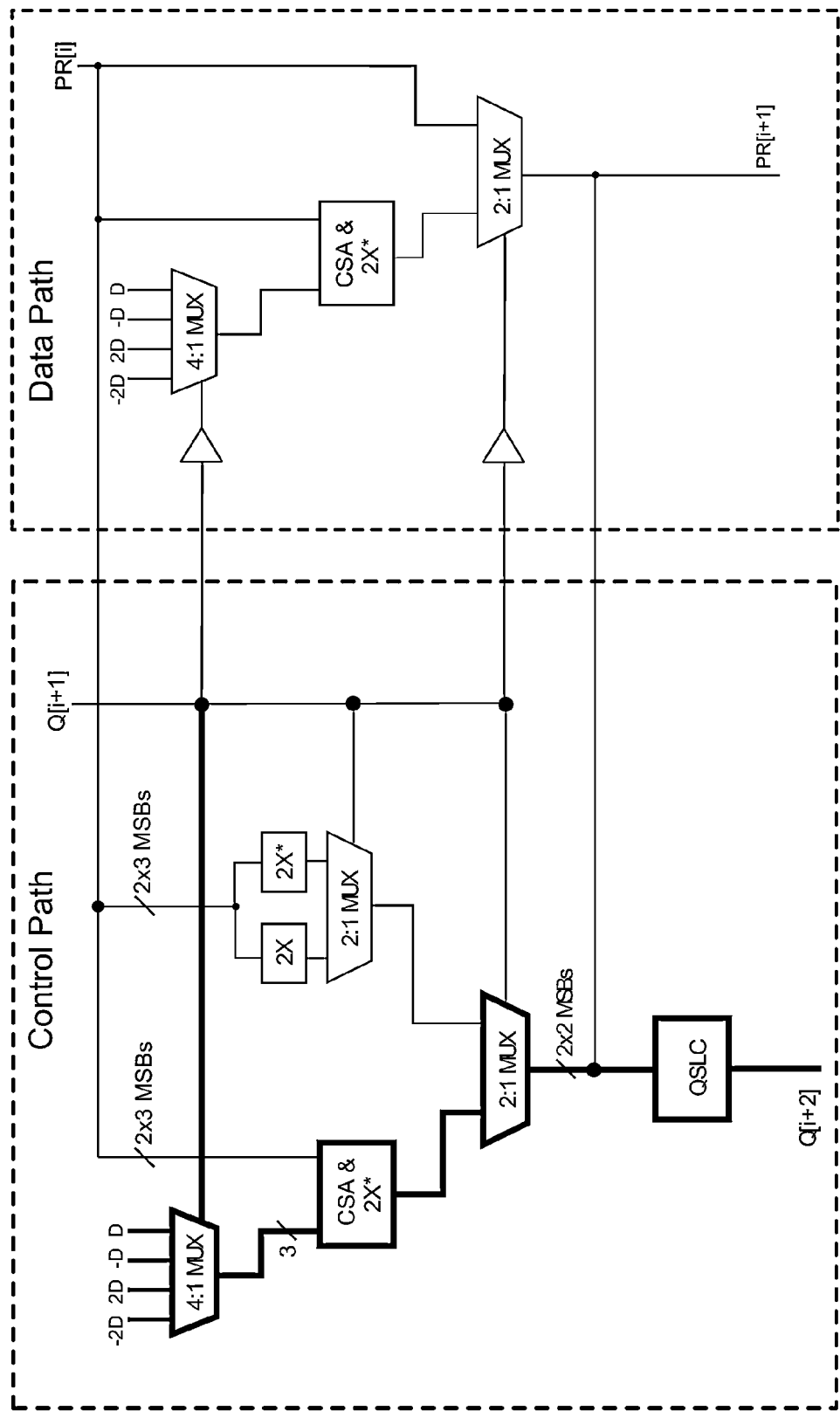
FIG. 25 illustrates an exemplary implementation of a data path and a control path for division technique #1 in accordance with an embodiment.

FIG. 25 illustrates a schematic for a possible implementation of division technique #1. In FIG. 25, the critical path delay (again denoted by thick lines), and hence the latency per iteration, $L_{iter}$, is:

$$L_{iter}=D_{4:1Mux}+D_{csa}+D_{2:1Mux}+D_{qslc}D_{ff} \quad (4)$$

where $D_{4:1Mux}$ is the delay in the included 4:1 multiplexer. Note that (as in FIG. 24, and in all of the subsequent exemplary implementations) the flip-flops are also not illustrated in FIG. 25, and can be included at the bottom or the top of the figure.

Figure 26:
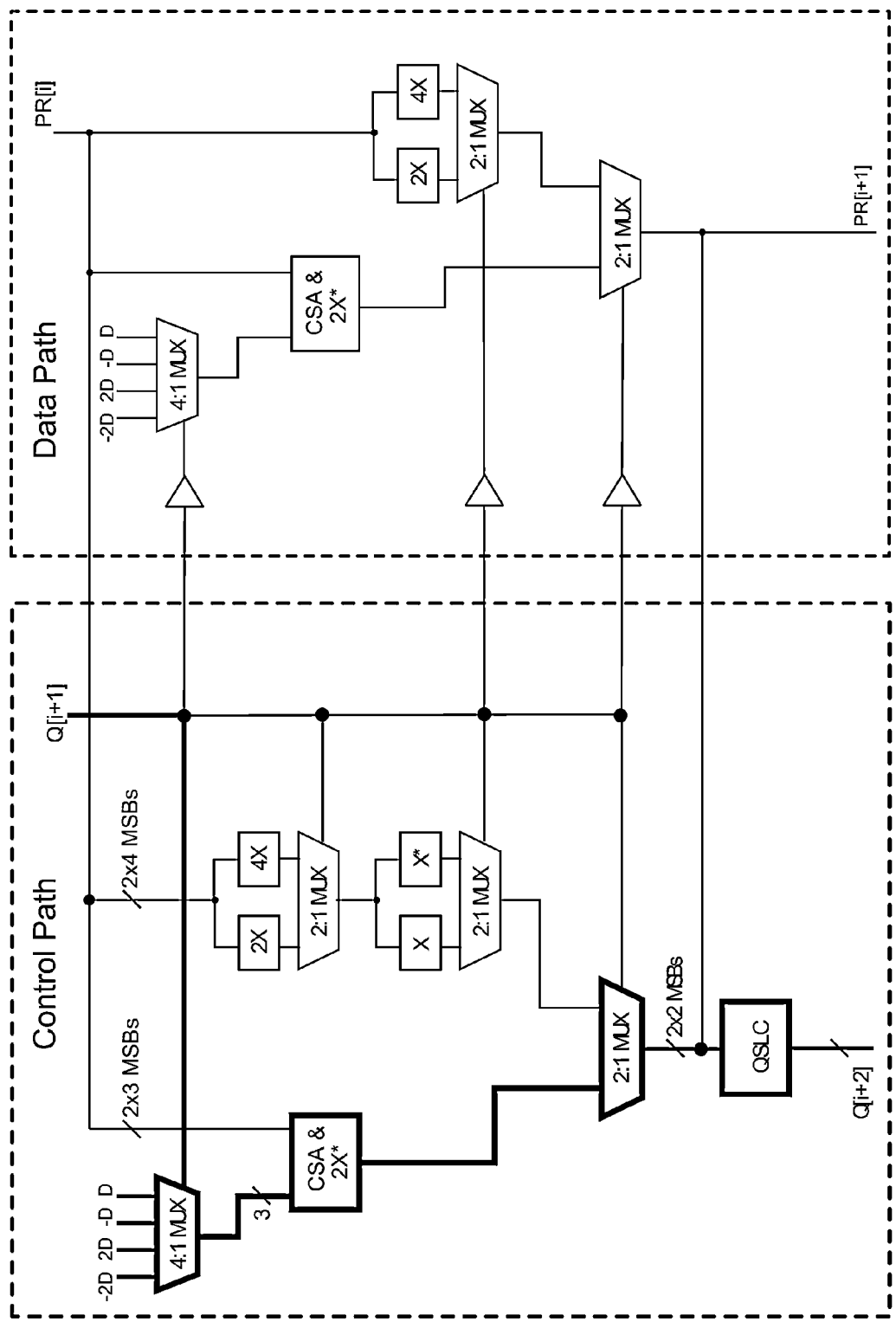
FIG. 26 illustrates an exemplary implementation of a data path and a control path for division techniques #2 and #3 in accordance with an embodiment.
Figure 27:
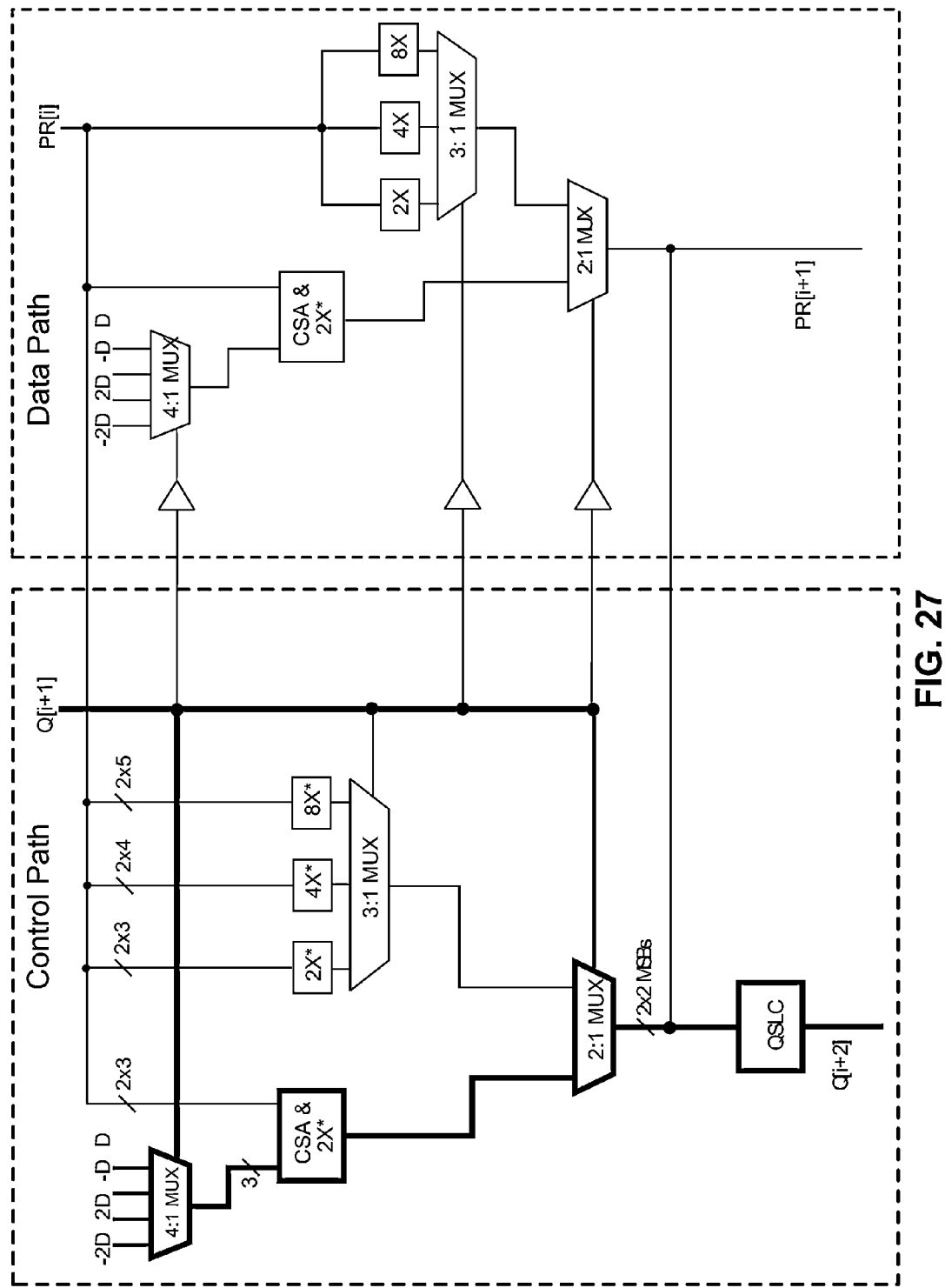
FIG. 27 illustrates an exemplary implementation of a data path and a control path for division techniques #4 and #5 in accordance with an embodiment.

FIG. 26 illustrates the schematic for an exemplary implementation of division techniques #2 and #3, while FIG. 27 illustrates the schematic for an exemplary implementation of division techniques #4 and #5. Note that the critical path for techniques #1-#5 is the same; however, the quotient selection logic (QSLC) will be different for each technique, because the logic to compute select signals for the multiplexers will be different for each technique. Therefore, the delay in QSLC, and consequently the latency per iteration, may be different for each technique. Note that these estimations of $L_{iter}$ assume that the delay in other components in the critical path will remain the same for techniques #1-#5. Note also that the difference between the blocks labeled X and X* is only in the most significant bit of the partial remainder in carry-save form; therefore, these blocks appear only in the control path.

Figure 28:
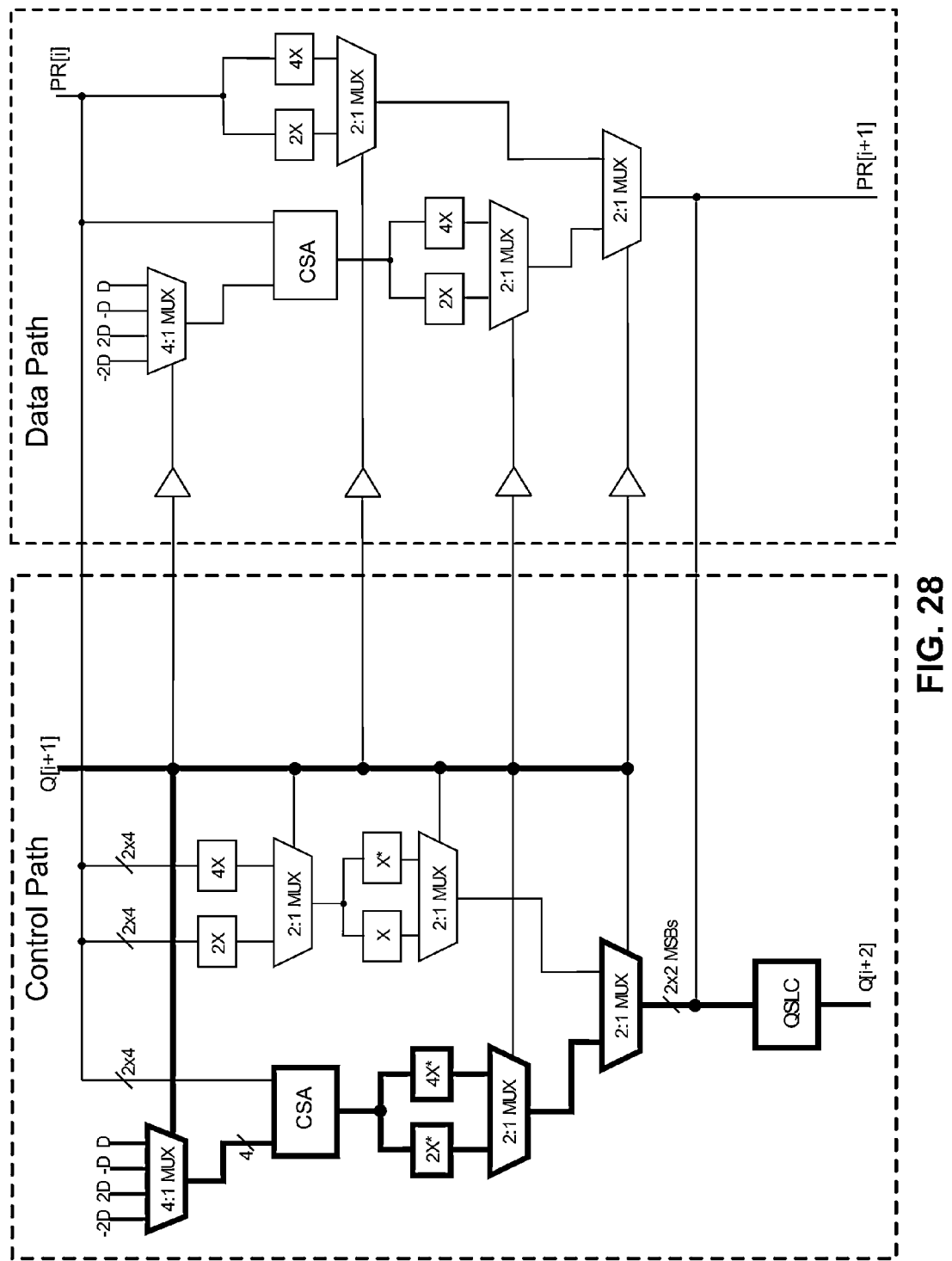
FIG. 28 illustrates an exemplary implementation of a data path and a control path for division techniques #6 and #7 in accordance with an embodiment.
Figure 29:
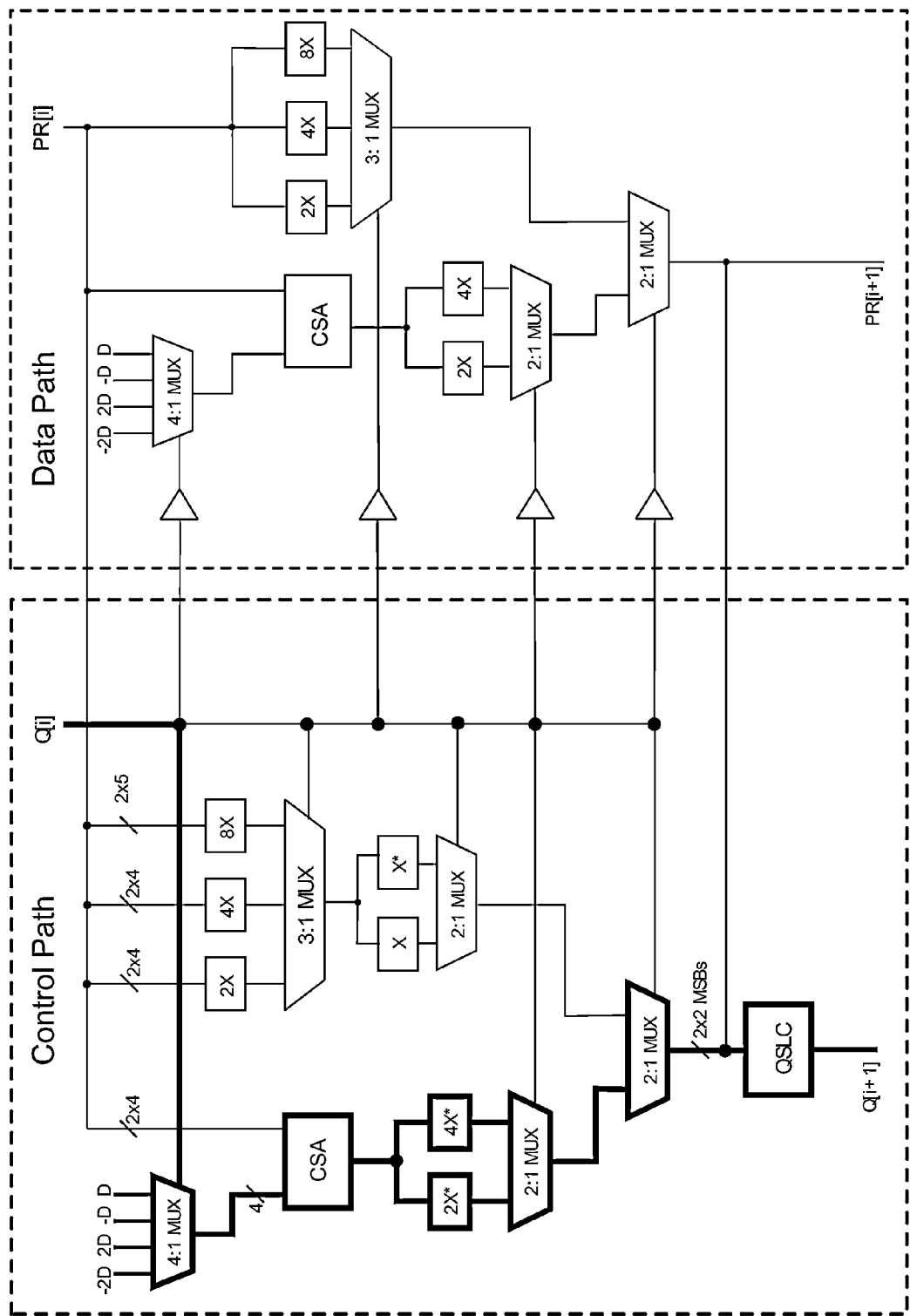
FIG. 29 illustrates an exemplary implementation of a data path and a control path for division technique #8 in accordance with an embodiment.

FIG. 28 illustrates the schematic for an exemplary implementation of division techniques #6 and #7, while FIG. 29 illustrates the schematic for an exemplary implementation of division technique #8. Notice that the critical paths for techniques #6-8 are the same. However, as for techniques #1-5, the latency per iteration may change for each due to differences in the complexity of the QSLC for each technique. The latency per iteration for techniques #6-#8 is:

$$L_{iter}=D_{4:1Mux}+D_{csa}+2*D_{2:1Mux}+D_{qslc}+D_{ff} \quad (5)$$

Not that in FIGS. 28-29, a 3:1 multiplexer may replace two series 2:1 multiplexers in the critical path. However, the logic in the QSLC may be sensitive to the multiplexer tree structure, and thus such a change may change the delay of the QSLC.

3.2 Considering Divisor Scaling

When $D \in [1.5, 2)$, division techniques #2-#5 on average take fewer iterations than when $D \in [1, 2)$. Scaling a divisor from $[1, 2)$, to $[1.5, 2)$ involves finding an appropriate value for M such that $M*D \in [1.5, 2)$:

If $D \in [1, 1.25)$, then choose M=1.5, which results in $M*D \in [1.5, 1.875)$;

If $D \in [1.25, 1.5)$, then choose M=1.25, which gives $M*D \in [1.5, 1.875)$;

If $D \in [1.5, 2)$, then choose M=1, which results in $M*D \in [1.5, 2)$.

Figure 30:
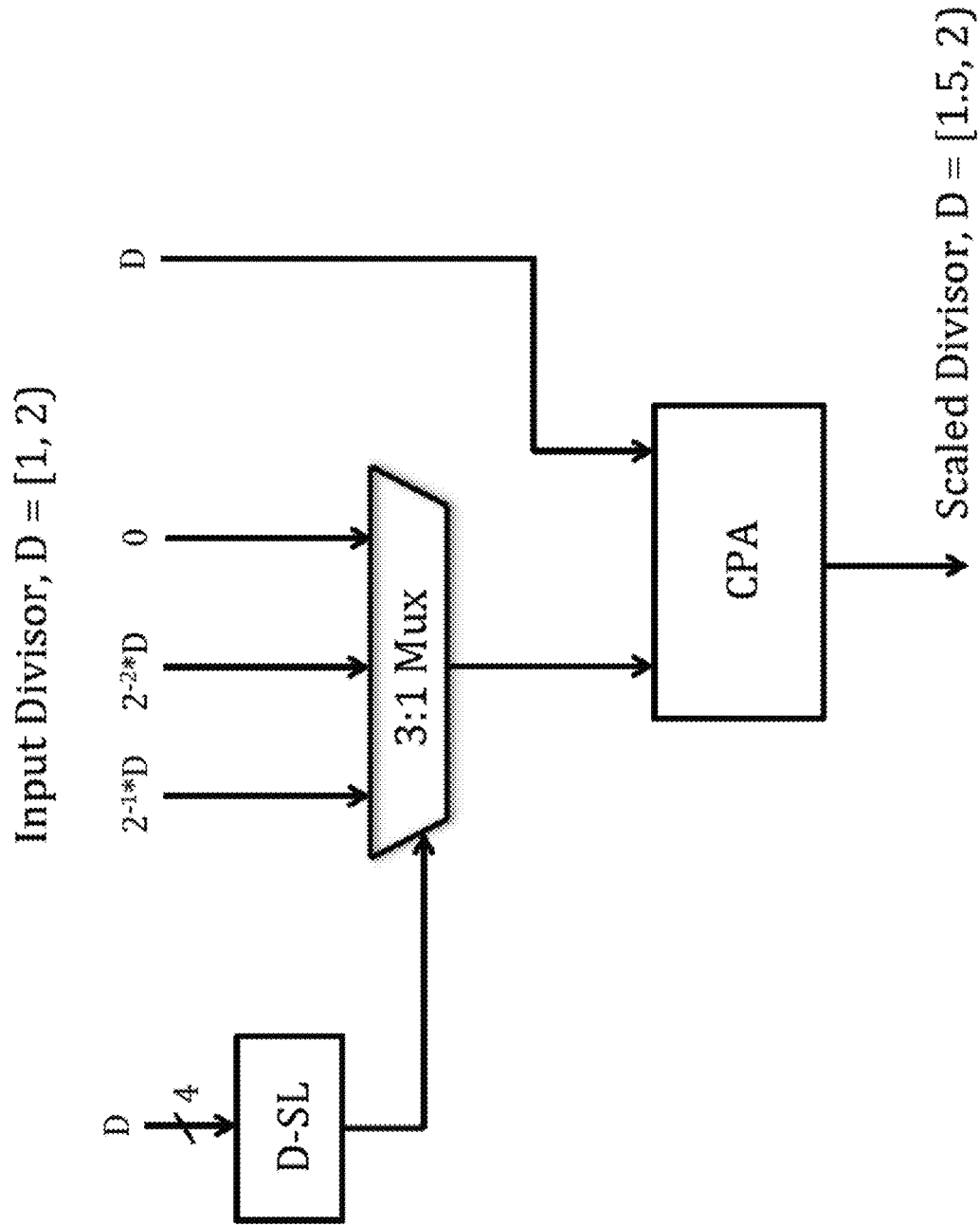
FIG. 30 illustrates an exemplary schematic for a circuit that scales a divisor from D∈[1, 2) to D∈[1.5, 2) in accordance with an embodiment.

Based on the representation of D, $M*D$ can be implemented with at most one addition. For instance:

If D=01.00x then $M*D=1*D+2^{-1}*D$;

If D=01.01x then $M*D=1*D+2^{-2}*D$;

If D=01.1x then $M*D=1*D$;

FIG. 30 illustrates an exemplary schematic for scaling D from $[1, 2)$ to $[1.5, 2)$. In FIG. 30, the block labeled "D-SL" inspects the four most significant bits of the divisor to select the correct operands for the carry-propagate addition. The result output by the carry-propagate adder (labeled "CPA") will be in the range $[1.5, 2)$.

Figure 31:
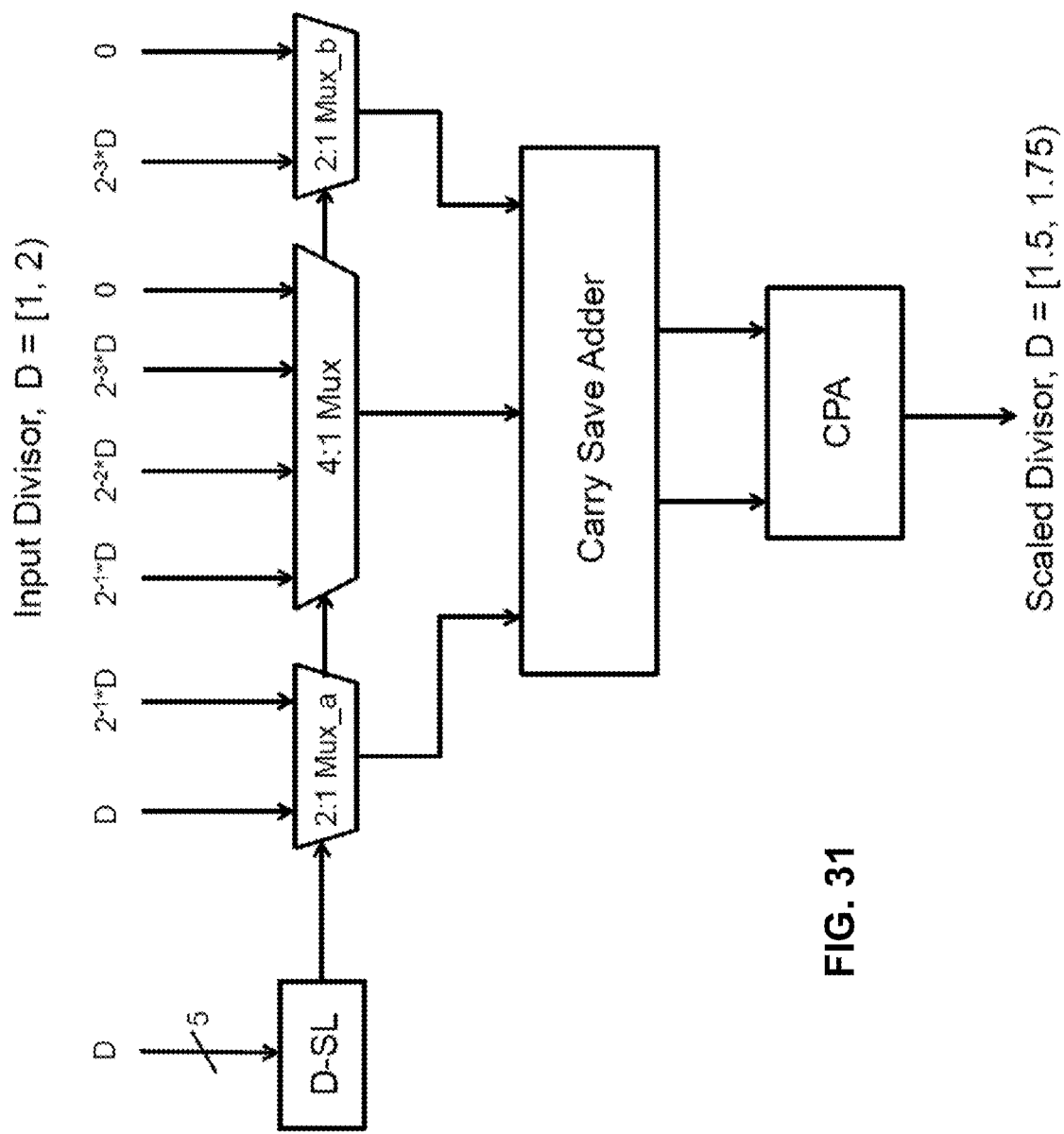
FIG. 31 illustrates an exemplary schematic for a circuit that scales a divisor from D∈[1, 2) to D∈[1.5, 1.75) in accordance with an embodiment.

For division techniques #6-#8, the value of the divisor D needs to be in the range $[1.5, 1.75)$. FIG. 31 shows an exemplary schematic for scaling divisors from $[1, 2)$ to $[1.5, 1.75)$; the details of scaling the divisor from $[1, 2)$ to $[1.5, 1.75)$ are discussed in the following section. In FIG. 31, the block labeled "D-SL" inspects the five most significant bits of the divisor to select the correct operands for the carry-save addition. The result output by the carry-propagate adder ("CPA") will be in the range $[1.5, 1.75)$.

As mentioned previously, dividend scaling must occur the same way as divisor scaling to ensure that the quotient, $Q=(M*R)/(M*D)$ is unscaled. Dividend scaling, $M*R$, can happen in parallel with divisor scaling. For floating point division, one can assume a dividend $R \in [1, 2)$. However, dividend scaling may yield $M*R \geq 2$, which would involve a right shift of $M*R$ and an increment of the exponent.

3.3 Latency per Division

The equations for $L_{iter}$ from the earlier sections can be used to estimate the latency per iteration and average latency per division for the above-described division techniques. For instance, equations 3, 4, and 5 for $L_{iter}$ can be used to estimate the latency per iteration for the radix-2 SRT technique, division techniques #1-#5, and division techniques #6-#7, respectively. As mentioned previously, the delay for the quotient selection logic may vary for each technique. Furthermore, the delays for the quotient selection logic (QSLC) and the other components in the data path, and hence the total latency per iteration for each technique, respectively, will depend on the design process and cell technology/library.

Comparing the total latency per division for each technique also needs to consider the overhead associated with divisor scaling. For techniques that do not involve divisor scaling, the average latency per division, $L_{avg\_div}$, is:

$$L_{avg\_div} = N_{avg} * L_{iter} \quad (6)$$

where $N_{avg}$ is the average number of iterations per division and $L_{iter}$ is the delay per iteration. As mentioned previously, division technique #1 and the SRT technique are fixed latency division techniques. Note also that division techniques #1-#8 need to compute one more quotient digit to achieve the same accuracy as the SRT technique.

For techniques that involve divisor scaling, the average latency per division is:

$$L_{avg\_div}(N_{avg} * L_{iter}) + D_{scale} \quad (7)$$

where $D_{scale}$ is the delay in scaling the divisor from [1, 2] to either [1.5, 2) or [1.5, 1.75). Note that some division techniques may on average take fewer iterations per division, but still have a longer average latency per division because of either longer latency per iteration or scaling overhead. In some embodiments, choosing an appropriate division technique for a particular design may involve considering such division performance trade-offs. For instance, the choice of a division technique may depend on various constraints, such as the clock period, the available chip area, the type of design, etc. For example, the above examples may be applied to synchronous designs which can take advantage of variable numbers of iterations. Alternatively, for an asynchronous design, one might need to consider the average number of shifts per division, because asynchronous circuits can exploit the faster shift operations. Note also that a designer choosing a particular technique may also be able to further optimize the implementation for that technique using other design optimization techniques.

4.0 Improving Quotient Selection Logic

The preceding sections describe several variable-latency division techniques that attempt to reduce the average latency per division by reducing the average number of iterations per division. More specifically, these techniques attempt to reduce the average number of iterations per division by adding more alternative operations to the division technique and/or by restricting the range of the divisor. However, as noted, reducing the average number of iterations per division may fail to reduce the average latency per division because of increased associated quotient selection logic complexity. In some embodiments, simplifying the quotient selection logic facilitates further reducing the average number of iterations per division.

Consider previously-described division technique #1, which executes one of six alternatives that are illustrated in FIG. 1. Division technique #1 can be implemented as illustrated in FIG. 25, and has a latency per iteration, $L_{iter}$, that is described in equation (4) earlier in this document. The quotient selection logic block (QSLC in FIG. 25) computes the select signals to various multiplexers in the control and the data paths. The QSLC implements the following logic equations to compute the corresponding signals:

$$slc[3] = Rs[1] \oplus Rc[1] \quad (8)$$

$$slc[2] = \overline{Rs[0]} \quad (9)$$

$$slc[1] = (Rs[0] \cdot Rc[0] \cdot Rs[1] \cdot Rc[1]) | (\overline{Rs[0] \cdot Rc[0]} \cdot \overline{Rs[1] \cdot Rc[1]}) \quad (10)$$

$$slc[0] = (Rs[0] \oplus Rc[0]) | slc[1] \quad (11)$$

where: Rs[0] and Rs[1] are the most and second-most significant bits of the sum bits, respectively; Rc[0] and Rc[1] are the most and the second-most significant bits of the carry bits, respectively; the $\oplus$ operator denotes an exclusive-OR (XOR) operation; the signals slc[3] and slc[2] select an appropriate multiple of D for the carry-save addition; the slc[1] signal chooses one of the two shift operations, 2X or 2X*; and the slc[0] signal chooses the result from one of the carry-save addition operations or from a shift operation. Note that the difference between 2X and 2X* operations is only in the most significant bits of Rs and Rc. Based on these equations (equations 8-11), the delay in the quotient selection logic is at least two fanout-of-4 (FO4) inverter delays (assuming computing the slc[1] signal involves one FO4 delay).

Figure 32:
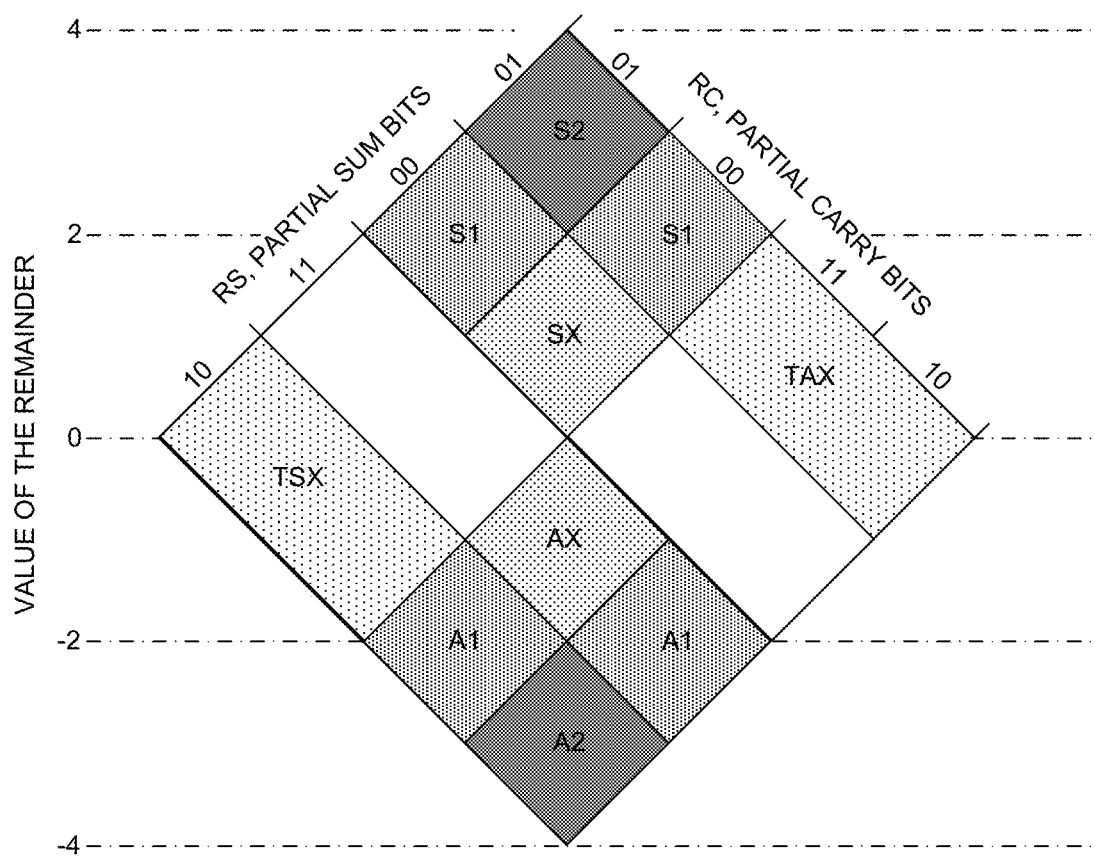
FIG. 32 illustrates the transformation that occurs when subtracting a divisor D from an SX region in accordance with an embodiment.

Division technique #1a, which also has fixed latency, further simplifies and reduces the delay in the quotient selection logic by replacing the respective 2x regions in FIG. 1 with S1 & 2X* and A1 & 2X* regions. To verify the correctness of this replacement, consider the transformations that occur when subtracting divisor D from a point, (Rs, Rc), in region SX in FIG. 32. R and D are represented with K+2 non-fractional bits and L fractional bits. For D∈[1, 2), the two's complement representation of D is 01.x, and –D is 10.y+1, where y is the bit-wise complement of x. Also, the partial carry or the majority bits are shifted one position to the left. When D is subtracted from a point in the SX region, one gets:

$$\begin{aligned} rs &= 00 \\ rc &= 00 \\ -D &= 10.y + 1 \\ \hline \text{partial sum} &= 10 \\ \text{partial carry} &= 0? \end{aligned}$$

As a consequence, subtracting D from a point in the SX region yields a point in the TSX region, where the technique performs the 2X* operation. Therefore, one can perform the S1 & 2X* operation in the SX region. Similarly, adding D to a point in the AX region yields a point in the TAX region, where the technique performs the 2X* technique. Therefore, one can perform the A1 & 2X* operation in the AX region. Hence, technique #1a executes one of five alternatives (rather than six) in each iteration; these five alternatives are: 2X*, S1 & 2X*, S2 & 2X*, A1 & 2X*, and A2 & 2X*, as illustrated in FIG. 33A.

Figure 33A:
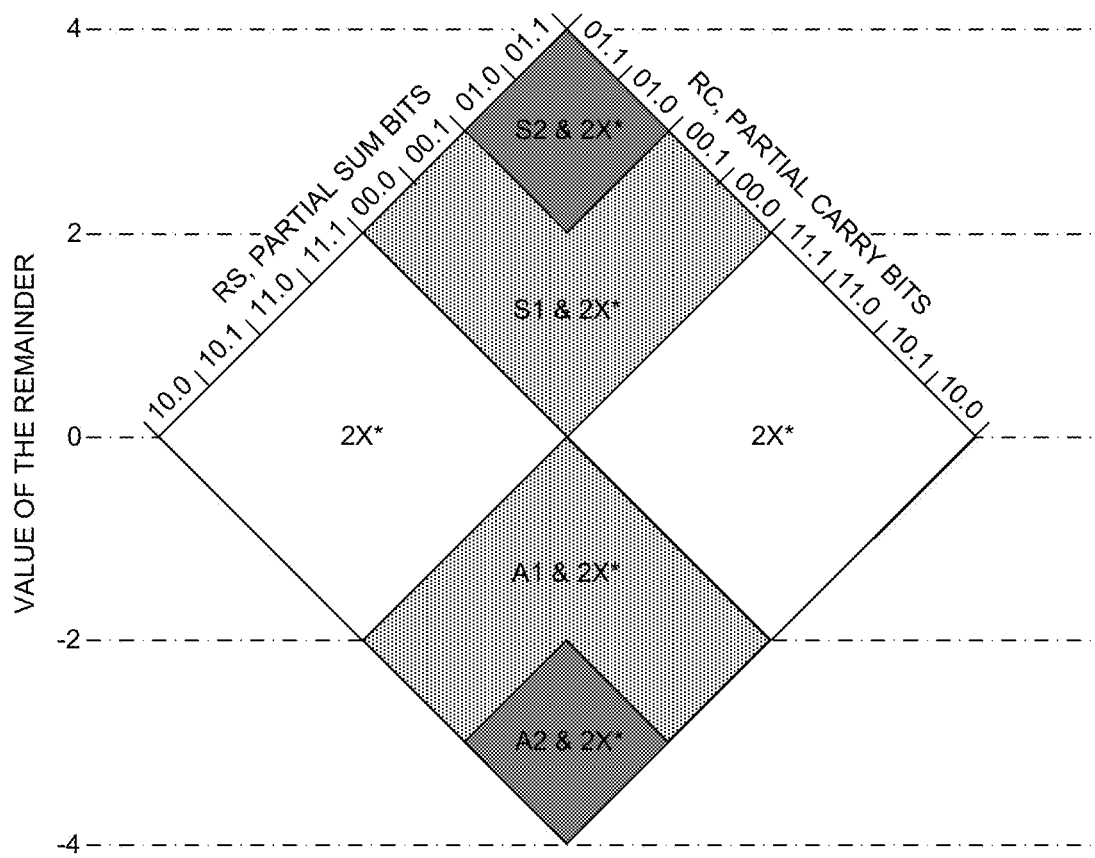
FIG. 33A illustrates the alternatives for division technique #1a in the rs and rc plane in accordance with an embodiment.
Figure 33B:
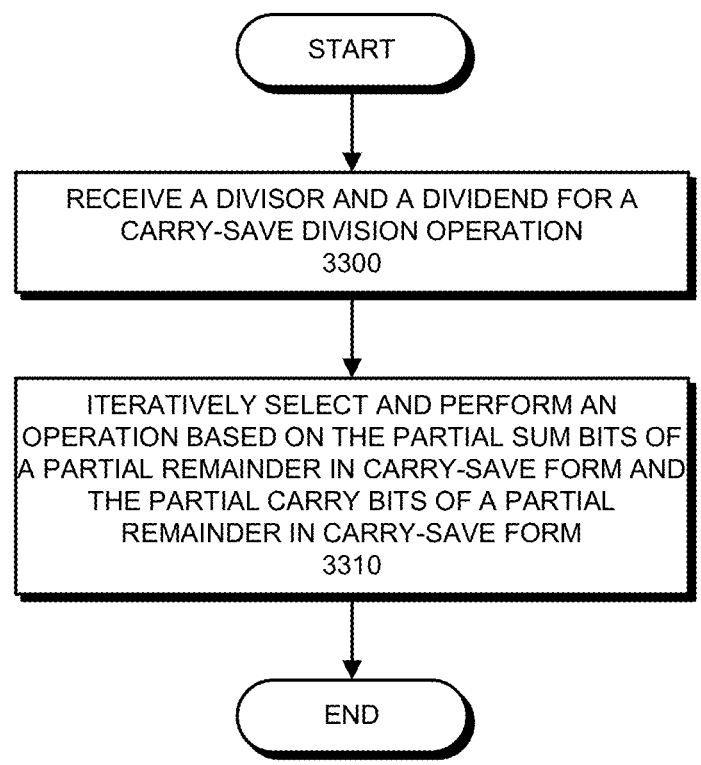
FIG. 33B presents a flow chart that illustrates the process of performing quotient selection in a carry-save division operation in accordance with an embodiment.

FIG. 33B presents a flow chart that illustrates the process of using the alternatives illustrated in FIG. 33A to perform quotient selection in the context of a carry-save division operation that divides a dividend, R, by a divisor, D, to produce an approximation of a quotient, Q=R/D. During operation, a divider receives a divisor and a dividend for the carry-save division operation (operation 3300). The divider then approximates Q by iteratively selecting and performing an operation based on the partial sum bits of a partial remainder in carry-save form (rs) and the partial carry bits of a partial remainder in carry-save form (rc) (operation 3310). The operation that is performed for a given iteration is selected from a set of operations that includes: (1) a 2X* operation; (2) an S1 & 2X* operation; (3) an S2 & 2X* operation; (4) an A1 & 2X* operation; and (5) an A2 & 2X* operation.

Figure 34:
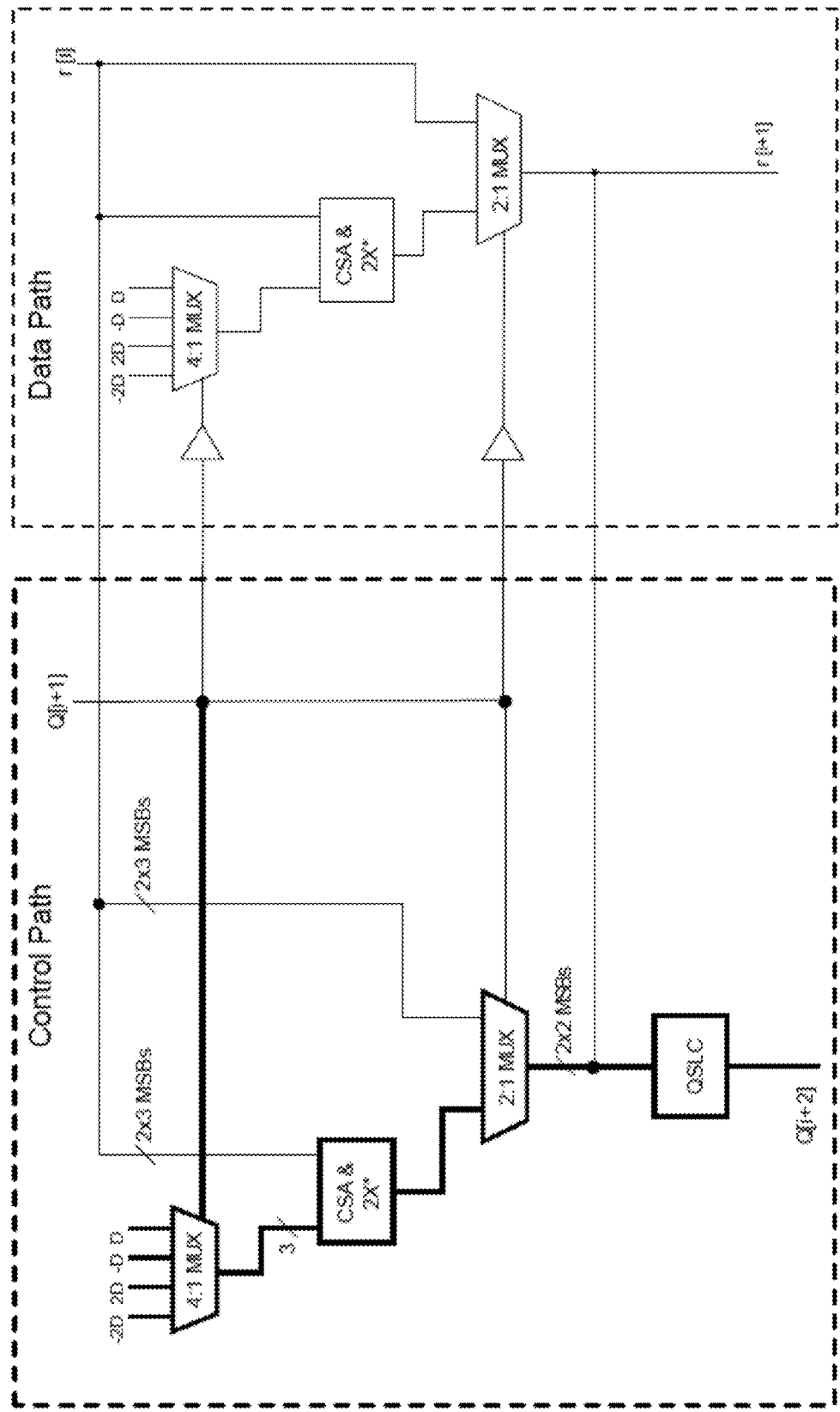
FIG. 34 illustrates an exemplary implementation of a data path and a control path for division technique #1a in accordance with an embodiment.

FIG. 34 illustrates a schematic for an exemplary implementation for technique #1a; the critical path for technique #1a is the same as the critical path for division technique #1, resulting in a latency per iteration of:

$$L_{iter} = D_{4:1Mux} + D_{csa} + D_{2:1Mux} + D_{qslc} + D_{ff} \quad (12)$$

However, the quotient selection logic in FIG. 34 implements the following logic equations:

$$slc[2]=(Rs[0]\cdot\overline{Rs[1]}\cdot\overline{Rc[1]})|(\overline{Rs[0]}\cdot Rs[1]\cdot Rc[1]) \quad (13)$$

$$slc[1]=\overline{Rs[0]} \quad (14)$$

$$slc[0]=(Rs[0]\oplus Rc[0]) \quad (15)$$

where the signals slc[2] and slc[1] select an appropriate multiple of D for the carry-save addition and the slc[0] signal chooses the result from one of the carry-save addition operations or from the 2X* operation. Note that the quotient selection logic for technique #1a is simpler than the quotient selection logic for technique #1. The delay in the quotient selection logic for technique #1a is about one FO4, thereby potentially saving one FO4 delay per iteration and n FO4 delays per division, where n is the number of iterations per division. This improved quotient selection logic substantially improves upon the quotient selection logic for the SRT technique and other division techniques, and substantially reduces the latency of each iteration of associated division operations.

Figure 35:
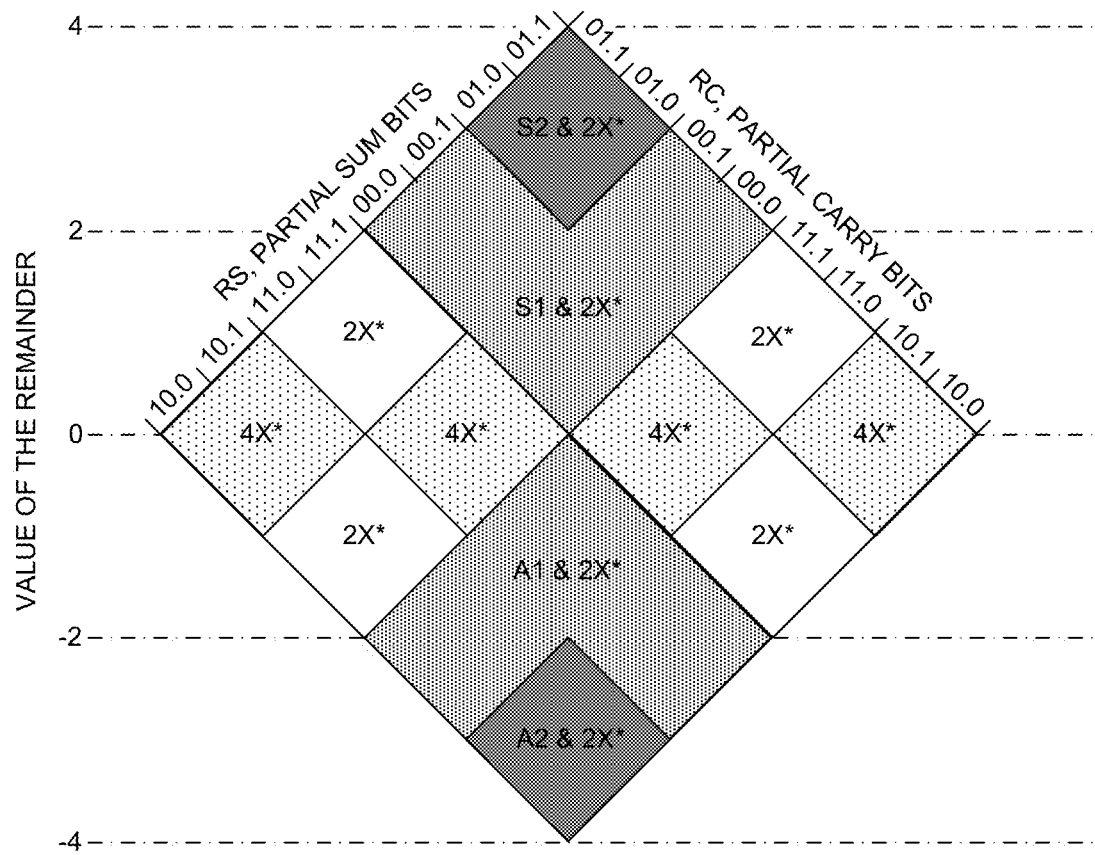
FIG. 35 illustrates the alternatives for division technique #2a in the rs and rc plane in accordance with an embodiment.

Another division technique, technique #2a, adds a 4X* alternative to technique #1a; as previously, this 4X* alternative executes the actions of the 2X* alternative twice. Technique #2a executes one of the following six alternatives in every iteration: 2X*, 4X*, S1 & 2X*, S2 & 2X*, A1 & 2X*, or A2 & 2X*. FIG. 35 illustrates these alternatives in the rs and rc plane; the choice of an alternative relies only on the two most significant bits of rs and rc. When technique #2a executes the 4X* alternative, the technique retires two quotient digits, namely "00". Because technique #2a retires one or two quotient digits per iteration, the number of iterations to complete a division varies. Simulations indicate that when the divisor D∈[1.5, 2), the average number of iterations per division reduces to 45.78, whereas when D∈[1, 1.5), the average number of iterations per division increases to 46.74. On average, technique #2a needs 46.26 iterations to compute 56 quotient digits.

Figure 36:
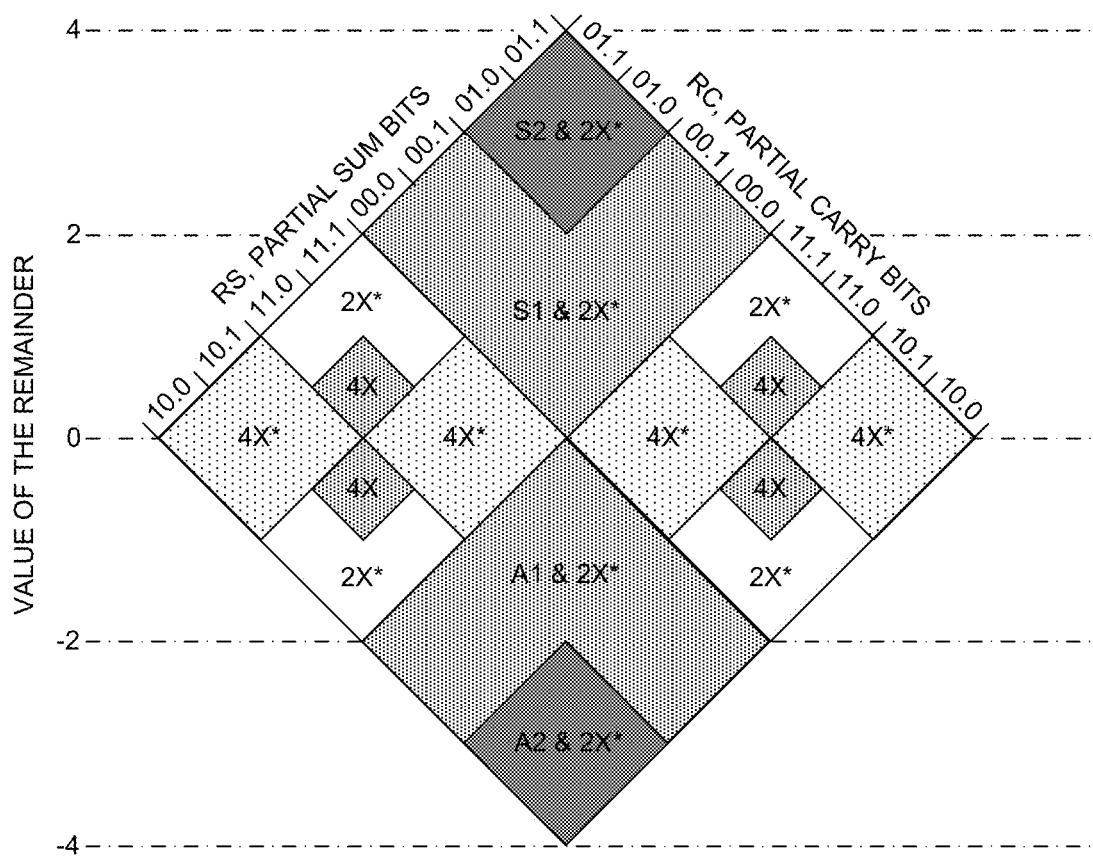
FIG. 36 illustrates the alternatives for division technique #3a in the rs and rc plane in accordance with an embodiment.

Division technique #3a adds a 4x alternative to technique #2a, where the 4X alternative executes the actions of the 2X alternative twice. Technique #3a executes one of the following seven alternatives in every iteration: 4x, 2X*, 4X*, S1 & 2X*, S2 & 2X*, A1 & 2X*, and A2 & 2X*, FIG. 36 illustrates these alternatives in the rs and rc plane. In the 4x and 4X* regions, the technique retires two quotient digits, namely "00". Simulations indicate that when the divisor D∈[1, 2), technique #3a takes 43.6 iterations on average to compute 56 quotient digits. When D∈[1.5, 2), technique #3a takes 42.3 iterations on average to compute 56 quotient digits.

Figure 37:
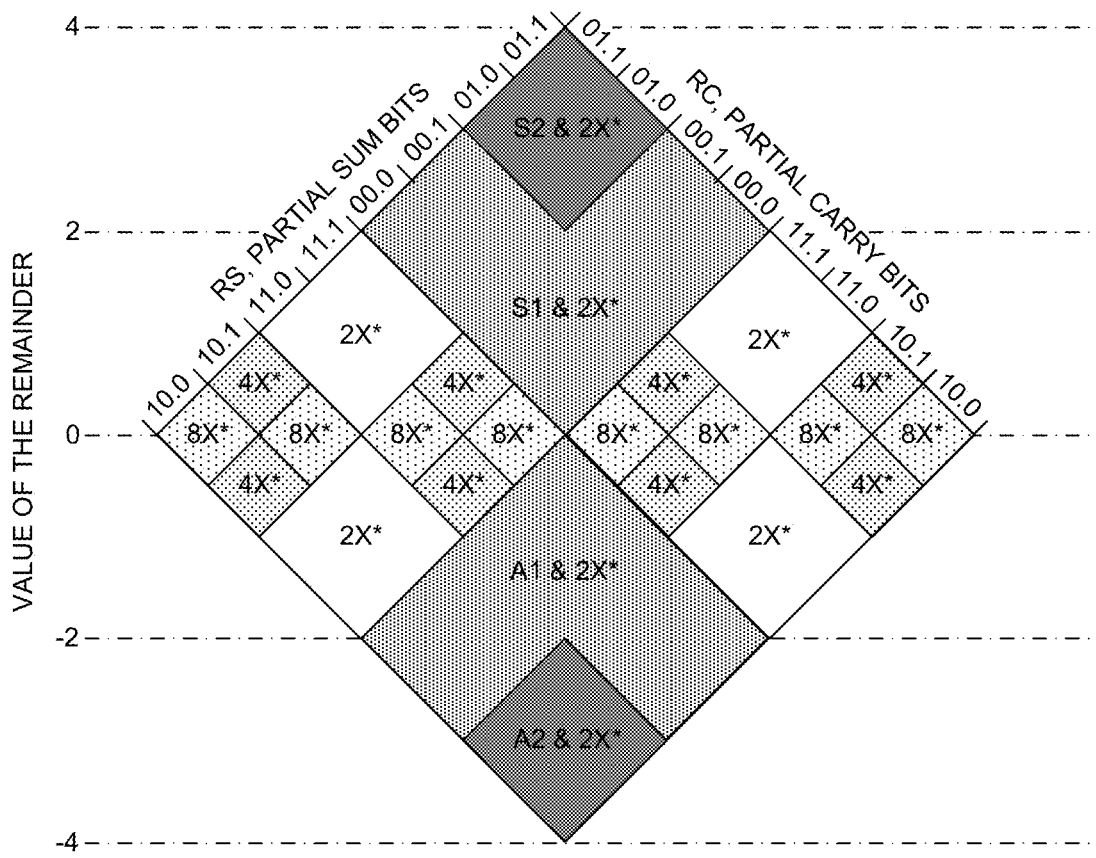
FIG. 37 illustrates the alternatives for division technique #4a in the rs and rc plane in accordance with an embodiment.

Division technique #4a adds an 8X* alternative to technique #2a, where the 8X* alternative executes the actions of the 2X* alternative three times. Like technique #3a, technique #4a also has seven alternatives: 2X*, 4X*, 8X*, S1 & 2X*, S2 & 2X*, A1 & 2X*, and A2 & 2X*; FIG. 37 illustrates these alternatives in the rs and rc plane. In 8X* regions, the technique retires three quotient digits, namely "000"; thus, technique #4a can retire one, two, or three quotient digits per iteration. Simulations indicate that when D∈[1, 2), technique #4a takes 43.45 iterations on average to compute 56 quotient digits. When D∈[1.5, 2), technique #4a takes 42.83 iterations on average to compute 56 quotient digits.

Figure 38:
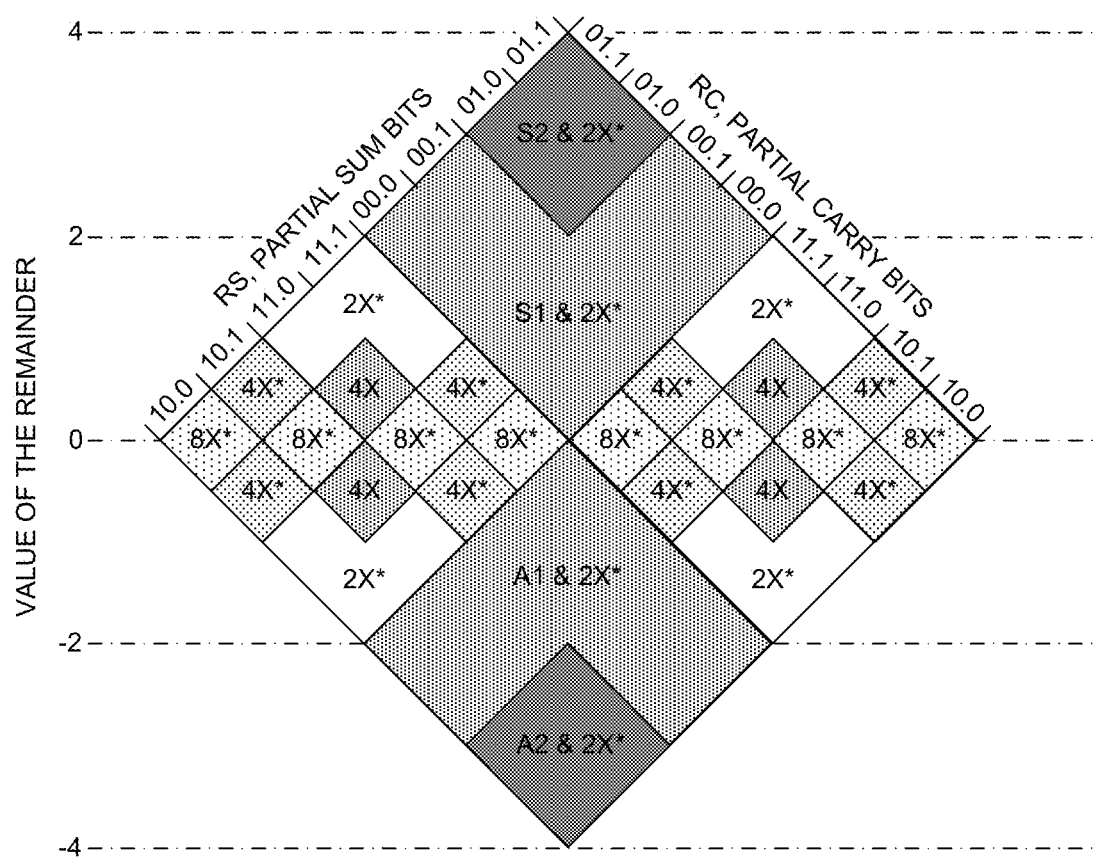
FIG. 38 illustrates the alternatives for division technique #5a in the rs and rc plane in accordance with an embodiment.

Division technique #5a combines techniques #3a and #4a; e.g., technique #5a adds both the 4x and the 8X* alternatives to technique #2a. FIG. 38 illustrates these alternatives in the rs and rc plane. Simulations indicate that when D∈[1, 2), technique #5a takes 41.4 iterations on average to compute 56 quotient digits. When D∈[1.5, 2), technique #5a takes 39.9 iterations on average to compute 56 quotient digits.

Figure 39:
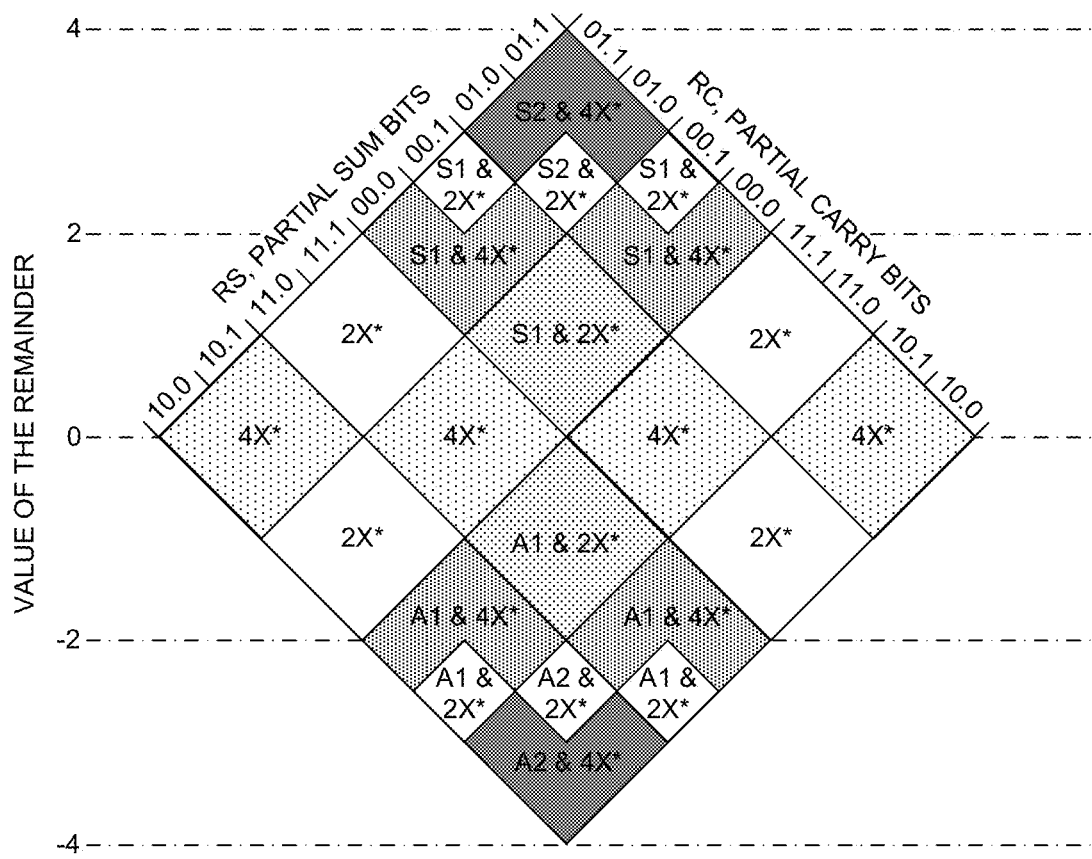
FIG. 39 illustrates the alternatives for division technique #6a in the rs and rc plane in accordance with an embodiment.

As described in previous sections, when the value of the divisor D∈[1.5, 1.75), one can add A1 & 4X*, S1 & 4X*, A2 & 4X* and S2 & 4X* alternatives to technique #2a. All four of these additional alternatives retire two quotient digits. More specifically: (1) A1 & 4X* retires quotient digits −1 and 0 (in that order); (2) S1 & 4X* retires quotient digits 1 and 0; (3) A2 & 4X* retires quotient digits −2 and 0; and (4) S2 & 4X* retires quotient digits 2 and 0. The expanded set of eleven alternatives (illustrated in FIG. 39 in the rs and rc plane) are used by technique #6a, which chooses one out of these ten alternatives to execute in each iteration. Simulations indicate that these alternatives reduce the average number of iterations needed to compute 56 quotient digits to 38.51.

Figure 40:
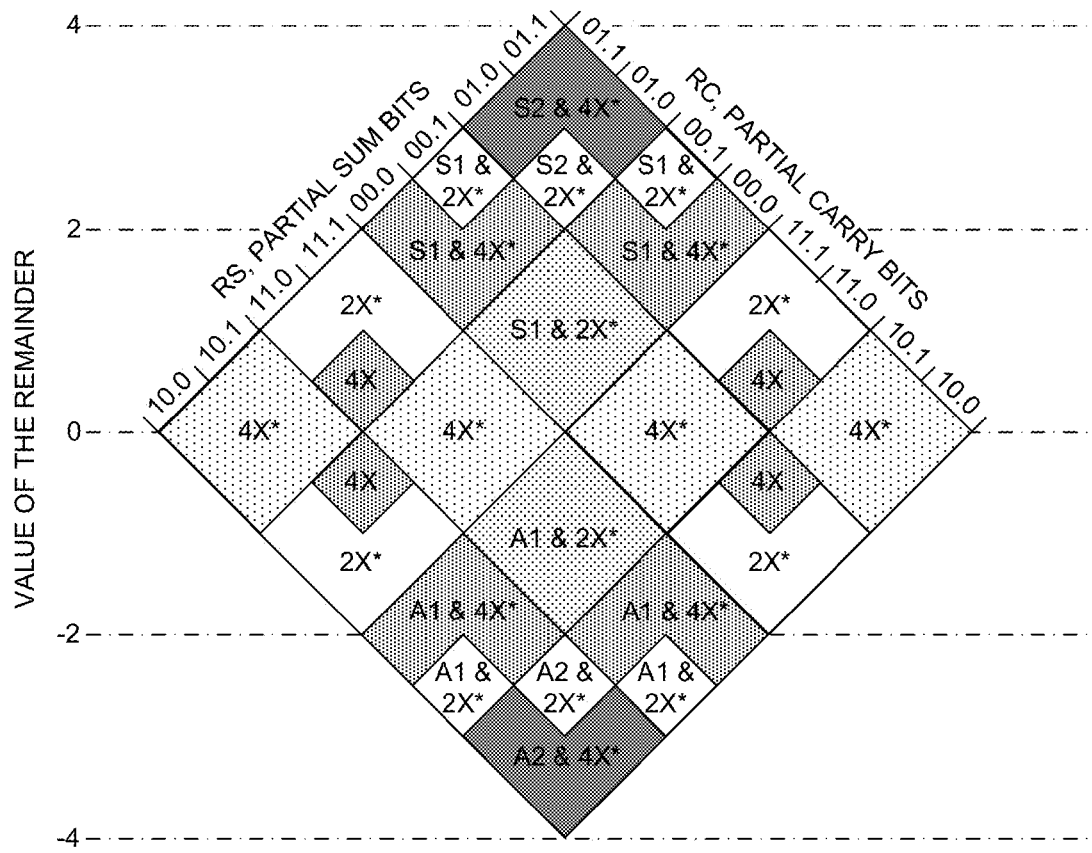
FIG. 40 illustrates the alternatives for division technique #7a in the rs and rc plane in accordance with an embodiment.

Technique #7a adds a 4x alternative to technique #6a; the resulting eleven alternatives are illustrated in the rs and rc plane in FIG. 40. Simulations indicate that technique #7a further reduces the average number of iterations needed to compute 56 quotient digits to 35.45. Note that for technique #7a, the value of D needs to be in the range [1.5, 1.75).

Figure 41:
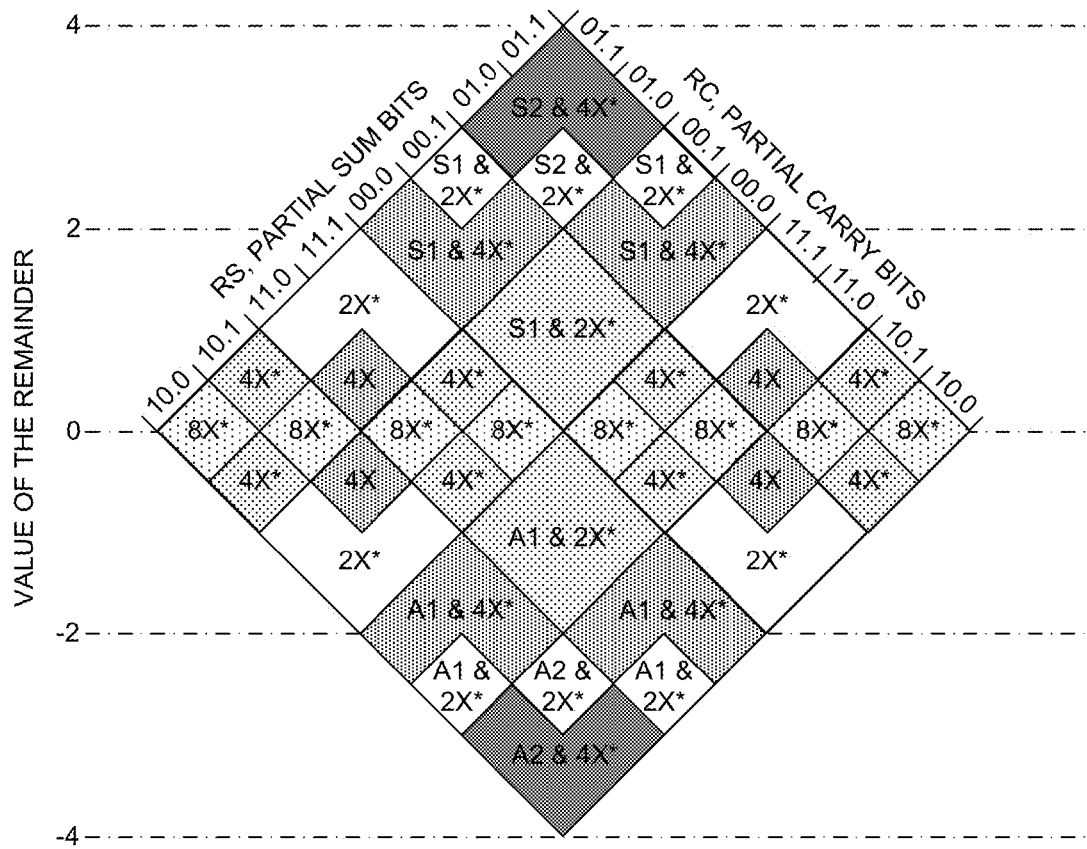
FIG. 41 illustrates the alternatives for division technique #8a in the rs and rc plane in accordance with an embodiment.

Technique #8a adds an 8X* alternative to technique #7a; the resulting twelve alternatives are illustrated in the rs and rc plane in FIG. 41. Simulations indicate that technique #8a takes on average 33.99 iterations to compute 56 quotient digits, and also needs the value of D needs to be in the range [1.5, 1.75).

Figure 42:
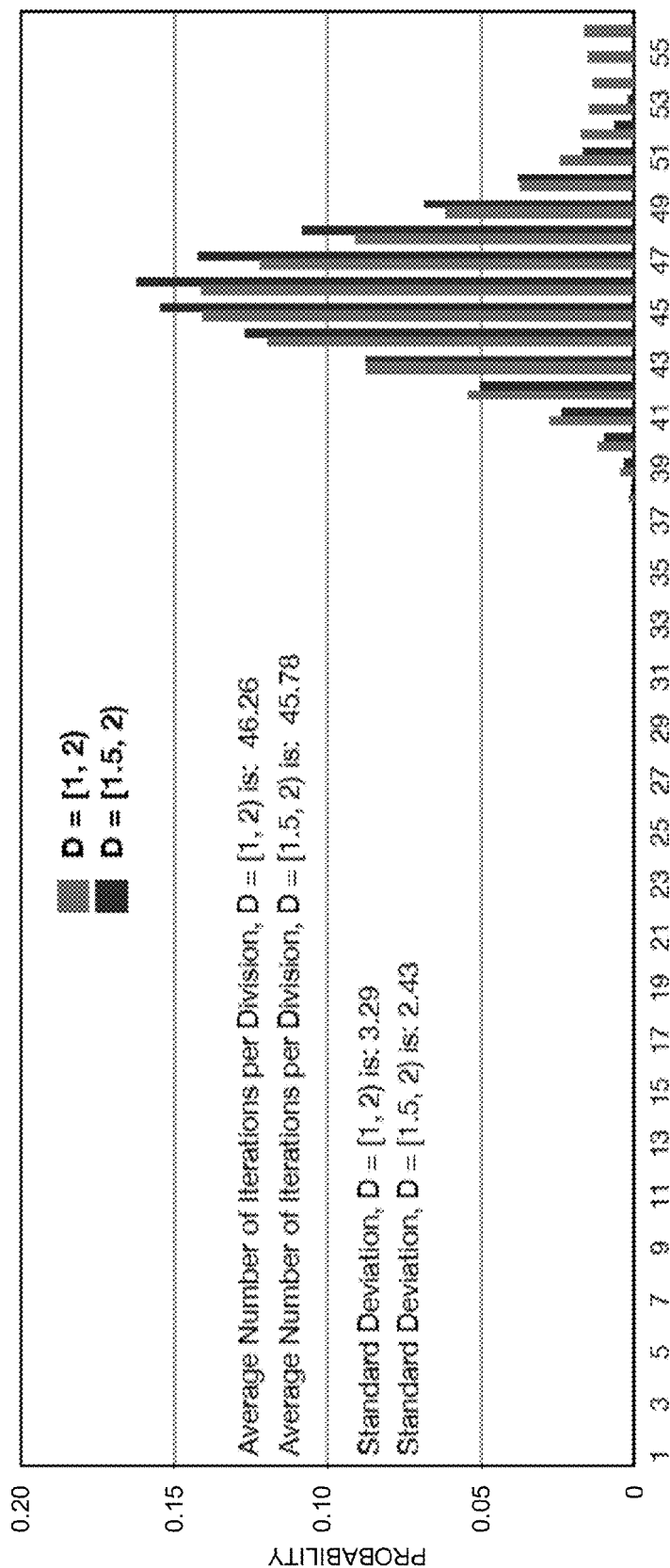
FIG. 42 illustrates a probability distribution of the number of iterations for division technique #2a for a set of randomized division operations in accordance with an embodiment.
Figure 43:
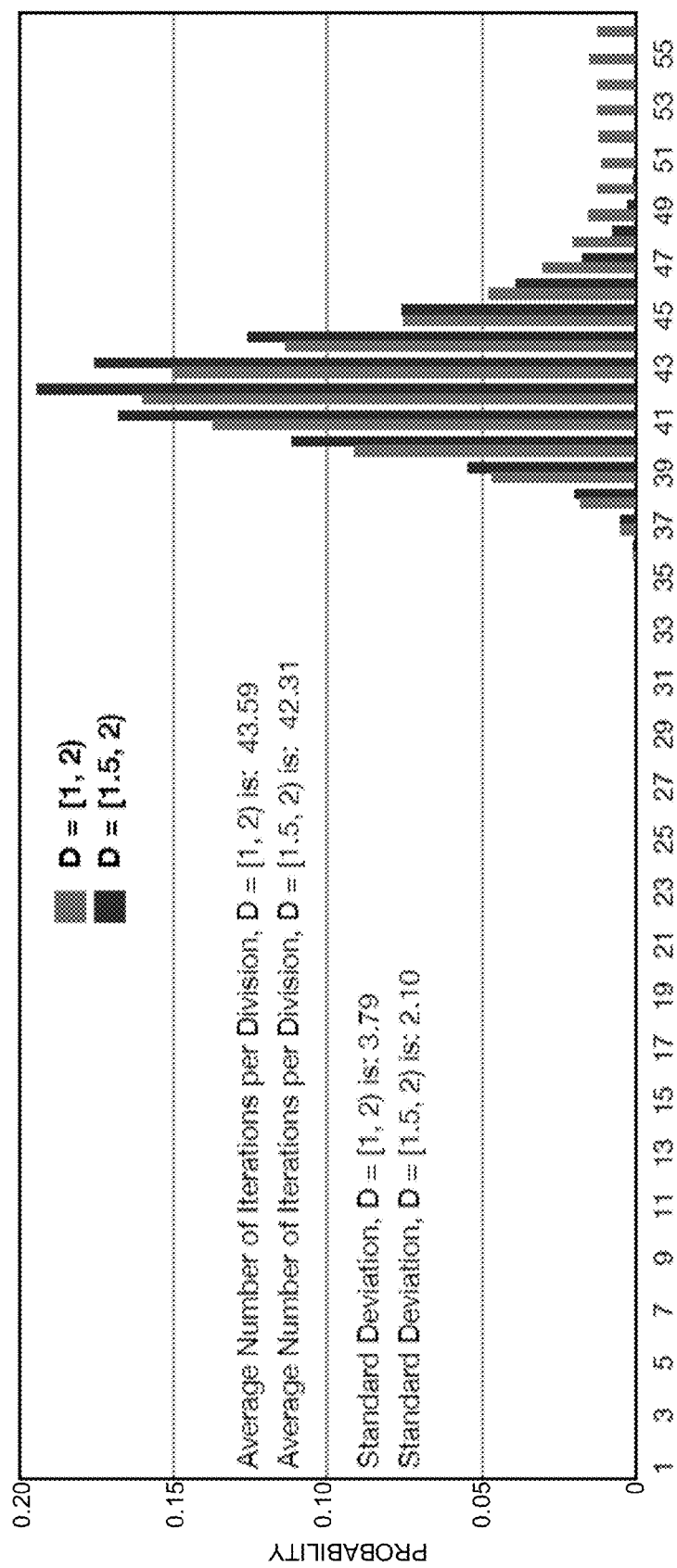
FIG. 43 illustrates a probability distribution of the number of iterations for division technique #3a for a set of randomized division operations in accordance with an embodiment.
Figure 44:
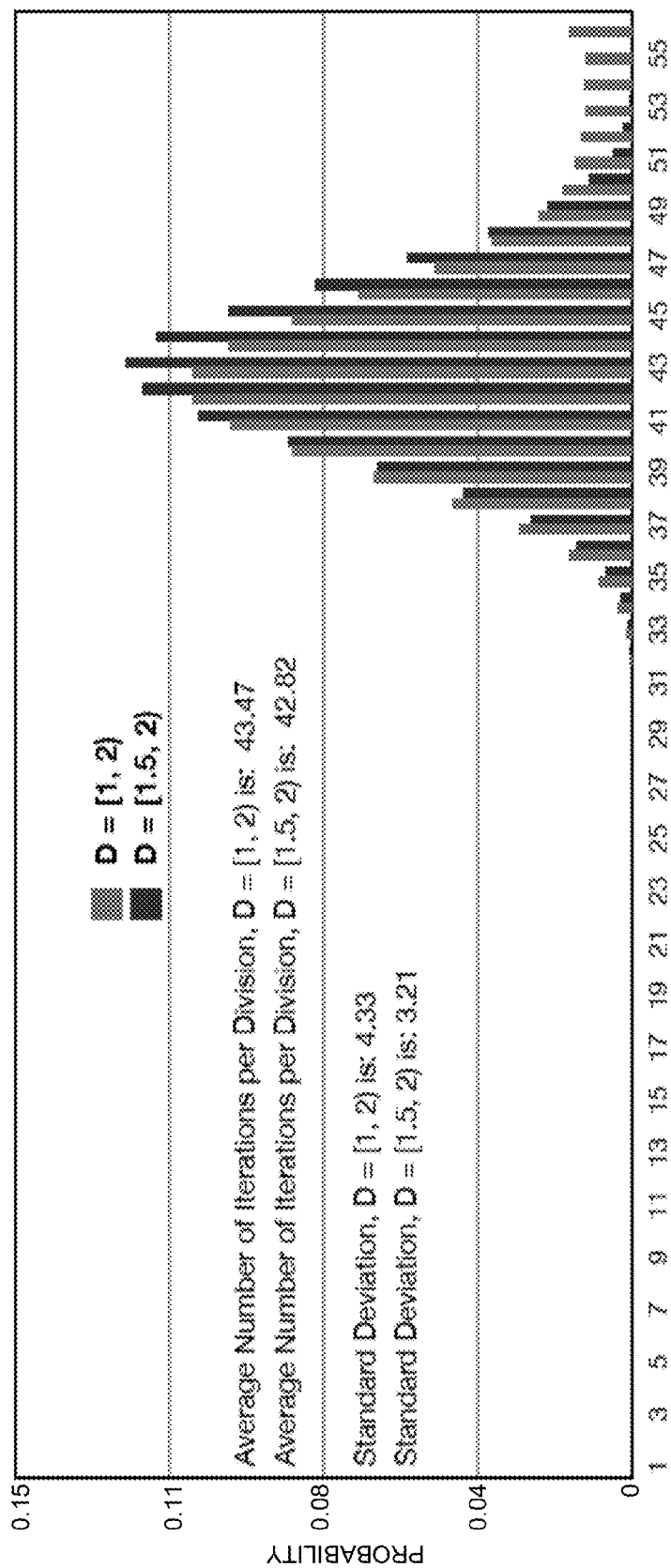
FIG. 44 illustrates a probability distribution of the number of iterations for division technique #4a for a set of randomized division operations in accordance with an embodiment.
Figure 45:
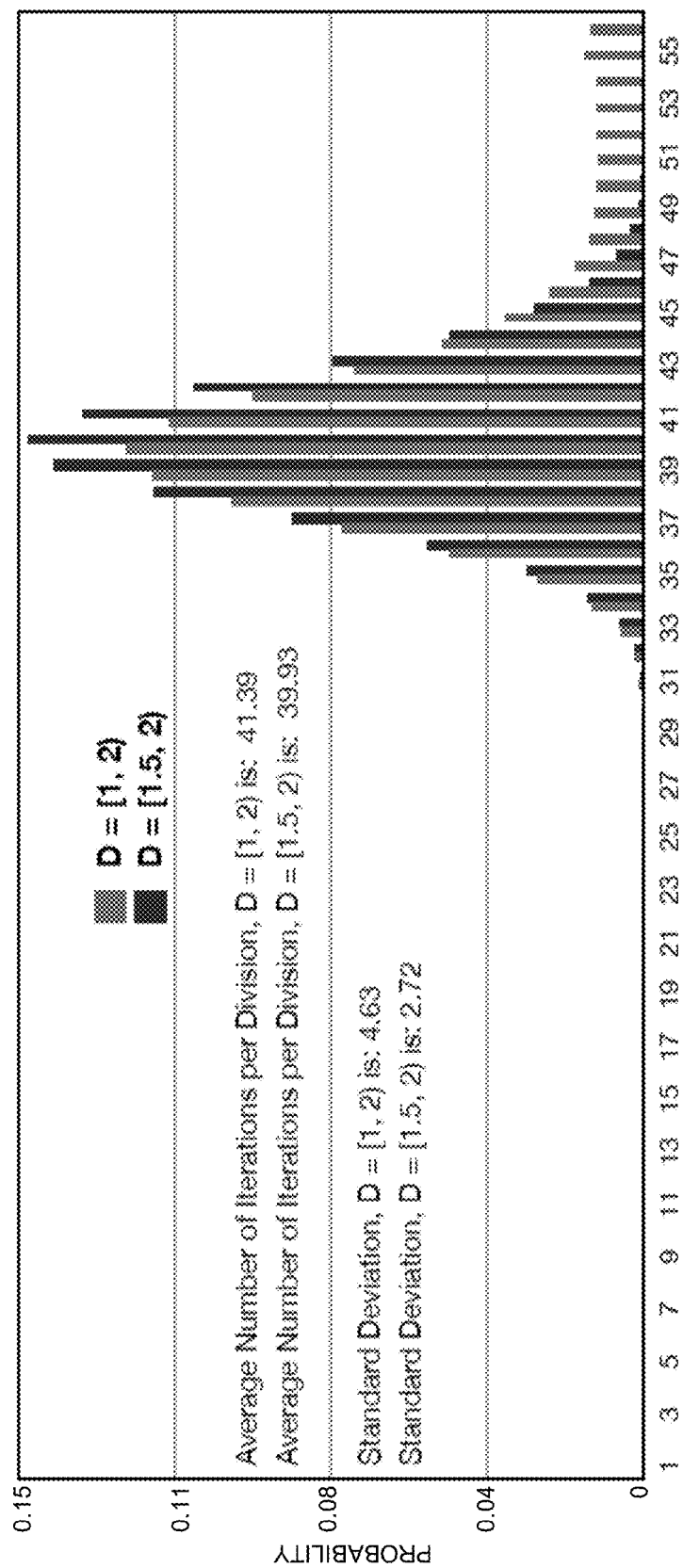
FIG. 45 illustrates a probability distribution of the number of iterations for division technique #5a for a set of randomized division operations in accordance with an embodiment.
Figure 46:
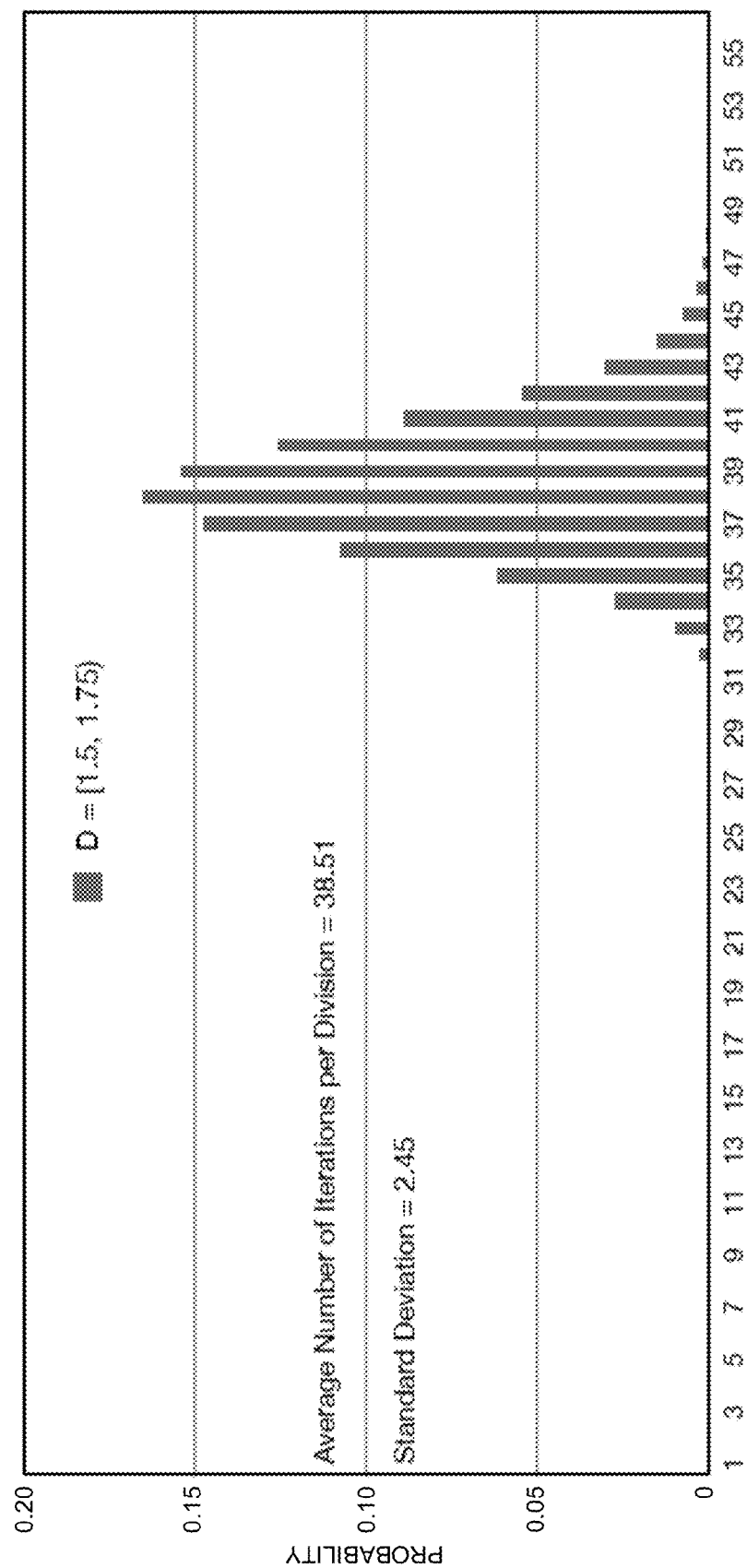
FIG. 46 illustrates a probability distribution of the number of iterations for division technique #6a for a set of randomized division operations in accordance with an embodiment.
Figure 47:
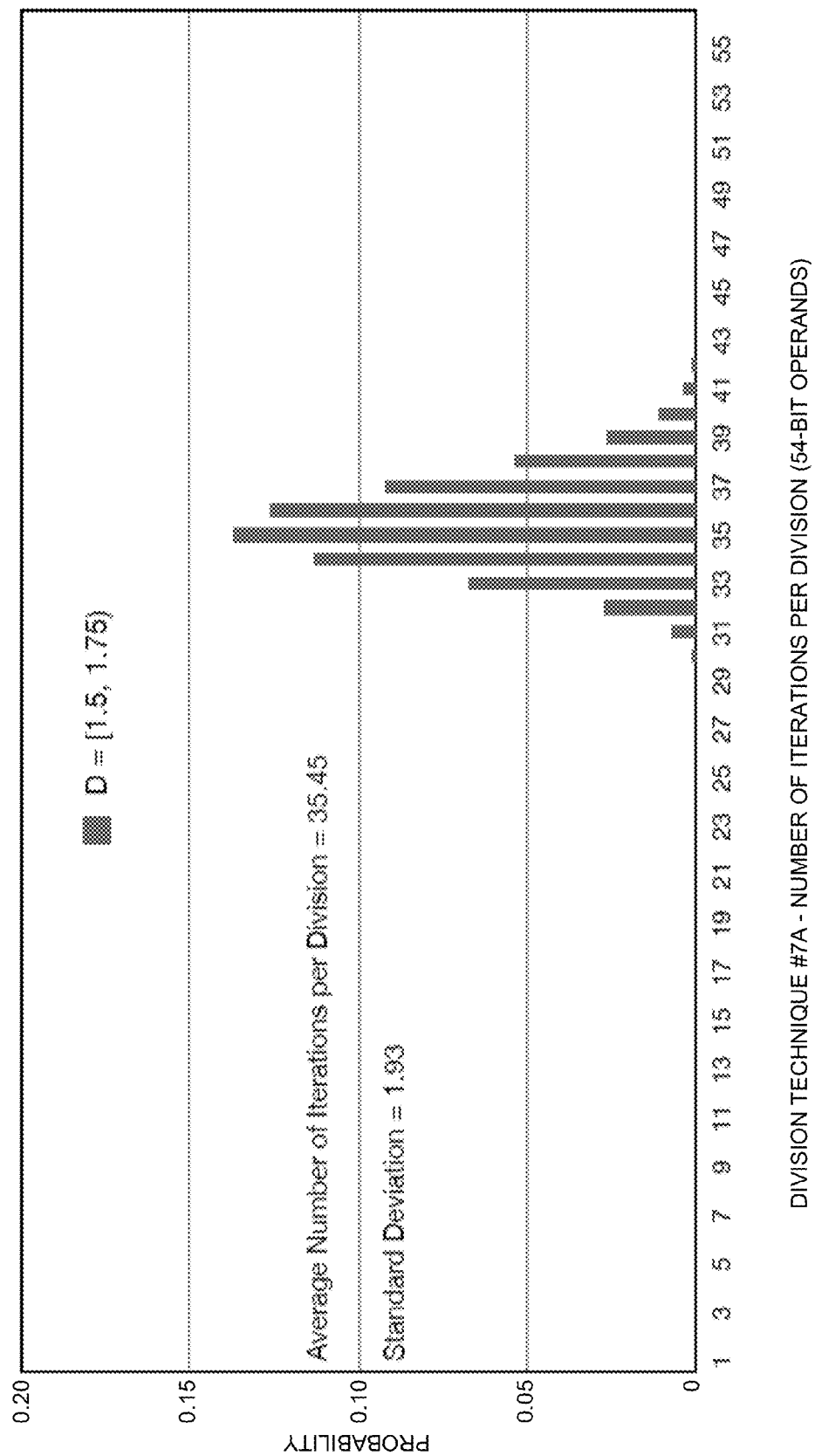
FIG. 47 illustrates a probability distribution of the number of iterations for division technique #7a for a set of randomized division operations in accordance with an embodiment.
Figure 48:
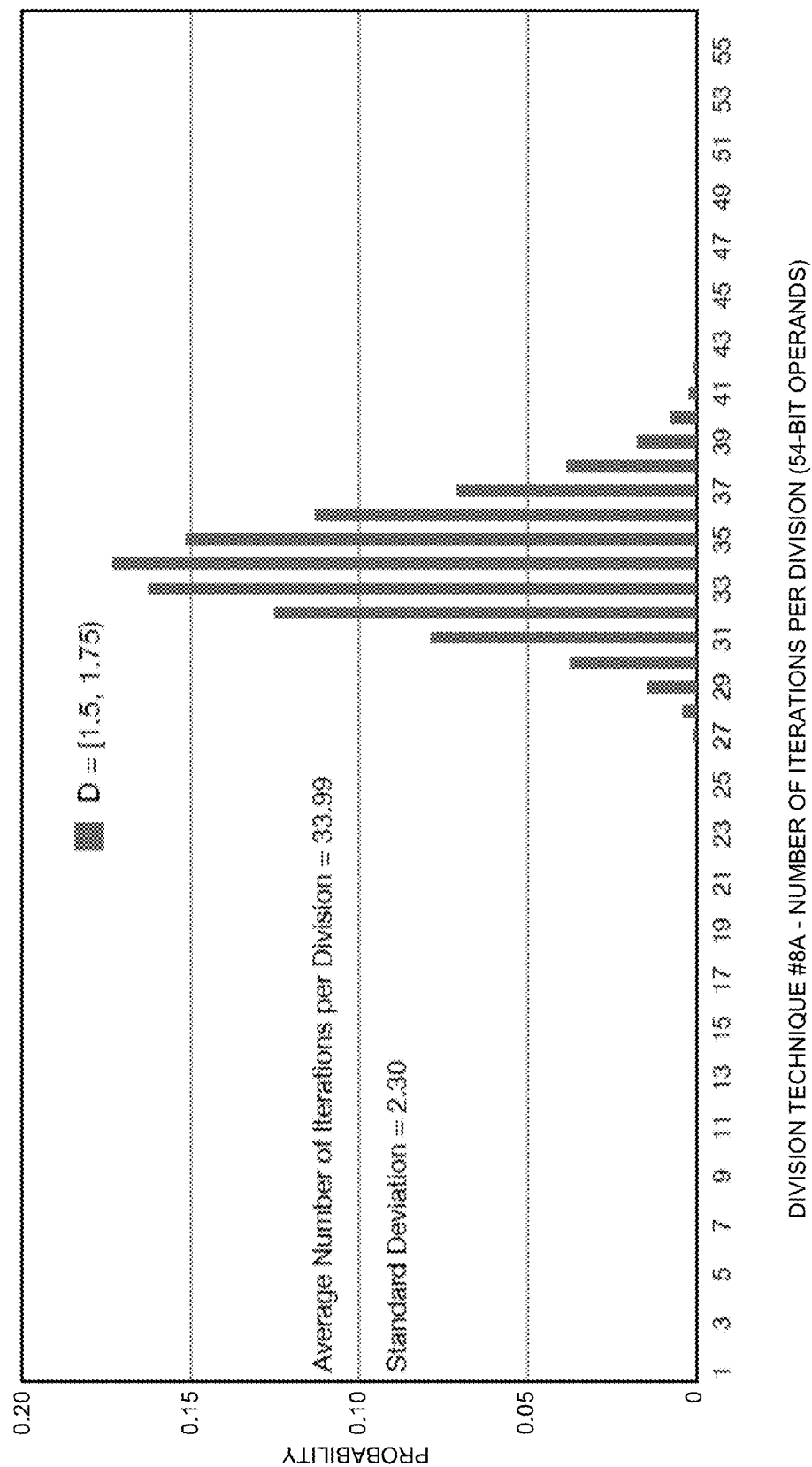
FIG. 48 illustrates a probability distribution of the number of iterations for division technique #8a for a set of randomized division operations in accordance with an embodiment.
Figure 49:
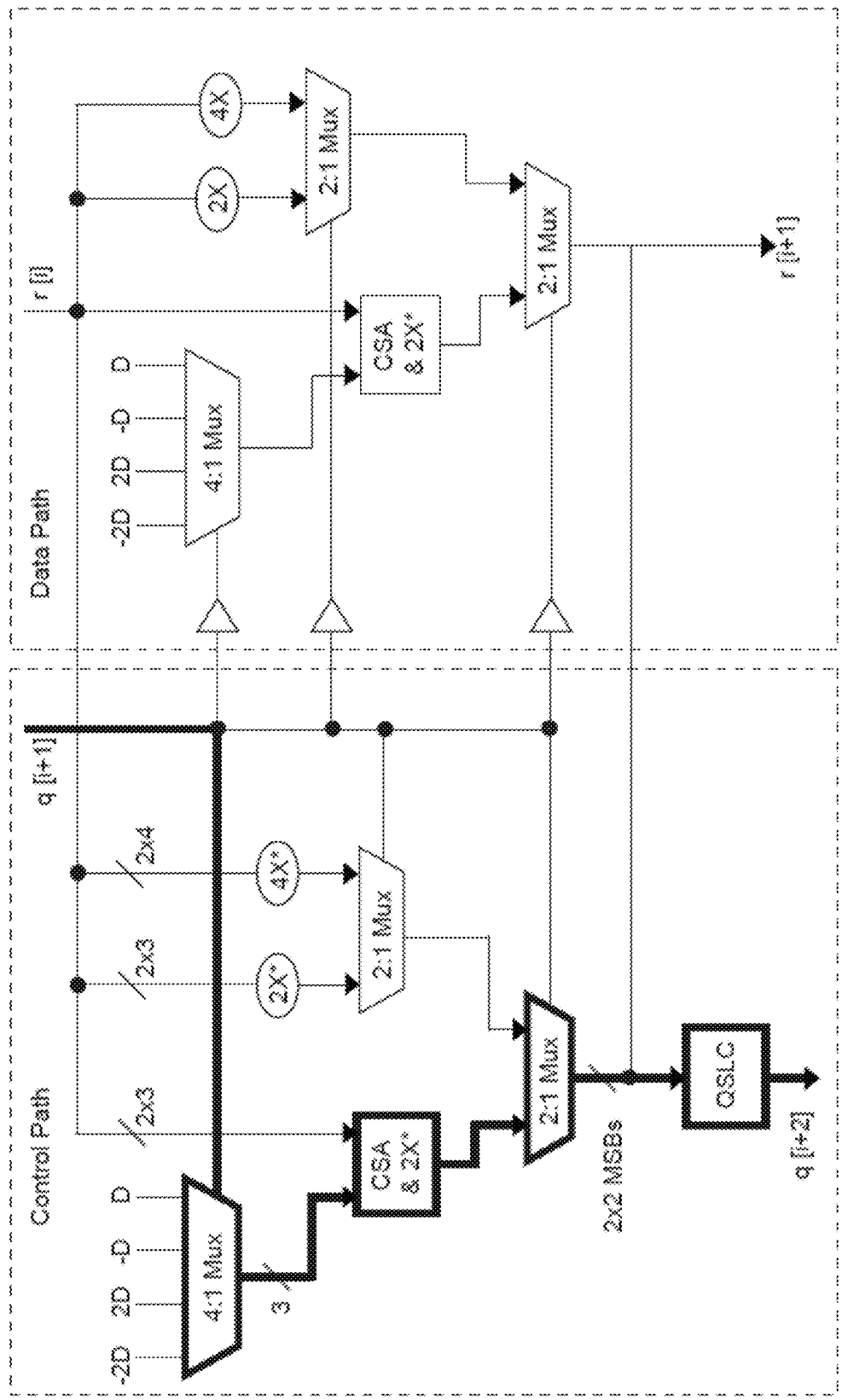
FIG. 49 illustrates an exemplary implementation of a data path and a control path for division technique #2a in accordance with an embodiment.
Figure 50:
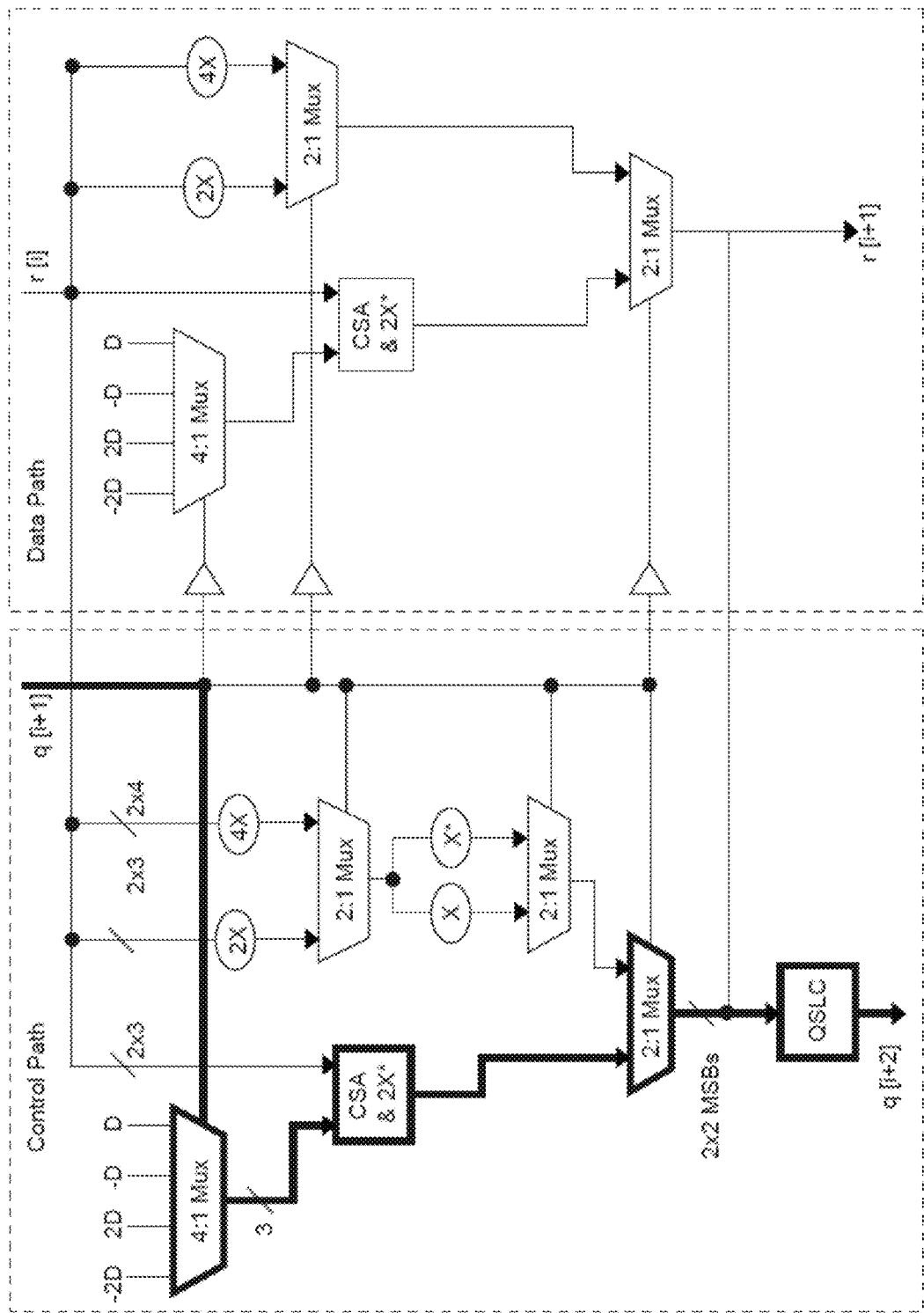
FIG. 50 illustrates an exemplary implementation of a data path and a control path for division technique #3a in accordance with an embodiment.
Figure 51:
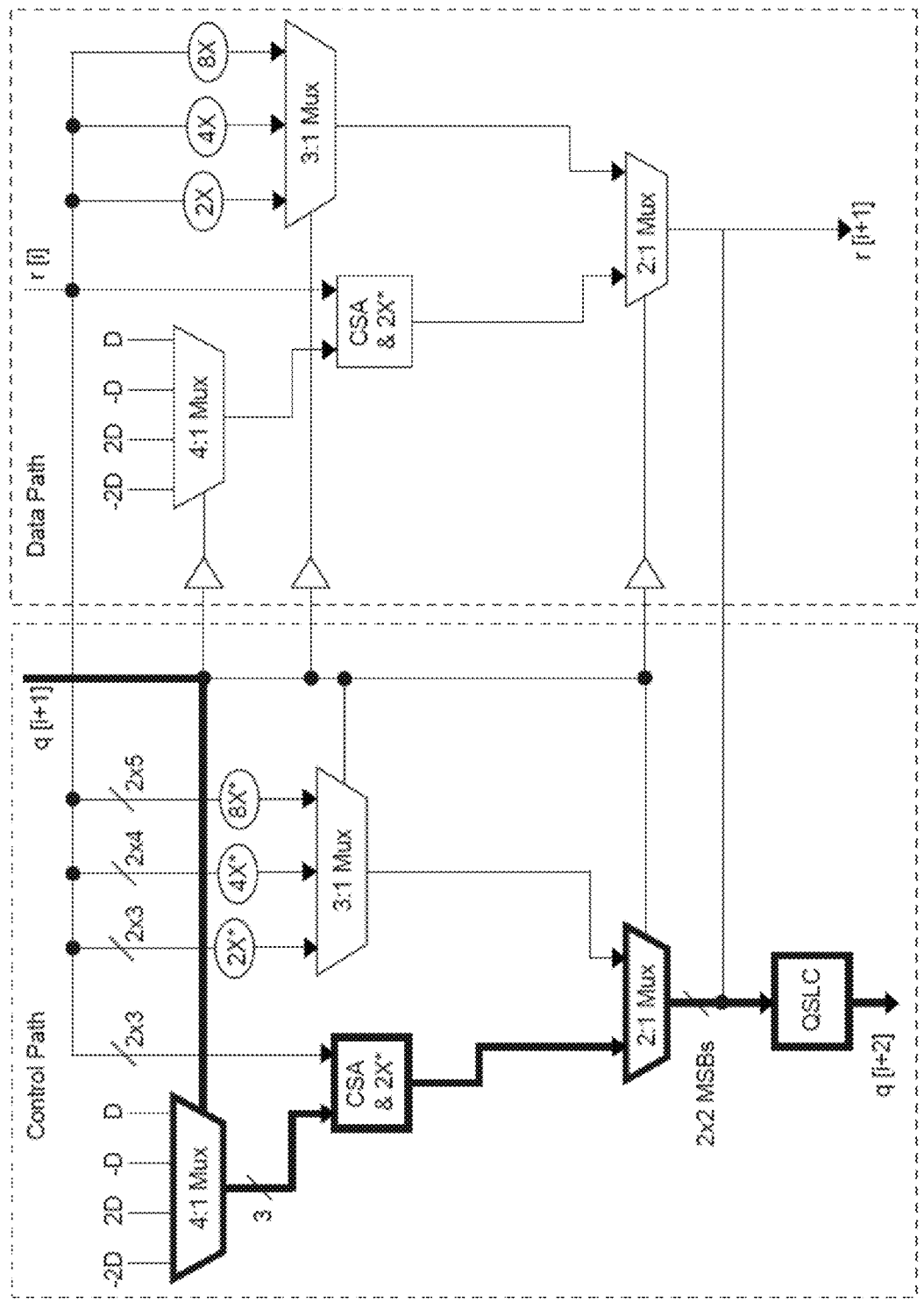
FIG. 51 illustrates an exemplary implementation of a data path and a control path for division technique #4a in accordance with an embodiment.
Figure 52:
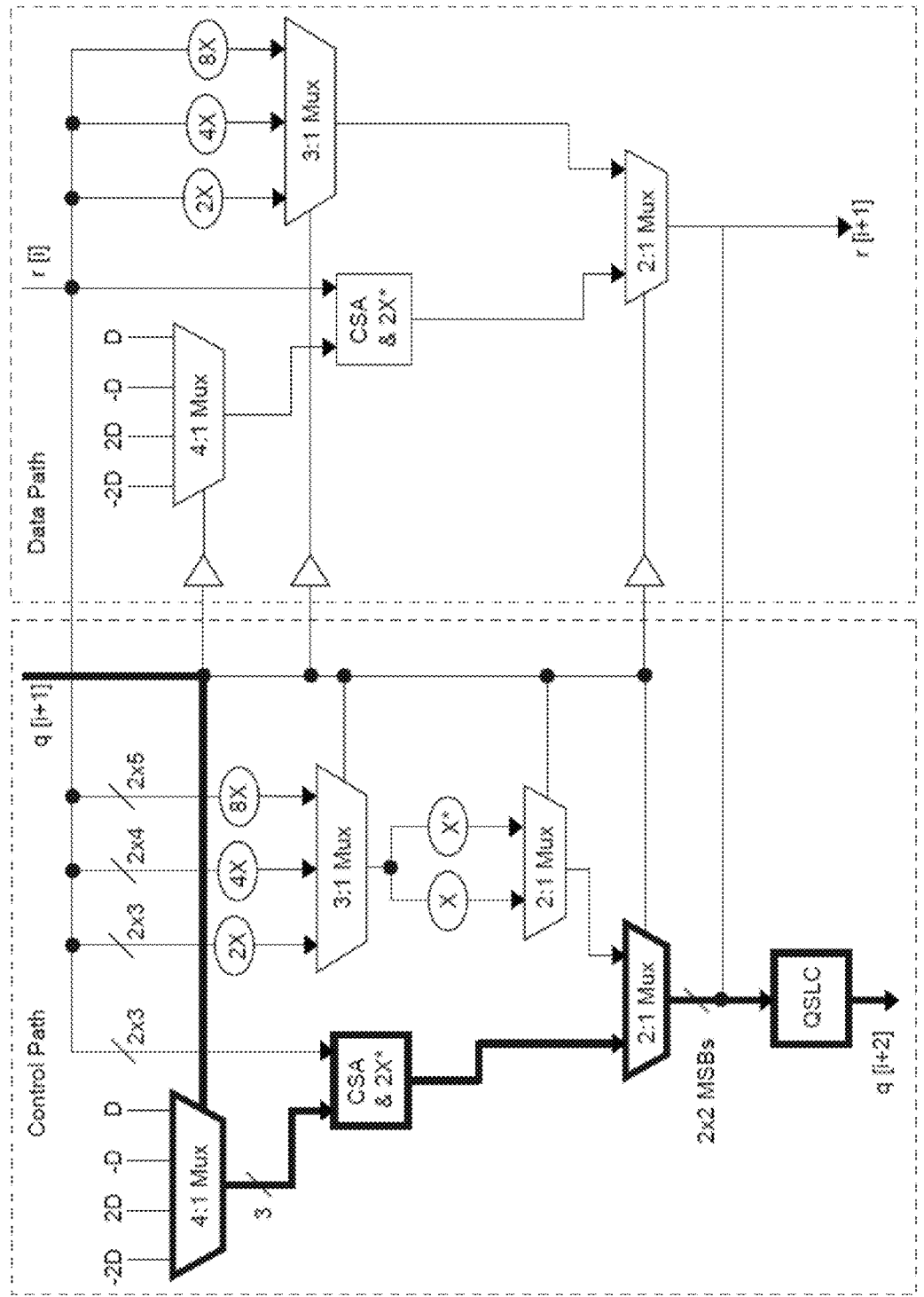
FIG. 52 illustrates an exemplary implementation of a data path and a control path for division technique #5a in accordance with an embodiment.

Note that, as for techniques #2-#8 in section 3.0, the above average iteration estimations for techniques #2a-#8a are based on simulations of two million randomized division operations for each of the division techniques; the input operands for the division were random 54-bit divisors and dividends. Probability distributions that illustrate the number of iterations per division for these simulated division operations are illustrated for each technique in FIGS. 42-48; FIG. 42 illustrates the probability distribution for technique #2a, FIG. 43 illustrates the probability distribution for technique #3a, FIG. 44 illustrates the probability distribution for technique #4a, FIG. 45 illustrates the probability distribution for technique #5a, FIG. 46 illustrates the probability distribution for technique #6a, FIG. 47 illustrates the probability distribution for technique #7a, and FIG. 48 illustrates the probability distribution for technique #8a. Note that for techniques #2a-#5a, the probability distribution when D∈[1, 2) (e.g., the distribution of light gray bars in the corresponding figure) has a tail to the right; the probability distributions when D∈[1.5, 2) (e.g., the distribution of dark gray bars) in contrast form a normal distribution.

As for techniques #2-#8 previously, an unanswered question is what the maximum number of iterations per division is for techniques #2a-#5a when D∈[1.5, 2) and for techniques #6a-#8a when D∈[1.5, 1.75). Assuming that the probability distribution is normal, one can use $N_{avg}+5\sigma$ (as described previously) to find an approximate maximum number of iterations per division. Approximate maximum values for $N_{avg}+5\sigma$ are: 56 maximum iterations for techniques #2a, #3a, and #4a; 53.6 maximum iterations for technique #5a; 50.71 maximum iterations for technique #6a; 45.1 maximum iterations for technique #7a; and 45.5 maximum iterations for technique #8.

4.1 Implementing Division Techniques #2a-#8a

FIGS. 49-52 illustrate the schematics for exemplary implementations of division techniques #2a-#5a, respectively. For these techniques, the critical path delay (illustrated in bold), and hence the average latency per division, $L_{iter}$, is:

$$L_{iter}=D_{4:1Mux}+D_{csa}+D_{2:1Mux}+D_{qsic}+D_{\mathit{ff}} \quad (16)$$

Note that this critical path equation is the same as equation (4), the previous equation for techniques #2-#4. However, because the quotient selection logic is different for all of these techniques, the latency per iteration may be different for each technique.

Figure 53:
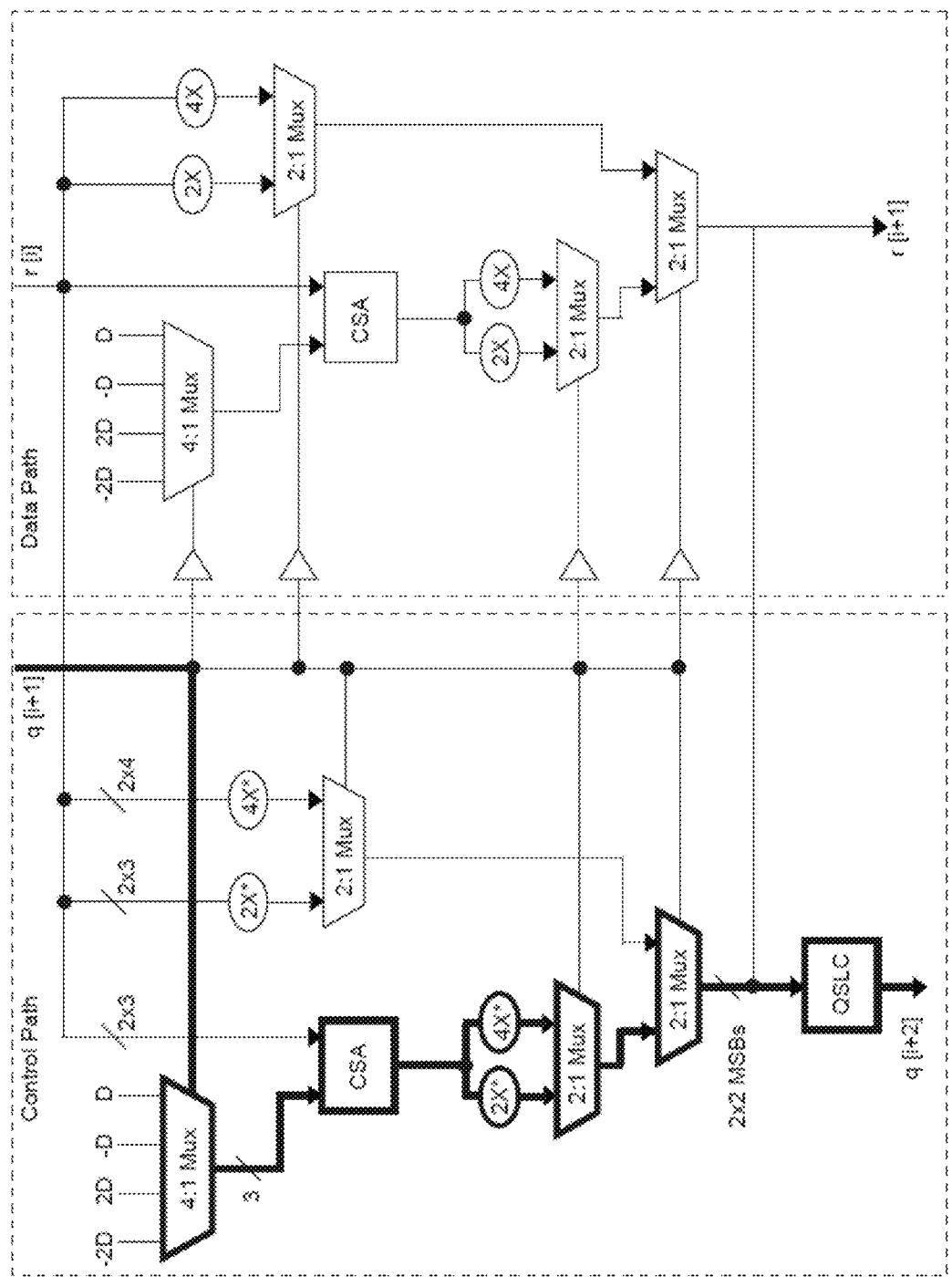
FIG. 53 illustrates an exemplary implementation of a data path and a control path for division technique #6a in accordance with an embodiment.
Figure 54:
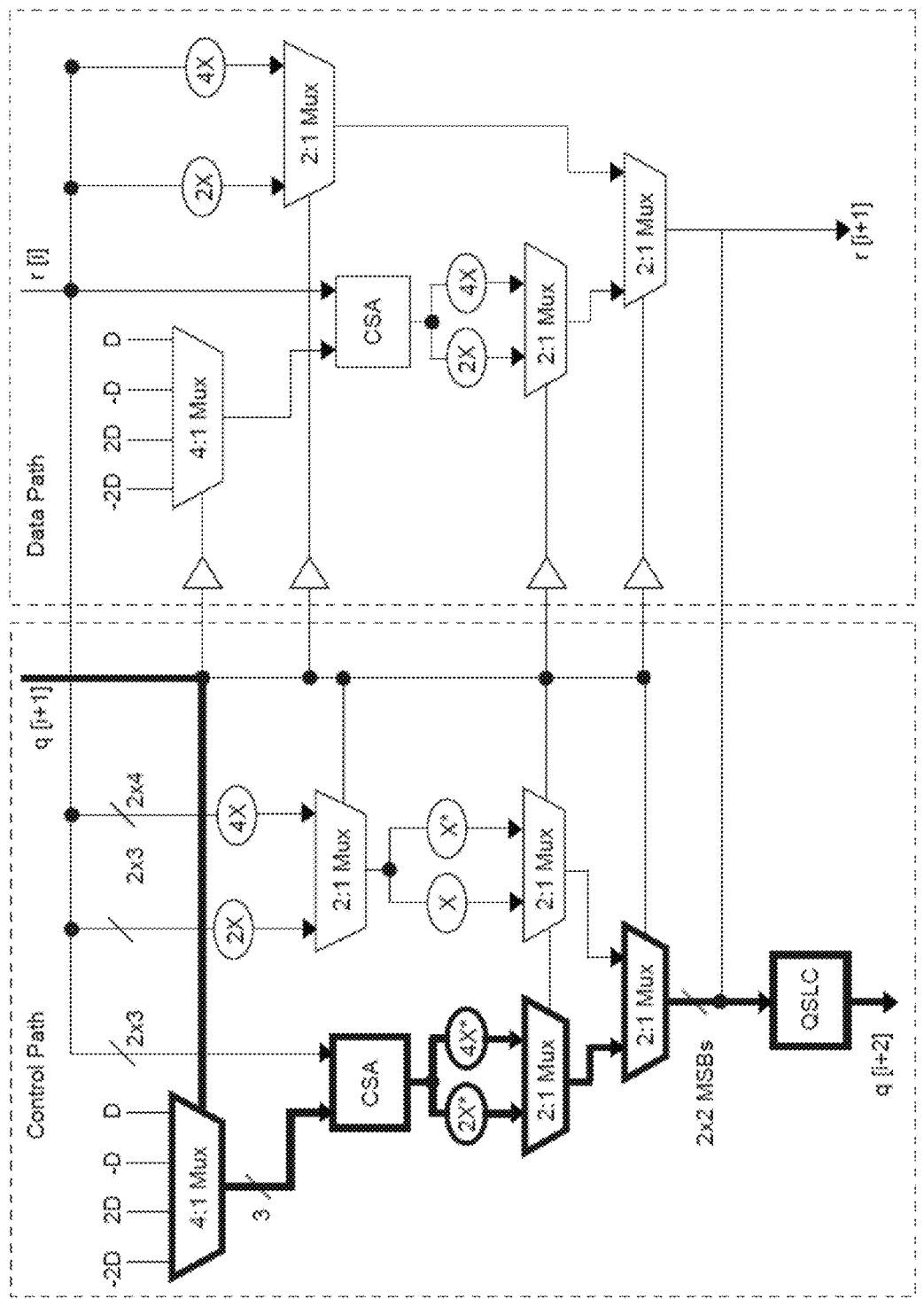
FIG. 54 illustrates an exemplary implementation of a data path and a control path for division technique #7a in accordance with an embodiment.
Figure 55:
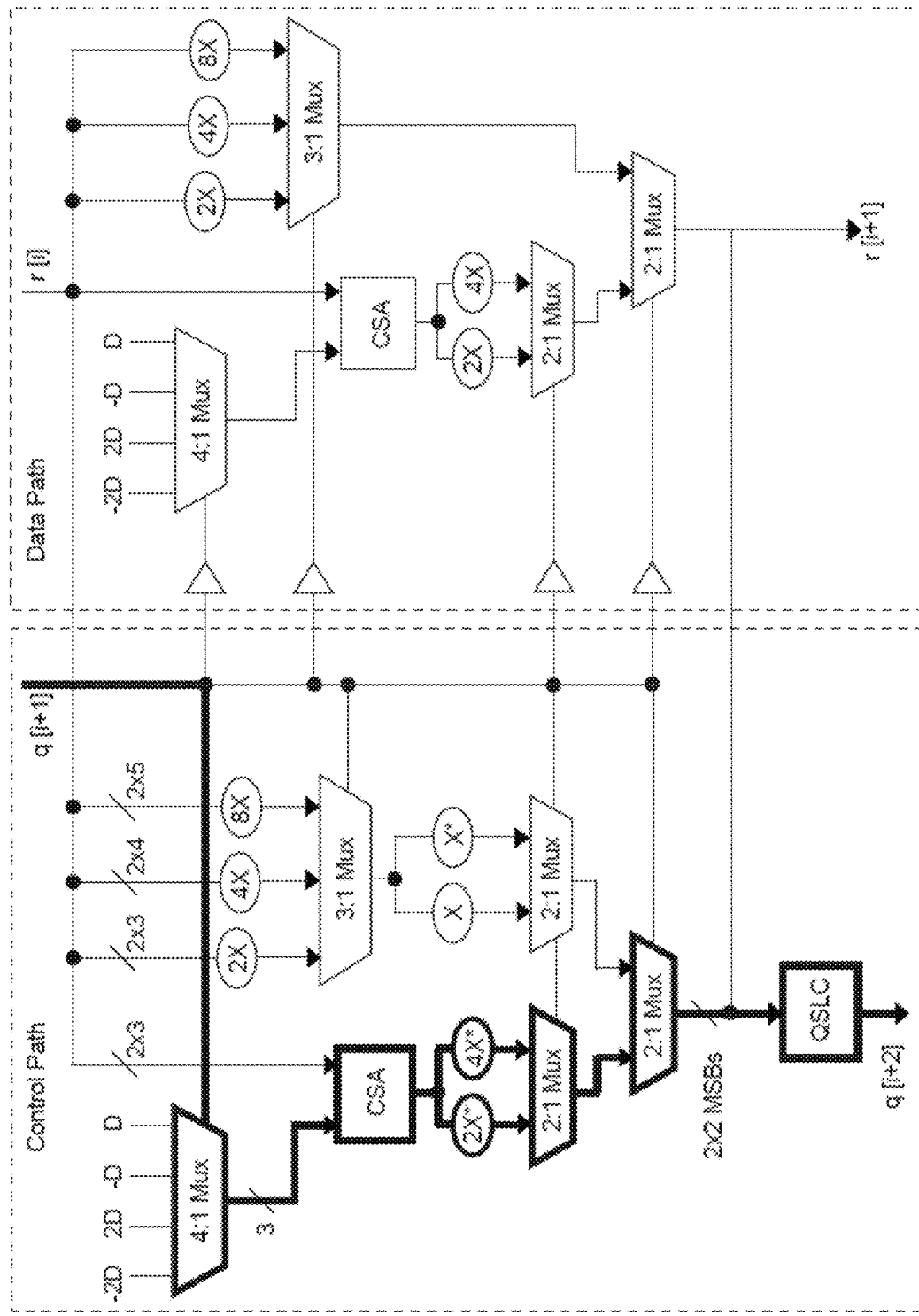
FIG. 55 illustrates an exemplary implementation of a data path and a control path for division technique #8a in accordance with an embodiment.

FIGS. 53-55 illustrate the schematics for exemplary implementations of division techniques #6a-#8a, respectively. The latency per iteration for these techniques is:

$$L_{iter} = D_{4:1Mux} + D_{csa} + 2*D_{2:1Mux} + D_{qsic} + D_{ff} \quad (17)$$

Again, this critical path equation is the same as equation (5), the previous equation for techniques #6-#8. Again, because the quotient selection logic is different for all of these techniques, the latency per iteration may be different for each technique.

4.3 Latency per Division

Techniques #1a-#8a generally reduce the delay in the quotient selection logic in comparison with techniques #1-#8, respectively, thereby reducing the average latency per iteration. As mentioned in section 3.3, the total latency per division for each technique also needs to consider the overhead associated with divisor scaling, if applicable (e.g., equations (6) and (7) may be also be applied to techniques #1a-#8a to determine the average latency per division for a range of scenarios).

As mentioned in section 3.3, some division techniques may on average take fewer iterations per division, but still have a longer average latency per division because of either longer latency per iteration or scaling overhead, and choosing an appropriate division technique for a particular design may involve considering such division performance trade-offs and the specific constraints for a design. In general, however, simulations and design factors indicate that, because of the reduced delay in the quotient selection logic, techniques #1a-#8a have a lower average latency per division than techniques #1-#8, respectively.

5.0 Division Techniques for Small Divisors

The preceding sections describe several variable-latency division techniques that execute in (on average) fewer iterations per division when the divisor is in the range [1.5, 2) (instead of the range [1, 2) or [1, 1.5)). In some embodiments, the above-described division techniques can be adjusted to reduce the average number of iterations per division when the divisor is in the range [1, 1.5).

Figure 56:
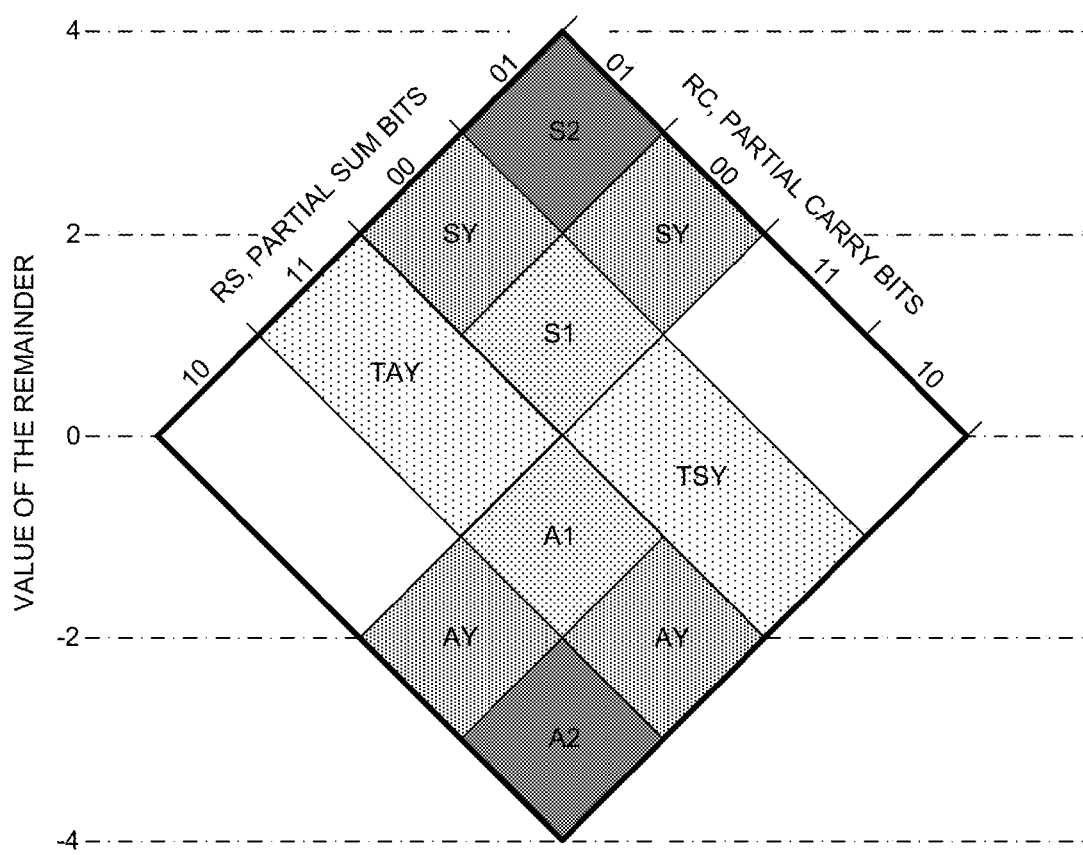
FIG. 56 illustrates the effects of carry-save addition when subtracting 2D in an SY region and 2D in an AY region in accordance with an embodiment.

Another division technique, division technique #2b, reduces the average number of iterations per division for divisors in the range [1, 1.5). Consider the rs and rc space illustrated in FIG. 56; the SY and AY regions can be replaced with S2 and A2 regions, respectively. In these expanded S2 and A2 regions, technique #2b can execute S2 & 2X* and A2 & 2X* operations, respectively. FIG. 56 illustrates the transformations that occur when subtracting 2*D from a point (Rs, Rc) in region SY and adding 2*D to a point (Rs, Rc) in region AY.

Consider the calculation of the two most significant bits of rs and rc in the SY region. As previously, R and D are represented with K+2 non-fractional bits and L fractional bits. For D∈[1, 5), the two's complement representation of 2D is 10.x, and −2D is 01.y+1, where y is the bit-wise complement of x and +1 denotes the addition of 1 at the least significant position. Also, the partial carry or the majority bits are shifted one position to the left. When twice the divisor, 2*D, is subtracted from a point in the SY region, one gets:

$$\begin{aligned} rs &= 00 \\ rc &= 00 \\ -2D &= 01.y + 1 \\ \hline \text{partial sum} &= 00 \\ \text{partial carry} &= 1? \end{aligned}$$

Figure 57:
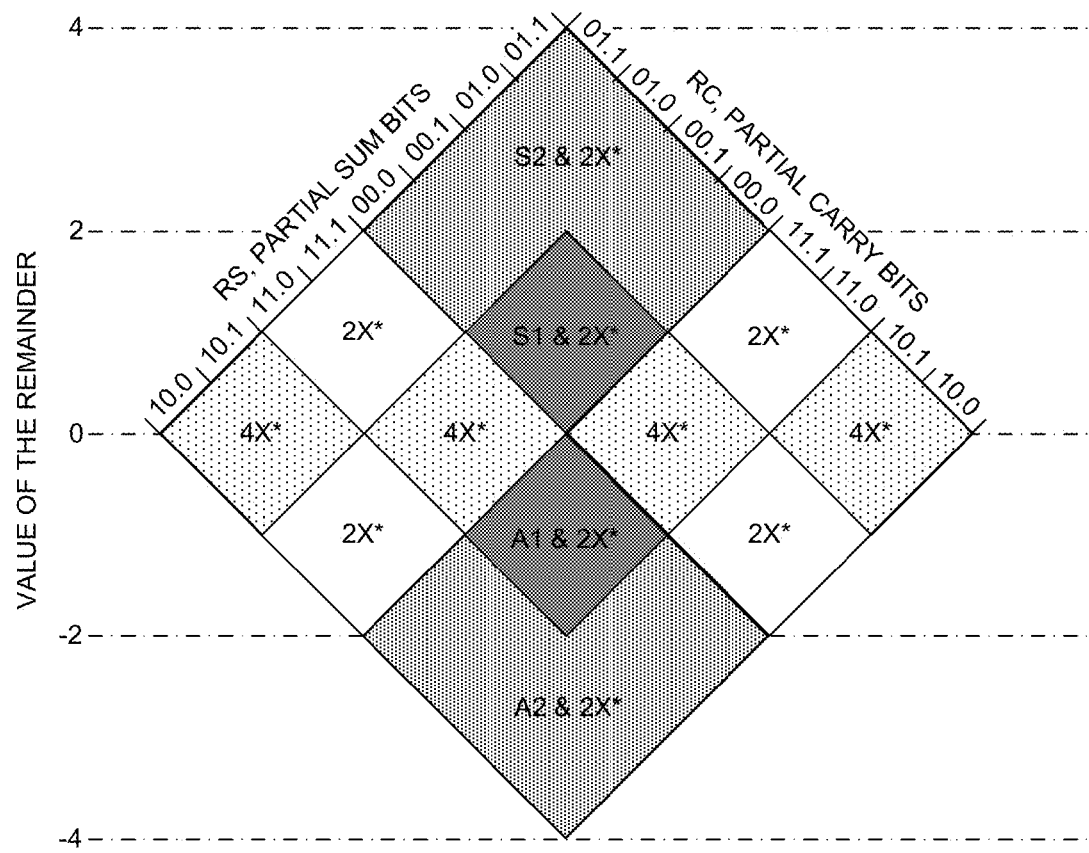
FIG. 57 illustrates the alternatives for division technique #2b in the rs and rc plane in accordance with an embodiment.

As a consequence, subtracting 2*D from a point in the SY region yields a point in the TSY region, where the technique performs either the 2X* or the 4X* operation depending on the value of the second-most significant bit of the partial carry bits. Because the value of the second most-significant bit of the partial carry bits is unknown, performing the 2X* operation after the subtraction will ensure that the result is within the outer bold diamond illustrated in FIG. 56. Therefore, one can perform the S2 & 2X* operation in the SY region. Similarly, adding 2*D to a point in the AY region yields a point in the TAY region, where the technique performs either a 2X* or a 4X* operation. Therefore, one can perform the A2 & 2X* operation in the AY region. The six alternatives for division technique #2b are illustrated in FIG. 57. Simulations indicate that, on average, technique #2b needs 45.36 iterations to compute 56 quotient digits. Note that for technique #2b, D needs to be in the range [1, 1.5).

Figure 58:
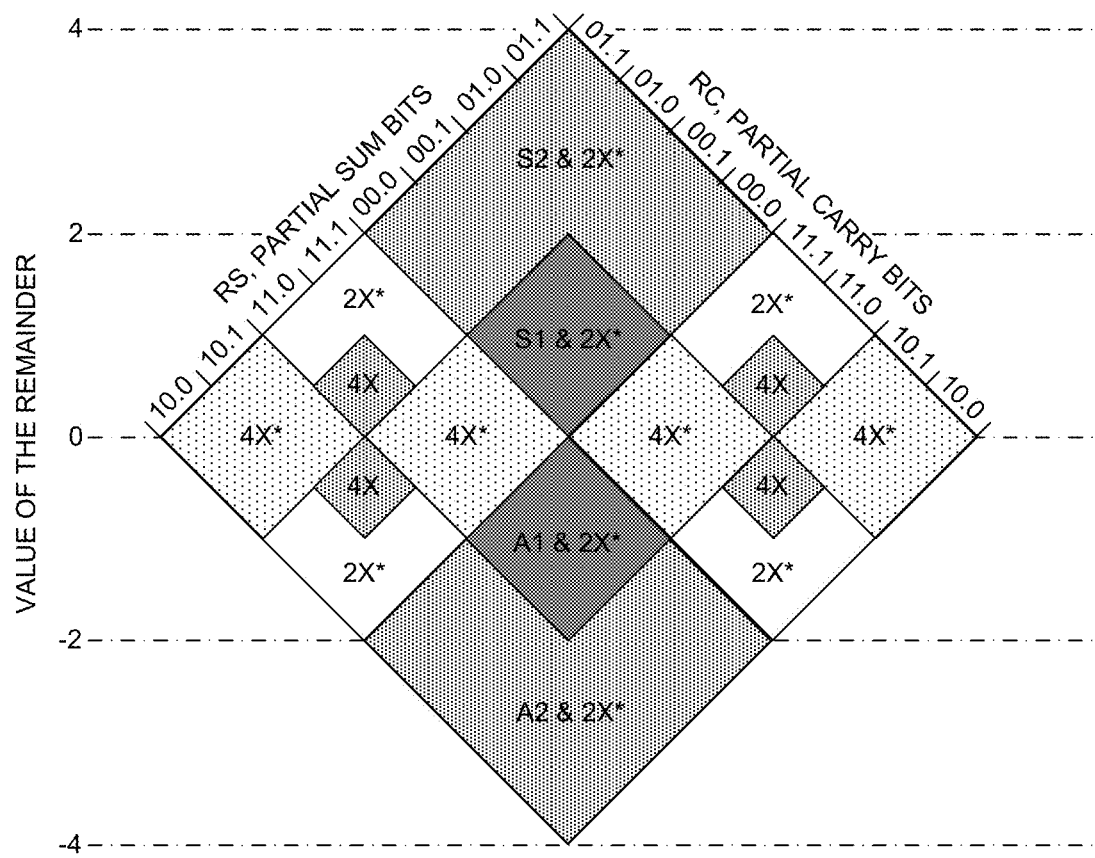
FIG. 58 illustrates the alternatives for division technique #3b in the rs and rc plane in accordance with an embodiment.

Division technique #3b adds a 4x alternative to technique #2b, where the 4x alternative executes the actions of the 2x alternative twice. Technique #3b executes one of the following seven alternatives in every iteration: 4x, 2X*, 4X*, S1 & 2X*, S2 & 2X*, A1 & 2X*, and A2 & 2X*; FIG. 58 illustrates these alternatives in the rs and rc plane. In the 4x and 4X* regions, the technique retires two quotient digits, namely "00". Simulations indicate that when D∈[1, 1.5), technique #3b on average takes 42.8 iterations to compute 56 quotient digits.

Figure 59:
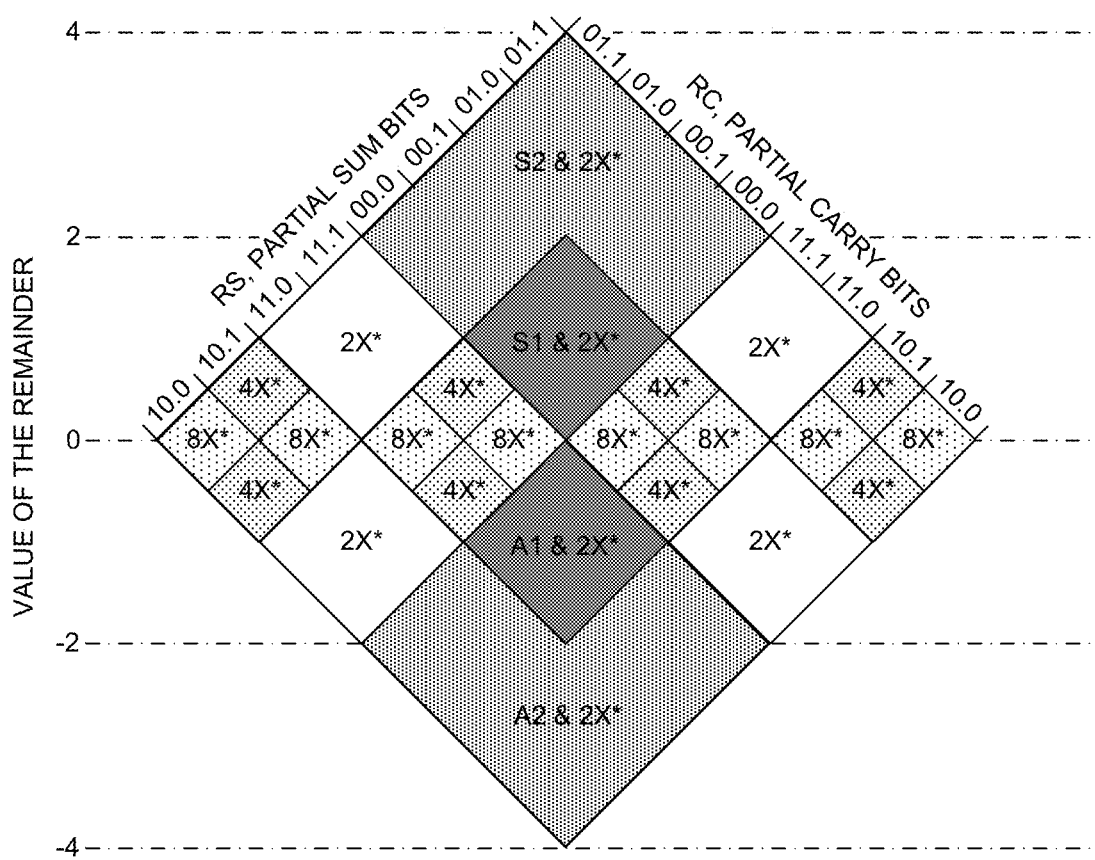
FIG. 59 illustrates the alternatives for division technique #4b in the rs and rc plane in accordance with an embodiment.

Division technique #4b adds an 8X* alternative to technique #2b, where the 8X* alternative executes the actions of the 2X* alternative three times. Like technique #3b, technique #4b also has seven alternatives: 2X*, 4X*, 8X*, S1 & 2X*, S2 & 2X*, A1 & 2X*, A2 & 2X*; FIG. 59 illustrates these alternatives in the rs and rc plane. In 8X* regions, the technique retires three quotient digits, namely "000"; thus, technique #4b can retire one, two, or three quotient digits per iteration. Simulations indicate that when D∈[1, 1.5), technique #4b on average takes 42.28 iterations to compute 56 quotient digits.

Figure 60:
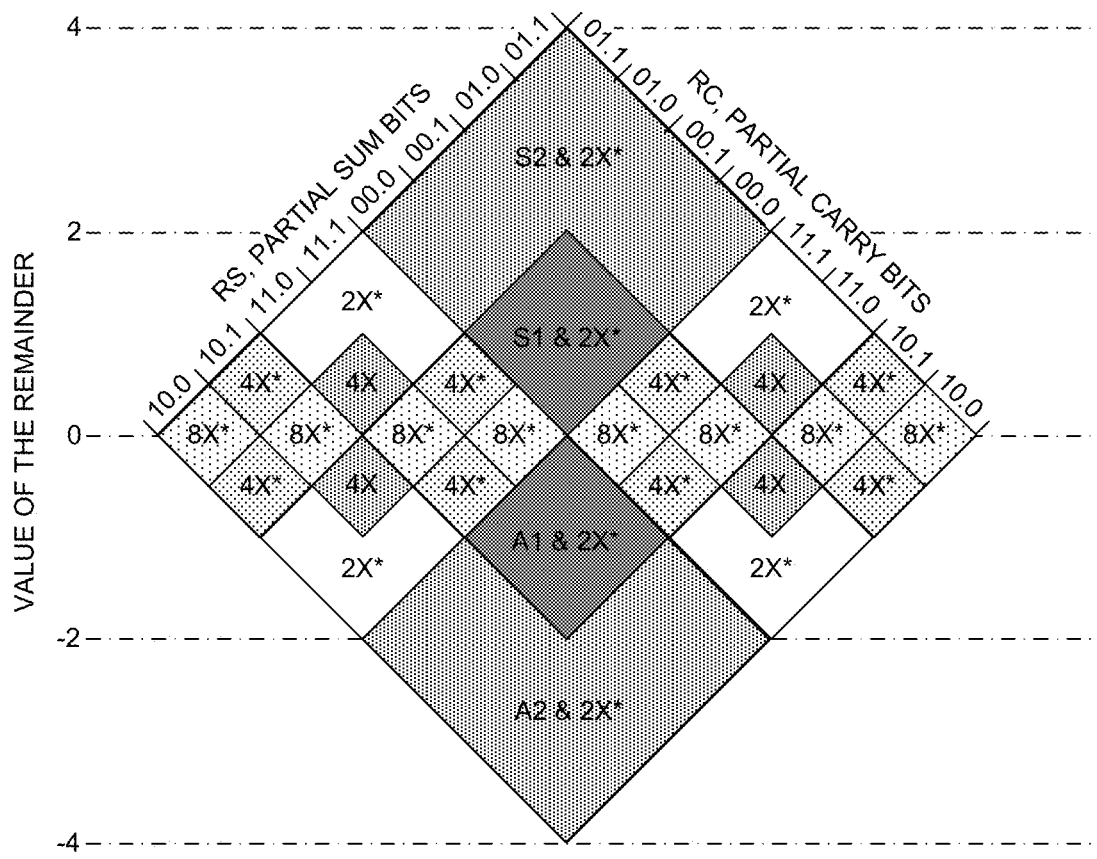
FIG. 60 illustrates the alternatives for division technique #5b in the rs and rc plane in accordance with an embodiment.

Division technique #5b combines techniques #3b and #4b; e.g., technique #5b adds both the 4x and the 8X* alternatives to technique #2b. FIG. 60 illustrates these alternatives in the rs and rc plane. Simulations indicate that when D∈[1, 1.5), technique #5b on average takes 40.39 iterations to compute 56 quotient digits.

Figure 61:
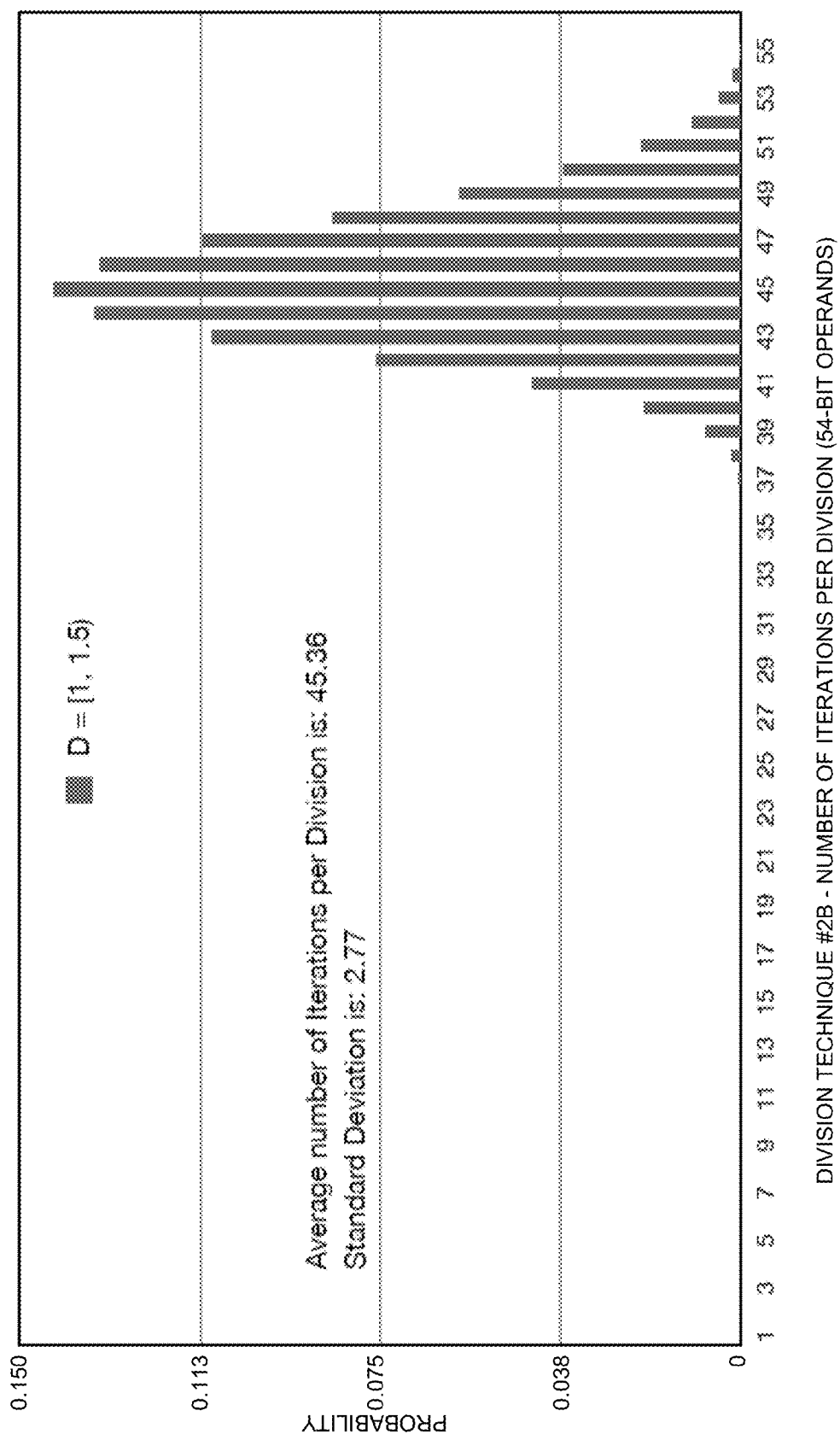
FIG. 61 illustrates a probability distribution of the number of iterations for division technique #2b for a set of randomized division operations in accordance with an embodiment.
Figure 62:
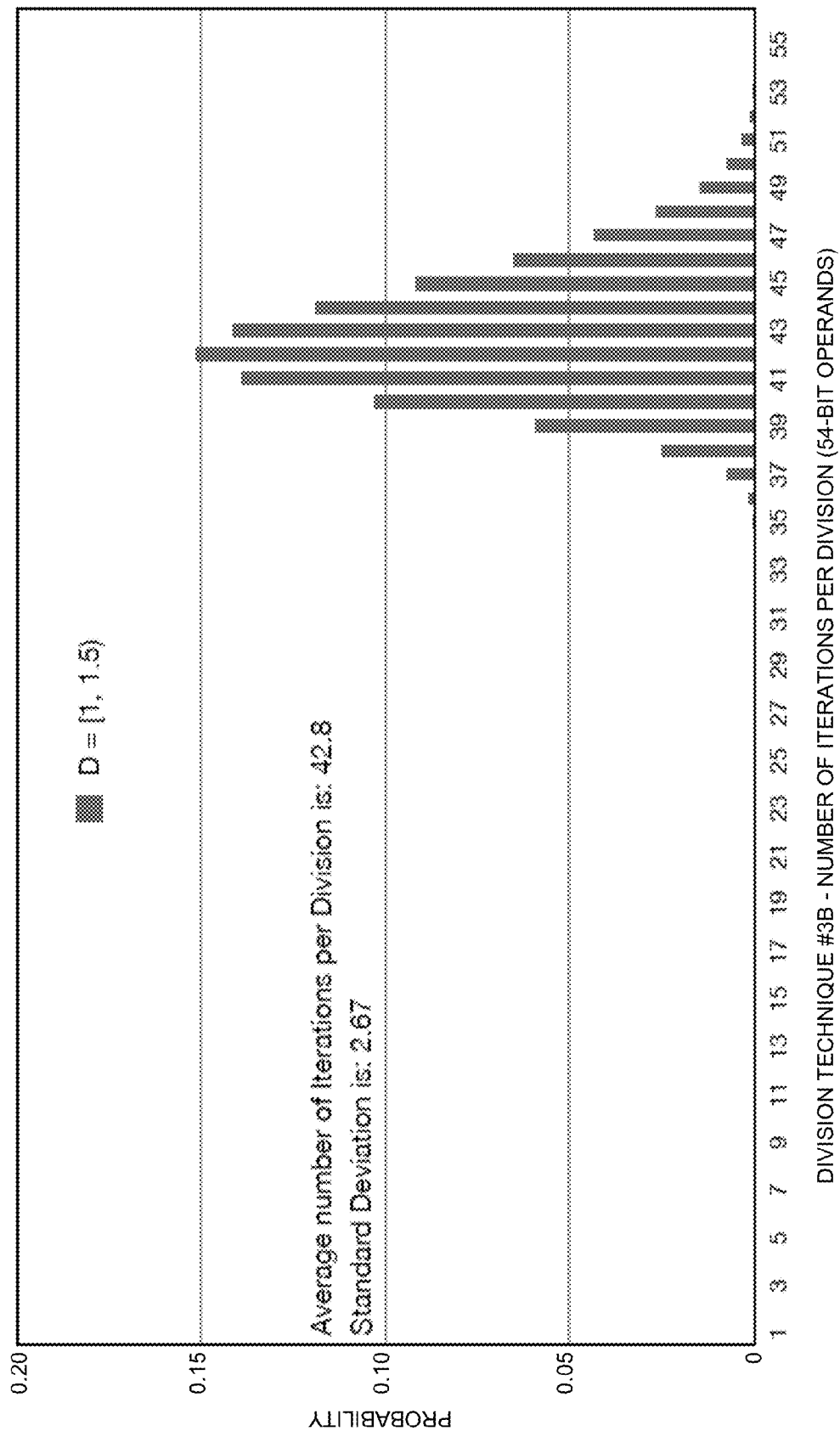
FIG. 62 illustrates a probability distribution of the number of iterations for division technique #3b for a set of randomized division operations in accordance with an embodiment.
Figure 63:
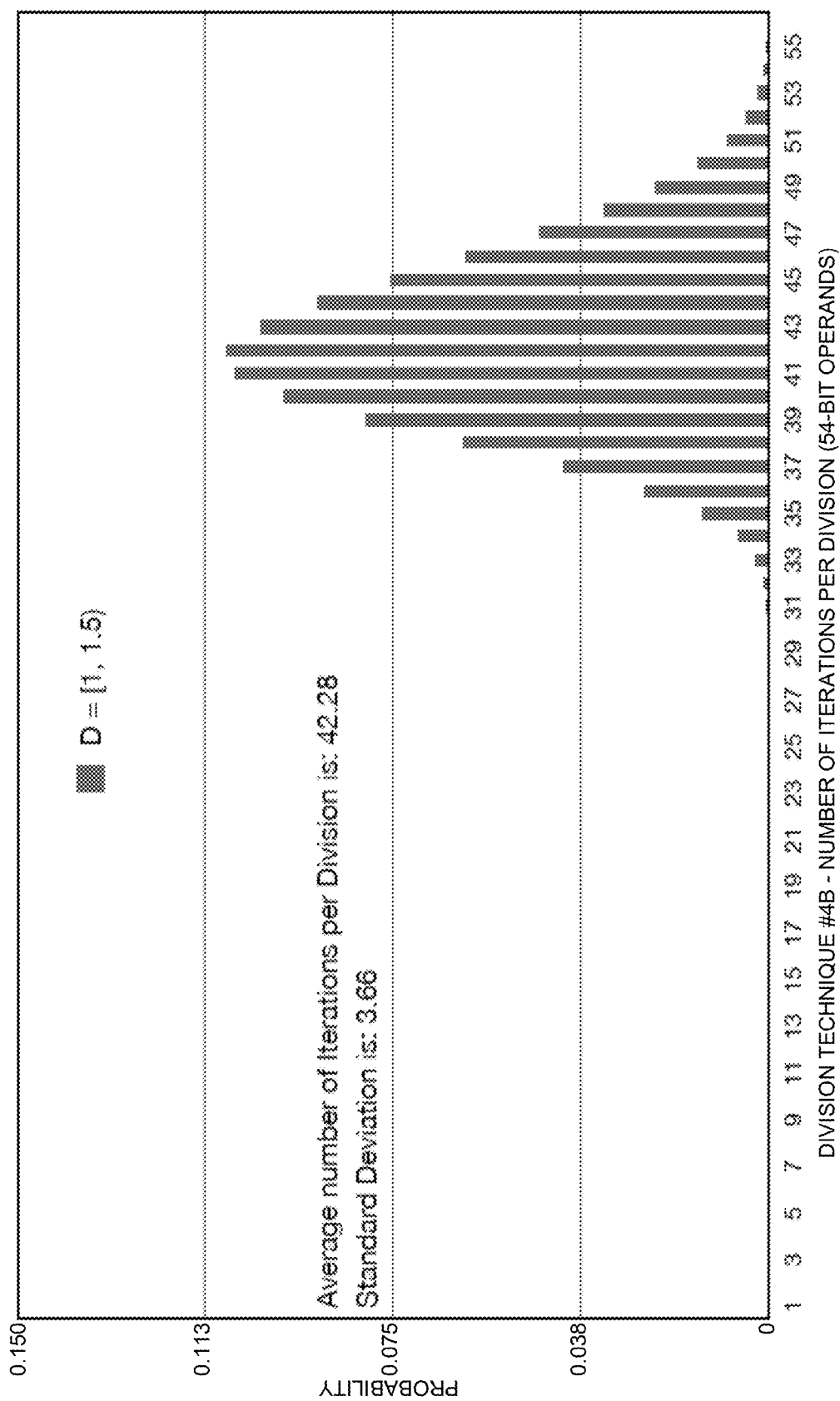
FIG. 63 illustrates a probability distribution of the number of iterations for division technique #4b for a set of randomized division operations in accordance with an embodiment.
Figure 64:
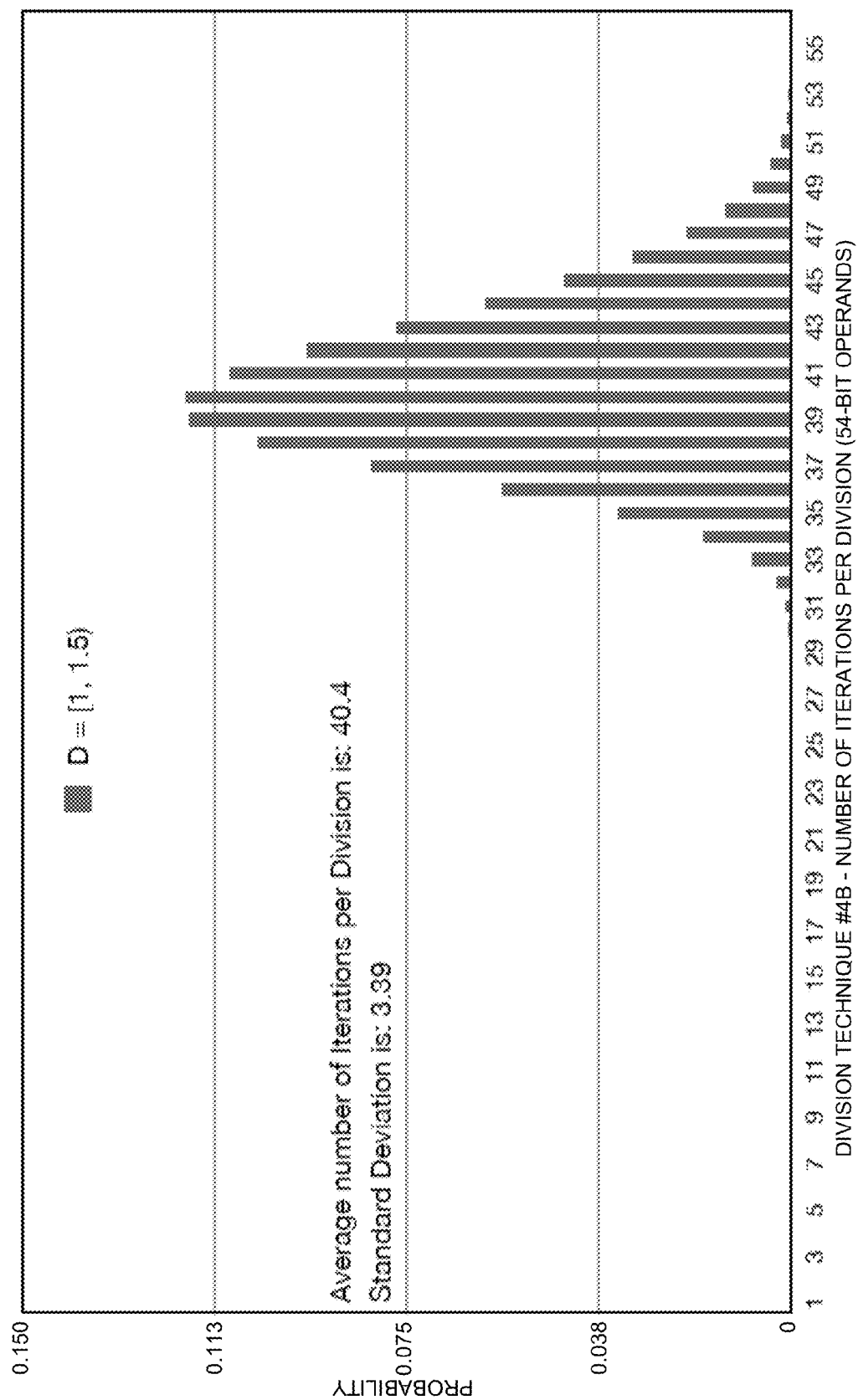
FIG. 64 illustrates a probability distribution of the number of iterations for division technique #5b for a set of randomized division operations in accordance with an embodiment.

The above average iteration techniques are again based on simulations of two million randomized division operations for each of the division techniques; the input operands for the division were random 54-bit divisors and dividends, with D∈[1, 1.5). Probability distributions that illustrate the number of iterations per division for these simulated division operations are illustrated for each technique in FIGS. 61-64; FIG. 61 illustrates the probability distribution for technique #2b, FIG. 62 illustrates the probability distribution for technique #3b, FIG. 63 illustrates the probability distribution for technique #4b, and FIG. 64 illustrates the probability distribution for technique #5b.

Simulations indicate that the average number of iterations for division techniques #2b-#5b for the divisor range [1, 1.5) are lower than those of division techniques #2a-#5a for the same divisor range. More specifically, these simulations indicate that the average number of iterations per division for techniques #2b-#5b when D∈[1, 1.5) is about the same as the average number of iterations per division for techniques #2a-#5a when D∈[1.5, 2).

6.0 Split Division Techniques

As described previously, divisor scaling techniques (also sometimes referred to as "prescaling") restrict the divisor to a certain range, and can be used to adjust the value of the divisor to suit a specific division technique, thereby reducing the average number of iterations per division. Performing divisor scaling, however, involves finding an appropriate value of M such that M*D is in a certain range, e.g., [1, 1.5). One of the challenges of divisor scaling is to implement M*D efficiently (e.g., with at most one or two additions). Disadvantages of divisor scaling include additional delay, additional area overhead, and the need to also scale the dividend. Dividend scaling may yield M*R≥2, which would involve a right shift of M*R and an increment of the exponent. Additional circuitry is needed to test M*R≥2 and conditionally increment the exponent.

In some embodiments, a division circuit includes multiple dividers, with each divider being optimized for a particular divisor range. Such designs can perform fast division operations without performing divisor scaling by splitting the division operation across different division implementations based on the range of the divisor. The ability to always use an optimal divider for a given input divisor while also avoiding divisor scaling facilitates reducing both the average latency of the division operation as well as the power consumption of the division circuit.

Figure 65:
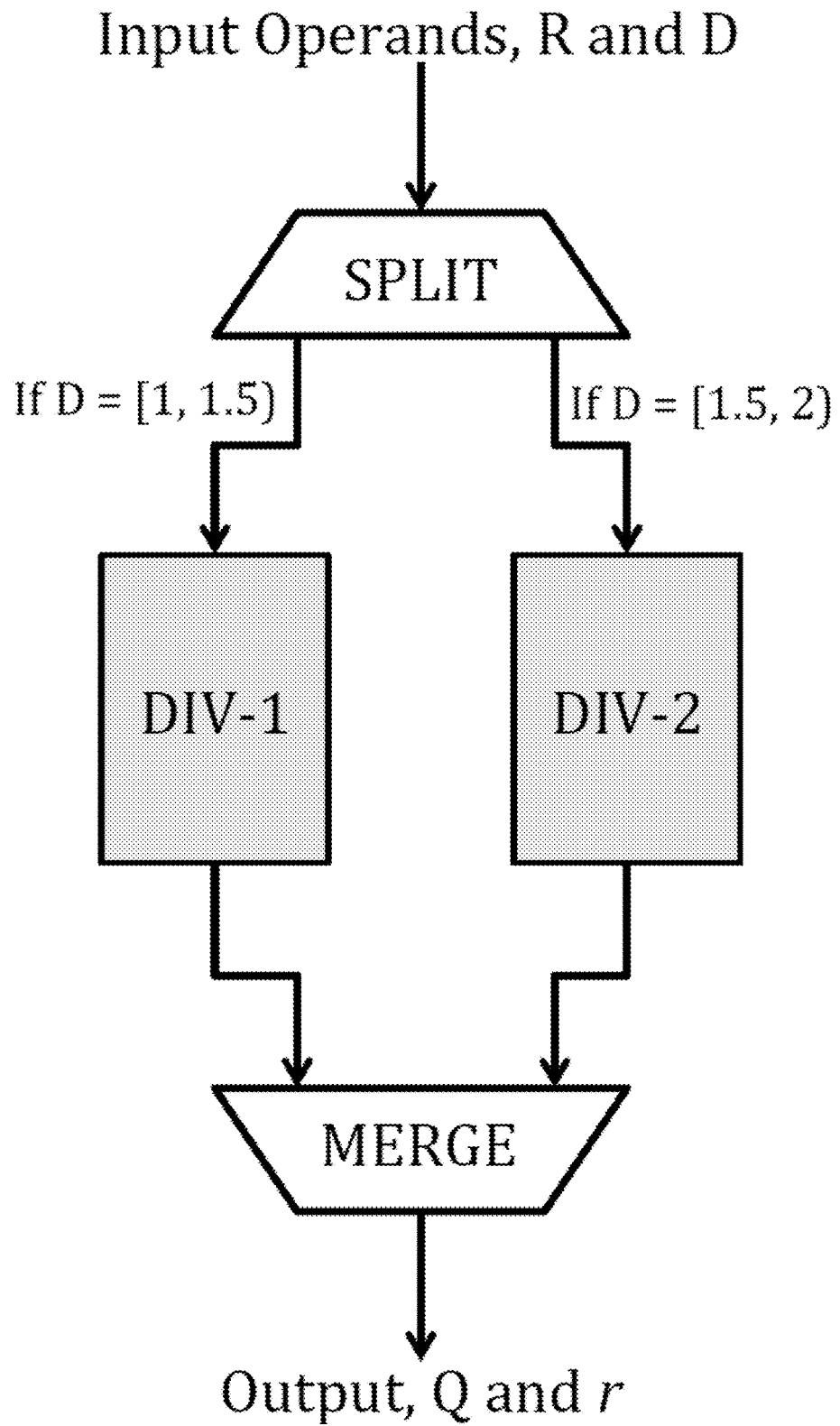
FIG. 65 illustrates an exemplary split division circuit in accordance with an embodiment.

FIG. 65 illustrates an exemplary division circuit that includes two dividers (labeled "DIV-1" and "DIV-2"). Divider DIV-1 may implement division technique #5b, which has a low average number of iterations per division for divisors in the range [1, 1.5), while divider DIV-2 may implement division technique #5a, which has a low average number of iterations per division for divisors in the range [1.5, 2). The "SPLIT" module in FIG. 65 receives the input operands and, depending on the value of the divisor, routes the operands to either DIV-1 or DIV-2. Once the division is complete, the "MERGE" module receives the result from DIV-1 and/or DIV-2, and returns the result to the requestor. Note that DIV-1 and DIV-2 may also include other pre-processing steps, such as bit-unpack, and other post-processing steps, such as rounding, normalization, bit-packing, etc. Note also that in a K+2 non-fractional and L fractional bit format, only the third most-significant bit is sufficient to test if the divisor is in the range [1, 1.5) or [1.5, 2).

Splitting division operations across two different divider implementations based on the range of the divisor does not require divisor scaling, and hence introduces less delay and overhead. The cost for such implementations does include extra area for additional division implementations. However, the floating point units of many modern multi-core processors already include multiple dividers, and hence this technique may not introduce substantial additional area overhead. Note also that the dividers may be pipelined to allow higher division throughput.

In some embodiments, such "split-division" circuits can be optimized to further improve overall division throughput. For instance, a division circuit with multiple dividers may still include some optional scaling functionality to ensure that all of the dividers can be used during peak division loads, even if the current set of input divisors do not match current divider availability. For example, consider a scenario for the division circuit illustrated in FIG. 65 in which a number of requests for division operations with divisors in the range [1, 1.5) are received in parallel. In some situations, it may be beneficial to perform a scaling operation for some of these inputs to allow both DIV-1 and DIV-2 to be used in parallel (even if this results in a slightly higher execution time for one of the parallel divide operations), thereby further increasing division throughput.

Figure 66:
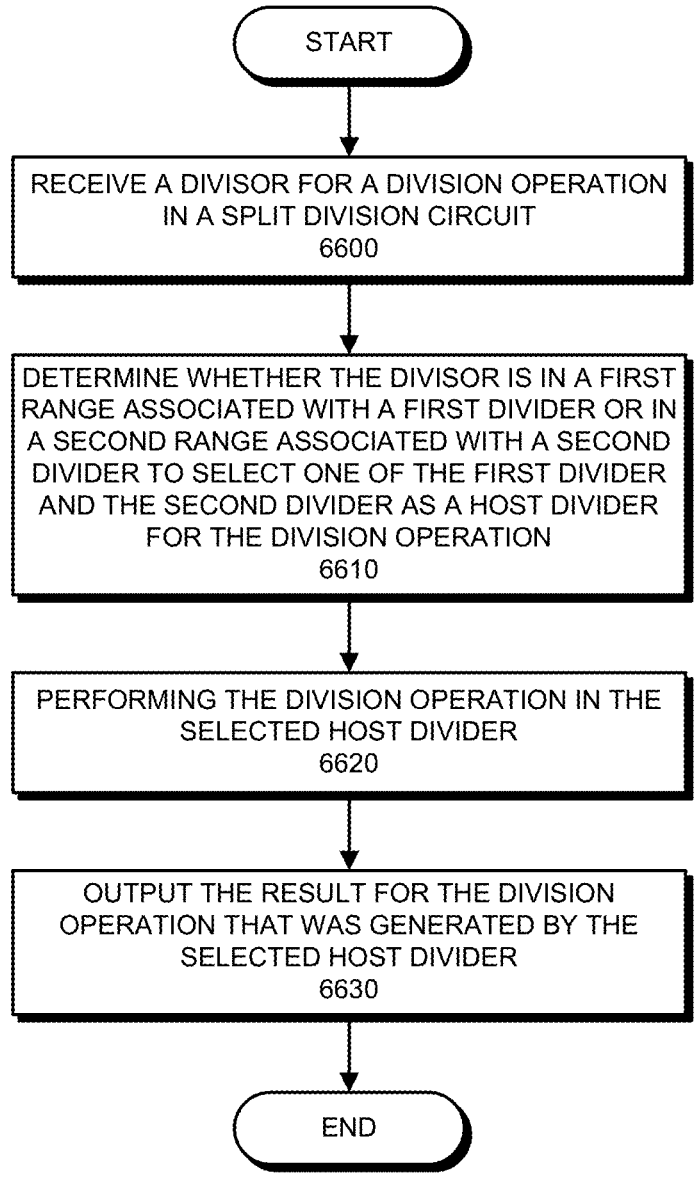
FIG. 66 presents a flow chart that illustrates the process of performing a division operation using a split division circuit in accordance with an embodiment.

FIG. 66 presents a flow chart that illustrates the process of performing a division operation using a split division circuit that includes a first divider that is optimized for a first range of divisor values and a second divider that is optimized for a second range of divisor values; the first range is distinct from the second range. During operation, the circuit receives a divisor for the division operation (operation 6600). The circuit determines whether the divisor is in the first range or the second range to determine whether the first divider or the second divider should perform the division operation (operation 6610), performs the division operation in the selected host divider (operation 6620), and then outputs the result that was generated by the selected host divider (operation 6630).

In summary, embodiments of the present invention comprise techniques that improve the number of iterations and/or the latency of iterations in a division circuit. Divisor scaling techniques can be used to bring a divisor into a more favorable range for a divider circuit. The range of alternatives for each iteration of a division operation can be tailored to reduce the number of iterations for a division operation and/or favor certain divisor ranges. Optimized quotient selection logic can be used to shorten the duration of each division iteration. Split division techniques can be leveraged to ensure that each division operation is performed on a division circuit that optimizes the performance for the given divisor. Such division optimizations facilitate reducing the average latency of division operations.

Computing Environment

Figure 67:
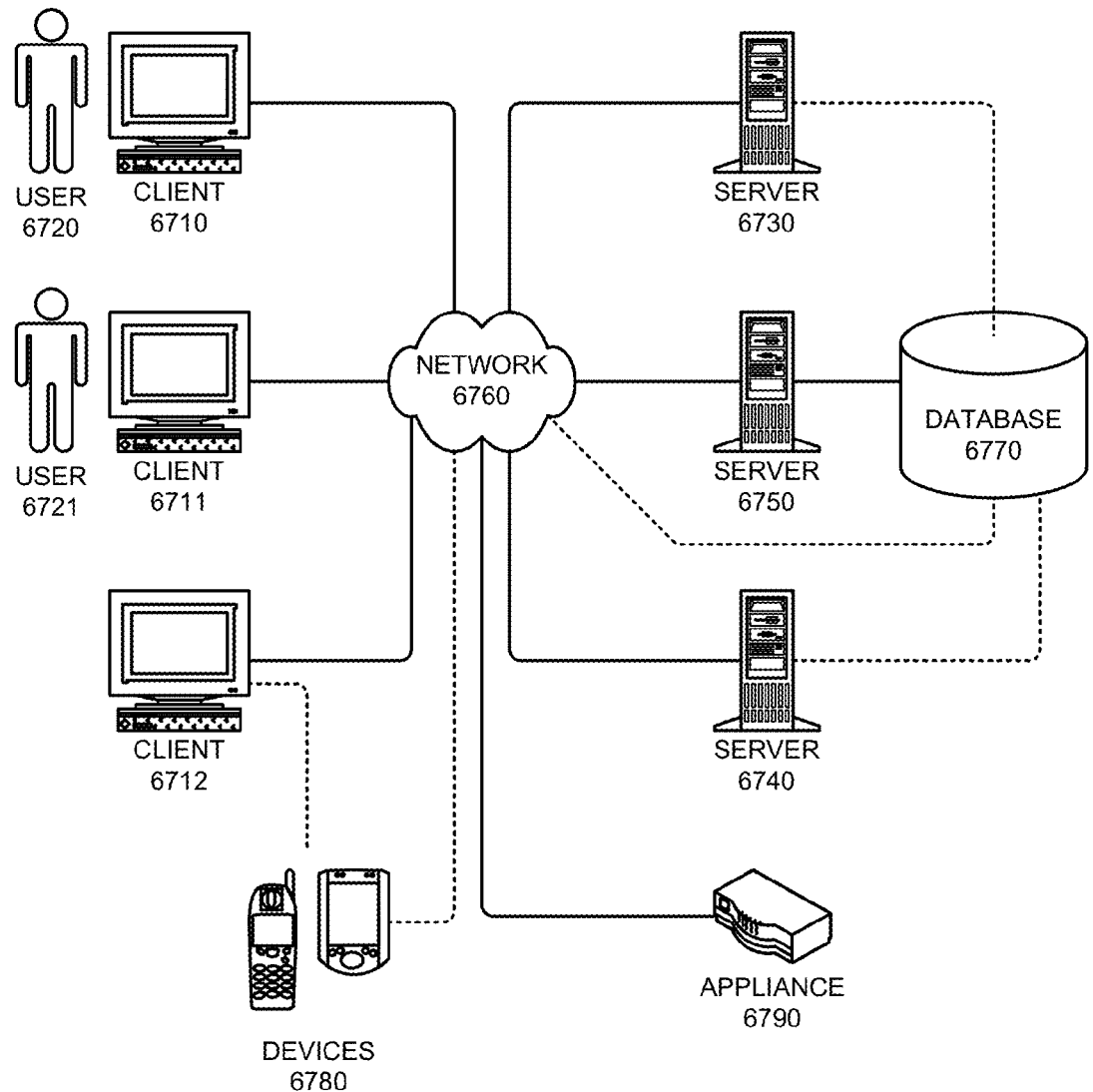
FIG. 67 illustrates a computing environment in accordance with an embodiment.

In some embodiments of the present invention, a carry-save division circuit and quotient selection logic can be incorporated into a wide range of computing devices in a computing environment. For example, FIG. 67 illustrates a computing environment 6700 in accordance with an embodiment of the present invention. Computing environment 6700 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 67, computing environment 6700 includes clients 6710-6712, users 6720 and 6721, servers 6730-6750, network 6760, database 6770, devices 6780, and appliance 6790.

Clients 6710-6712 can include any node on a network that includes computational capability and includes a mechanism for communicating across the network. Additionally, clients 6710-6712 may comprise a tier in an n-tier application architecture, wherein clients 6710-6712 perform as servers (servicing requests from lower tiers or users), and wherein clients 6710-6712 perform as clients (forwarding the requests to a higher tier).

Similarly, servers 6730-6750 can generally include any node on a network including a mechanism for servicing requests from a client for computational and/or data storage resources. Servers 6730-6750 can participate in an advanced computing cluster, or can act as stand-alone servers. For instance, computing environment 6700 can include a large number of compute nodes that are organized into a computing cluster and/or server farm. In one embodiment of the present invention, server 6740 is an online "hot spare" of server 6750.

In other embodiments, servers 6730-6750 include coherent shared-memory multiprocessors.

Users 6720 and 6721 can include: an individual; a group of individuals; an organization; a group of organizations; a computing system; a group of computing systems; or any other entity that can interact with computing environment 6700.

Network 6760 can include any type of wired or wireless communication channel capable of coupling together computing nodes. This includes, but is not limited to, a local area network, a wide area network, or a combination of networks. In one embodiment of the present invention, network 6760 includes the Internet. In some embodiments of the present invention, network 6760 includes phone and cellular phone networks.

Database 6770 can include any type of system for storing data in non-volatile storage. This includes, but is not limited to, systems based upon magnetic, optical, or magneto-optical storage devices, as well as storage devices based on flash memory and/or battery-backed up memory. Note that database 6770 can be coupled: to a server (such as server 6750), to a client, or directly to a network.

Devices 6780 can include any type of electronic device that can be coupled to a client, such as client 6712. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 6780 can be coupled directly to network 6760 and can function in the same manner as clients 6710-6712.

Appliance 6790 can include any type of appliance that can be coupled to network 6760. This includes, but is not limited to, routers, switches, load balancers, network accelerators, and specialty processors. Appliance 6790 may act as a gateway, a proxy, or a translator between server 6740 and network 6760.

Note that different embodiments of the present invention may use different system configurations, and are not limited to the system configuration illustrated in computing environment 6700. In general, any device that performs a division operation may incorporate elements of the present invention.

In some embodiments of the present invention, some or all aspects of division circuits can be implemented as dedicated hardware modules in a computing device. These hardware modules can include, but are not limited to, processor chips, application-specific integrated circuit (ASIC) chips, field-programmable gate arrays (FPGAs), memory chips, and other programmable-logic devices now known or later developed.

Note that a processor can include one or more specialized circuits or structures that support division operations. Alternatively, division operations may be performed using general-purpose circuits that are configured using processor instructions.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an integrated circuit (IC), a method for performing quotient selection for a carry-save division operation, wherein the carry-save division operation divides a dividend, R, by a divisor, D, to produce an approximation of a quotient, Q=R/D, the method comprising:
    circuitry in the IC approximating Q by iteratively selecting and performing an operation for each iteration of the carry-save division operation, wherein the operation for a given iteration is selected based on a set of partial sum bits of a partial remainder in carry-save form (rs) and a set of partial carry bits of a partial remainder in carry-save form (rc);
    wherein the operation for the given iteration is selected from a set of operations that comprises:
        a "2X* operation" in which an inverting shift circuit in the IC performs a left shift of rs and rc and inverts the most-significant bit of rs and rc, and a quotient digit 0 is retired;
        an "S1 & 2X* operation" in which a carry-select addition circuit in the IC subtracts the divisor from rs and rc, the inverting shift circuit performs a left shift of rs and rc and inverts the most-significant bit of rs and rc, and a quotient digit 1 is retired;
        an "S2 & 2X* operation" in which the carry-select addition circuit subtracts twice the divisor from rs and rc, the inverting shift circuit performs a left shift of rs and rc and inverts the most-significant bit of rs and rc, and a quotient digit 2 is retired;
        an "A1 & 2X* operation" in which the carry-select addition circuit adds the divisor to rs and rc, the inverting shift circuit performs a left shift of rs and rc and inverts the most-significant bit of rs and rc, and a quotient digit −1 is retired; and
        an "A2 & 2X* operation" in which the carry-select addition circuit adds twice the divisor to rs and rc, the inverting shift circuit performs a left shift of rs and rc and inverts the most-significant bit of rs and rc, and a quotient digit −2 is retired.

2. The computer-implemented method of claim 1,
    wherein $q*D+2^{-k}*r=R$, where q is the quotient computed after iteration k and the variable r is the partial remainder computed after iteration k;
    wherein the partial remainder r is in redundant carry-save form such that r=rs+rc;
    wherein K defines the ranges for R and D such that R lies in $[2^K, 2^{K+1})$ and D lies in $[2^K, 2^{K+1})$; and
    wherein performing the carry-save division operation comprises selecting from the set of operations during each iteration of the carry-save division operation based on the values of rs and rc for each given iteration.

3. The computer-implemented method of claim 2, wherein the set of five operations available for each iteration completely cover the possible combinations of rs and rc and facilitate substantially reducing the complexity of the quotient selection logic circuitry for the carry-save division operation.

4. The computer-implemented method of claim 2,
wherein the method further comprises receiving a first signal and a second signal that are used to select the operation for the given iteration of the carry-save division operation;
wherein the first signal comprises two bits that select a multiple of D for the carry-save addition operation; and
wherein the second signal comprises one bit that selects between a result for the carry-save addition operation and a result for the 2X* operation.

5. The computer-implemented method of claim 4,
wherein rs[0] is the most significant bit of rs, rs[1] is the second-most significant bit of rs, rc[0] is the most significant bit of rc, and rc[1] is the second-most significant bit of rc;
wherein calculating the first signal comprises determining the values for $(rs[0] \cdot \overline{rs[1]} \cdot \overline{rc[1]}) | (\overline{rs[0]} \cdot rs[1] \cdot rc[1])$ and $\overline{rs[0]}$; and
wherein calculating the second signal comprises determining the value for $rs[0] \oplus rc[0]$.

6. The computer-implemented method of claim 5, wherein the latency for each given iteration comprises:
the delay associated with a four-input multiplexer that multiplexes the values −2D, 2D, −D, and D;
the delay associated with a carry-save adder that operates upon the output of the four-input multiplexer;
the delay associated with a two-input multiplexer that multiplexes the output of the carry-save adder and the result of the 2X* operation;
the delay associated with the quotient selection logic that calculates the first signal and the second signal; and
the delay associated with a set of flip-flops that store the intermediate results for the given iteration.

7. The computer-implemented method of claim 2, wherein the method further comprises scaling the divisor to match the range of a divider that is performing the carry-save division operation.

8. The computer-implemented method of claim 2,
wherein a divider that is performing the carry-save division operation is a variable-iteration divider; and
wherein the set of operations further comprises a "4X* operation" that performs a left shift of rs and rc, performs a second left shift of rs and rc, inverts the most-significant bit of rs and rc, and then retires two quotient digits 00.

9. The computer-implemented method of claim 8, wherein the set of operations further comprises a "4X operation" that performs a left shift of rs and rc, performs a second left shift of rs and rc, and then retires two quotient digits 00.

10. The computer-implemented method of claim 8, wherein the set of operations further comprises an "8X* operation" that performs a left shift of rs and rc, performs a second left shift of rs and rc, performs a third left shift of rs and rc, inverts the most-significant bit of rs and rc, and then retires three quotient digits 000.

11. The computer-implemented method of claim 10, wherein the set of operations further comprises a "4X operation" that performs a left shift of rs and rc, performs a second left shift of rs and rc, and then retires two quotient digits 00.

12. The computer-implemented method of claim 8, wherein the set of operations further comprises:
an "A1 & 4X* operation" that performs the A1 & 2X* operation followed by the 2X* operation, thereby first retiring a quotient digit −1 and then retiring a quotient digit 0;
an "A2 & 4X* operation" that performs the A2 & 2X* operation followed by the 2X* operation, thereby first retiring a quotient digit −2 and then retiring a quotient digit 0;
an "S1 & 4X* operation" that performs the S1 & 2X* operation followed by the 2X* operation, thereby first retiring a quotient digit 1 and then retiring a quotient digit 0; and
an "S2 & 4X* operation" that performs the S2 & 2X* operation followed by the 2X* operation, thereby first retiring a quotient digit 2 and then retiring a quotient digit 0.

13. The computer-implemented method of claim 9, wherein the set of operations further comprises:
an "A1 & 4X* operation" that performs the A1 & 2X* operation followed by the 2X* operation, thereby first retiring a quotient digit −1 and then retiring a quotient digit 0;
an "A2 & 4X* operation" that performs the A2 & 2X* operation followed by the 2X* operation, thereby first retiring a quotient digit −2 and then retiring a quotient digit 0;
an "S1 & 4X* operation" that performs the S1 & 2X* operation followed by the 2X* operation, thereby first retiring a quotient digit 1 and then retiring a quotient digit 0; and
an "S2 & 4X* operation" that performs the S2 & 2X* operation followed by the 2X* operation, thereby first retiring a quotient digit 2 and then retiring a quotient digit 0.

14. The computer-implemented method of claim 11, wherein the set of operations further comprises:
an "A1 & 4X* operation" that performs the A1 & 2X* operation followed by the 2X* operation, thereby first retiring a quotient digit −1 and then retiring a quotient digit 0;
an "A2 & 4X* operation" that performs the A2 & 2X* operation followed by the 2X* operation, thereby first retiring a quotient digit −2 and then retiring a quotient digit 0;
an "S1 & 4X* operation" that performs the S1 & 2X* operation followed by the 2X* operation, thereby first retiring a quotient digit 1 and then retiring a quotient digit 0; and
an "S2 & 4X* operation" that performs the S2 & 2X* operation followed by the 2X* operation, thereby first retiring a quotient digit 2 and then retiring a quotient digit 0.

15. A carry-save division circuit, wherein the carry-save division circuit divides a dividend, R, by a divisor, D, to produce an approximation of a quotient, Q=R/D, comprising:
a division circuit that comprises a carry-save addition circuit, an inverting shift circuit, and a quotient selection logic circuit;
wherein the division circuit is configured to perform a carry-save division operation that approximates Q by iteratively selecting and performing an operation for each iteration of the carry-save division operation, wherein the operation for a given iteration is selected based on a set of partial sum bits of a partial remainder in carry-save form (rs) and a set of partial carry bits of a partial remainder in carry-save form (rc); and
wherein the operation for the given iteration is selected from a set of operations that comprises:

a "2X* operation" in which the inverting shift circuit performs a left shift of rs and rc and inverts the most-significant bit of rs and rc, and a quotient digit 0 is retired;

an "S1 & 2X* operation" in which the carry-select addition circuit subtracts the divisor from rs and rc, the inverting shift circuit performs a left shift of rs and rc and inverts the most-significant bit of rs and rc, and a quotient digit 1 is retired;

an "S2 & 2X* operation" in which the carry-select addition circuit subtracts twice the divisor from rs and rc, the inverting shift circuit performs a left shift of rs and rc and inverts the most-significant bit of rs and rc, and a quotient digit 2 is retired;

an "A1 & 2X* operation" in which the carry-select addition circuit adds the divisor to rs and rc, the inverting shift circuit performs a left shift of rs and rc and inverts the most-significant bit of rs and rc, and a quotient digit −1 is retired; and an "A2 & 2X* operation" in which the carry-select addition circuit adds twice the divisor to rs and rc, the inverting shift circuit performs a left shift of rs and rc and inverts the most-significant bit of rs and rc, and a quotient digit −2 is retired.

16. The carry-save division circuit of claim 15, wherein $q*D+2^{-k}*r=R$, where q is the quotient computed after iteration k and the variable r is the partial remainder computed after iteration k;

wherein the partial remainder r is in redundant carry-save form such that r=rs+rc;

wherein K defines the ranges for R and D such that R lies in $[2^K, 2^{K+1})$ and D lies in $[2K, 2^{K+1})$; and wherein performing the carry-save division operation comprises selecting from the set of operations during each iteration of the carry-save division operation based on the values of rs and rc for each given iteration.

17. The carry-save division circuit of claim 16, wherein the set of five operations available for each iteration completely cover the possible combinations of rs and rc and facilitate substantially reducing the complexity of the quotient selection logic circuit.

18. The carry-save division circuit of claim 16, wherein the quotient selection logic circuit generates a first signal and a second signal that are used to select the operation for a given iteration of the carry-save division operation;

wherein the first signal comprises two bits that select a multiple of D for the carry-save addition operation; and wherein the second signal comprises one bit that selects between a result for the carry-save addition operation and a result for the 2X* operation.

19. The carry-save division circuit of claim 18, wherein rs[0] is the most significant bit of rs, rs[1] is the second-most significant bit of rs, rc[0] is the most significant bit of rc, and rc[1] is the second-most significant bit of rc;

wherein the quotient selection logic circuit is configured to calculate the first signal by determining the values for $(rs[0] \cdot \overline{rs[1]} \cdot \overline{rc[1]}) | (\overline{rs[0]} \cdot rs[1] \cdot rc[1])$ and $\overline{rs[0]}$; and wherein the quotient selection logic circuit is configured to calculate the second signal by determining the value for $rs[0] \oplus rc[0]$.

20. A non-transitory computer-readable storage medium storing instructions that when executed by an integrated circuit (IC) cause the IC to perform a method for performing quotient selection for a carry-save division operation, wherein the carry-save division operation divides a dividend, R, by a divisor, D, to produce an approximation of a quotient, Q=R/D, the method comprising:

circuitry in the IC approximating Q by iteratively selecting and performing an operation for each iteration of the carry-save division operation, wherein the operation for a given iteration is selected based on a set of partial sum bits of a partial remainder in carry-save form (rs) and a set of partial carry bits of a partial remainder in carry-save form (rc);

wherein the operation for the given iteration is selected from a set of operations that comprises:

a "2X* operation" in which an inverting shift circuit in the IC performs a left shift of rs and rc and inverts the most-significant bit of rs and rc, and a quotient digit 0 is retired;

an "S1 & 2X* operation" in which a carry-select addition circuit in the IC subtracts the divisor from rs and rc, the inverting shift circuit performs a left shift of rs and rc and inverts the most-significant bit of rs and rc, and a quotient digit 1 is retired;

an "S2 & 2X* operation" in which the carry-select addition circuit subtracts twice the divisor from rs and rc, the inverting shift circuit performs a left shift of rs and rc and inverts the most-significant bit of rs and rc, and a quotient digit 2 is retired;

an "A1 & 2X* operation" in which the carry-select addition circuit adds the divisor to rs and rc, the inverting shift circuit performs a left shift of rs and rc and inverts the most-significant bit of rs and rc, and a quotient digit −1 is retired; and an "A2 & 2X* operation" in which the carry-select addition circuit adds twice the divisor to rs and rc, the inverting shift circuit performs a left shift of rs and rc and inverts the most-significant bit of rs and rc, and a quotient digit −2 is retired.

* * * * *